(12) United States Patent  (10) Patent No.: US 9,323,325 B2
Perez et al.  (45) Date of Patent: Apr. 26, 2016

(54) ENHANCING AN OBJECT OF INTEREST IN A SEE-THROUGH, MIXED REALITY DISPLAY DEVICE

(75) Inventors: Kathryn Stone Perez, Kirkland, WA (US); Benjamin I. Vaught, Seattle, WA (US); John R. Lewis, Bellevue, WA (US); Robert L. Crocco, Seattle, WA (US); Alex Aben-Athar Kipman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 212 days.

(21) Appl. No.: 13/221,770

(22) Filed: Aug. 30, 2011

(65) Prior Publication Data

US 2013/0050432 A1 Feb. 28, 2013

(51) Int. Cl.
*G09G 5/00* (2006.01)
*G06F 3/01* (2006.01)
*H04N 13/02* (2006.01)
(Continued)

(52) U.S. Cl.
CPC .............. *G06F 3/013* (2013.01); *G02B 27/017* (2013.01); *G06F 3/011* (2013.01); *G06F 3/017* (2013.01); *H04N 13/0278* (2013.01); *H04N 13/044* (2013.01); *H04N 13/0484* (2013.01); *G02B 2027/014* (2013.01);
(Continued)

(58) Field of Classification Search
CPC ............ G09G 5/00; G09G 3/30; G06F 3/041; G06F 3/048; G06T 15/00
USPC ............ 345/661, 6, 419, 633, 8, 156; 348/47; 351/206
See application file for complete search history.

(56) References Cited

U.S. PATENT DOCUMENTS 4,934,773 A 6/1990 Becker
5,016,282 A 5/1991 Tomono et al.
(Continued)

FOREIGN PATENT DOCUMENTS

CA 2685976 A1 11/2008
CN 101026776 A 8/2007
(Continued)

OTHER PUBLICATIONS

Office Action dated Sep. 6, 2012, U.S. Appl. No. 13/221,739, filed Aug. 30, 2011, 61 pages.
(Continued)

*Primary Examiner* — Geepy Pe
*Assistant Examiner* — Berteau Joisil
(74) *Attorney, Agent, or Firm* — Dan Choi; Judy Yee; Micky Minhas

(57) ABSTRACT

Technology is disclosed for enhancing the experience of a user wearing a see-through, near eye mixed reality display device. Based on an arrangement of gaze detection elements on each display optical system for each eye of the display device, a respective gaze vector is determined and a current user focal region is determined based on the gaze vectors. Virtual objects are displayed at their respective focal regions in a user field of view for a natural sight view. Additionally, one or more objects of interest to a user may be identified. The identification may be based on a user intent to interact with the object. For example, the intent may be determined based on a gaze duration. Augmented content may be projected over or next to an object, real or virtual. Additionally, a real or virtual object intended for interaction may be zoomed in or out.

20 Claims, 23 Drawing Sheets

(51) Int. Cl.
*H04N 13/04* (2006.01)
*G02B 27/01* (2006.01)

(52) U.S. Cl.
CPC ............ *G02B 2027/0138* (2013.01); *G02B 2027/0178* (2013.01); *G02B 2027/0187* (2013.01)

(56) References Cited

U.S. PATENT DOCUMENTS

| | | | |
|---|---|---|---|
| 5,307,170 | A | 4/1994 | Itsumi et al. |
| 5,471,542 | A | 11/1995 | Ragland |
| 5,486,860 | A | 1/1996 | Shiokawa et al. |
| 5,689,619 | A | 11/1997 | Smyth |
| 6,034,653 | A | 3/2000 | Robertson |
| 6,053,610 | A | 4/2000 | Kurtin et al. |
| 6,069,742 | A | 5/2000 | Silver |
| 6,317,127 | B1 | 11/2001 | Daily et al. |
| 6,351,335 | B1 | 2/2002 | Perlin |
| 6,408,257 | B1 | 6/2002 | Harrington et al. |
| 6,433,760 | B1 | 8/2002 | Vaissie et al. |
| 6,456,262 | B1 | 9/2002 | Bell |
| 6,466,207 | B1 | 10/2002 | Gortler et al. |
| 6,522,479 | B2 | 2/2003 | Yahagi |
| 6,578,962 | B1 | 6/2003 | Amir et al. |
| 6,618,208 | B1 | 9/2003 | Silver |
| 6,659,611 | B2 | 12/2003 | Amir et al. |
| 6,886,137 | B2 | 4/2005 | Peck et al. |
| 6,898,307 | B1 | 5/2005 | Harrington |
| 7,130,447 | B2 | 10/2006 | Aughey et al. |
| 7,133,077 | B2 | 11/2006 | Higuma et al. |
| 7,262,926 | B2 | 8/2007 | Ohsato |
| 7,362,522 | B2 | 4/2008 | Ohsato |
| 7,391,887 | B2 | 6/2008 | Durnell |
| 7,396,129 | B2 | 7/2008 | Endrikhovski et al. |
| 7,401,920 | B1 | 7/2008 | Kranz et al. |
| 7,457,434 | B2 | 11/2008 | Azar |
| 7,522,344 | B1 | 4/2009 | Curatu et al. |
| 7,532,230 | B2 | 5/2009 | Culbertson et al. |
| 7,533,988 | B2 | 5/2009 | Ebisawa |
| 7,538,744 | B1 | 5/2009 | Liu et al. |
| 7,542,012 | B2 | 6/2009 | Kato et al. |
| 7,542,210 | B2 | 6/2009 | Chirieleison, Sr. |
| 7,686,451 | B2 | 3/2010 | Cleveland |
| 7,736,000 | B2 | 6/2010 | Enriquez et al. |
| 7,883,415 | B2 | 2/2011 | Larsen et al. |
| 8,262,234 | B2 | 9/2012 | Watanabe |
| 8,487,838 | B2 | 7/2013 | Lewis et al. |
| 8,941,559 | B2 | 1/2015 | Bar-Zeev et al. |
| 2001/0001240 | A1 | 5/2001 | Melville et al. |
| 2002/0105482 | A1 | 8/2002 | Lemelson et al. |
| 2002/0126066 | A1 | 9/2002 | Yasukawa et al. |
| 2002/0167462 | A1 | 11/2002 | Lewis et al. |
| 2003/0197933 | A1 | 10/2003 | Sudo et al. |
| 2004/0130783 | A1 | 7/2004 | Solomon |
| 2004/0239670 | A1 | 12/2004 | Marks |
| 2005/0047629 | A1 | 3/2005 | Farrell et al. |
| 2005/0090730 | A1 | 4/2005 | Cortinovis et al. |
| 2006/0028400 | A1 | 2/2006 | Lapstun et al. |
| 2006/0033992 | A1 | 2/2006 | Solomon |
| 2006/0077121 | A1 | 4/2006 | Melville et al. |
| 2006/0146012 | A1 | 7/2006 | Arneson et al. |
| 2006/0221266 | A1 | 10/2006 | Kato |
| 2006/0250322 | A1 | 11/2006 | Hall et al. |
| 2006/0284790 | A1 | 12/2006 | Tegreene et al. |
| 2007/0041101 | A1 | 2/2007 | Goosey et al. |
| 2007/0201859 | A1 | 8/2007 | Sarrat |
| 2007/0273610 | A1 | 11/2007 | Baillot |
| 2008/0007689 | A1 | 1/2008 | Silver |
| 2008/0024392 | A1 | 1/2008 | Gustafsson et al. |
| 2008/0024597 | A1 | 1/2008 | Yang et al. |
| 2008/0048931 | A1 | 2/2008 | Ben-Ari |
| 2008/0084532 | A1 | 4/2008 | Kurtin |
| 2008/0117289 | A1 | 5/2008 | Schowengerdt et al. |
| 2008/0181452 | A1* | 7/2008 | Kwon et al. ............... 382/103 |
| 2009/0112469 | A1 | 4/2009 | Lapidot et al. |
| 2009/0174946 | A1 | 7/2009 | Raviv et al. |
| 2009/0221368 | A1 | 9/2009 | Yen et al. |
| 2009/0225001 | A1 | 9/2009 | Biocca et al. |
| 2009/0284608 | A1 | 11/2009 | Hong et al. |
| 2009/0295683 | A1 | 12/2009 | Pugh et al. |
| 2010/0017728 | A1 | 1/2010 | Cho et al. |
| 2010/0079356 | A1 | 4/2010 | Hoellwarth |
| 2010/0097580 | A1 | 4/2010 | Yamamoto et al. |
| 2010/0149073 | A1 | 6/2010 | Chaum et al. |
| 2010/0231706 | A1* | 9/2010 | Maguire, Jr. ................ 348/121 |
| 2010/0238161 | A1 | 9/2010 | Varga et al. |
| 2011/0018903 | A1 | 1/2011 | Lapstun et al. |
| 2011/0075257 | A1 | 3/2011 | Hua et al. |
| 2011/0109880 | A1 | 5/2011 | Nummela |
| 2011/0214082 | A1 | 9/2011 | Osterhout et al. |
| 2011/0219291 | A1 | 9/2011 | Lisa |
| 2012/0021806 | A1 | 1/2012 | Maltz |
| 2012/0105486 | A1* | 5/2012 | Lankford et al. ............. 345/661 |
| 2012/0127062 | A1* | 5/2012 | Bar-Zeev et al. ............. 345/6 |
| 2013/0107021 | A1* | 5/2013 | Maizels et al. .............. 348/50 |

FOREIGN PATENT DOCUMENTS

| | | |
|---|---|---|
| CN | 101268388 A | 9/2008 |
| CN | 101634750 A | 1/2010 |
| JP | 2001078234 A | 3/2001 |
| JP | 2001197522 A | 7/2001 |
| JP | 2001215441 A | 8/2001 |
| JP | 2002041234 A | 2/2002 |
| JP | 2002223458 S | 8/2002 |
| JP | 2002529792 A | 9/2002 |
| JP | 2003508808 A | 3/2003 |
| JP | 2003132068 A | 5/2003 |
| JP | 2006145922 A | 6/2006 |
| JP | 3872100 B2 | 1/2007 |
| JP | 2008508621 A | 3/2008 |
| JP | 2008509438 A | 3/2008 |
| JP | 2009204287 A | 9/2009 |
| JP | 2010501890 A | 1/2010 |
| JP | 5237268 B2 | 7/2013 |
| WO | 2005124429 A1 | 12/2005 |
| WO | 2006017771 A1 | 2/2006 |
| WO | 2006087709 A1 | 8/2006 |
| WO | 2007063306 A1 | 6/2007 |
| WO | 2007066166 A1 | 6/2007 |
| WO | 2007085303 A1 | 8/2007 |

OTHER PUBLICATIONS

Response to Office Action filed Oct. 16, 2012, U.S. Appl. No. 13/221,739, filed Aug. 30, 2011, 12 pages.
Notice of Allowance and Fee(s) Due dated Dec. 12, 2012, U.S. Appl. No. 13/221,739, filed Aug. 30, 2011, 11 pages.
Office Action dated Mar. 14, 2013 in U.S. Appl. No. 12/941,825, 32 pages.
U.S. Appl. No. 13/844,453, filed Mar. 15, 2013.
Office Action dated Apr. 2, 2013 in U.S. Appl. No. 12/970,695, 53 pages.
Canadian Office Action dated Nov. 7, 2011, Canadian Patent Application No. 2,750,287 filed Aug. 29, 2011, 3 pages.
Response to Canadian Office Action dated Jan. 31, 2012, Canadian Patent Application No. 2,750,287 filed Aug. 29, 2011, 12 pages.
Canadian Office Action dated Feb. 22, 2012, Canadian Patent Application No. 2,750,287 filed Aug. 29, 2011, 1 page.
Response to Canadian Office Action dated Feb. 28, 2012, Canadian Patent Application No. 2,750,287 filed Aug. 29, 2011, 2 pages.
Preliminary Amendment dated Apr. 20, 2012, U.S. Appl. No. 13/221,739, filed Aug. 30, 2011, 10 pages.
Li, et al., "An Efficient Method for Eye Tracking and Eye-Gazed FOV Estimation," Proceedings of the 16th IEEE international conference on Image processing (ICIP'09), pp. 2597-2600, Nov. 2009, Cairo, Egypt, 4 pages.
Lin et al., "A new data processing and calibration method for an eye-tracking device pronunciation system," Optics & Laser Technology, Apr. 2002, vol. 34, pp. 405-413. Elsevier Science Ltd. New York, NY, USA, 9 pages.

(56) References Cited

OTHER PUBLICATIONS

Akeley et al., "A Stereo Display Prototype with Multiple Focal Distances", Proceedings of ACM SIGGRAPH, Aug. 2004, pp. 804-813. ACM, Inc., New York, NY, USA, 10 pages.

Blum, et al., "The Effect of Out-of-focus Blur on Visual Discomfort When Using Stereo Displays", Proceedings of the 2010 International Symposium on Mixed and Augmented Reality, Oct. 13-16, 2010, pp. 13-17, IEEE: Seoul, Korea, 5 pages.

Chen et al., "Research on Eye-gaze Tracking Network Generated by Augmented Reality Application", Proceedings of the Second International Workshop on Knowledge Discovery and Data Mining, Jan. 23-25, 2009, pp. 594-597 IEEE, Moscow, Russia, 4 pages.

"Helmet Mounted Display (HMD) with Built-In Eye Tracker", Datasheet, National Aerospace Laboratory (NLR), Jan. 2009, Retrieved from the Internet: URL: <http://www.nlr.nl/ATTS/flyer%20HMD%20F294-03.pdf>, 4 pages.

Hillaire, et al., "Using an Eye-Tracking System to Improve Camera Motions and Depth-of-Field Blur Effects in Virtual Environments", Proceedings of the 2008 Virtual Reality Conference, Mar. 8-12, 2008, pp. 47-50, IEEE: Reno, NE, USA. Retrieved from the Internet Nov. 11, 2010, URL: <http://www.irisa.fr/bunraku/GENS/alecuyer/vr08_hillaire.pdf>, 4 pages.

Johnson, Joel, "How Oil-Filled Lenses are Bringing Sight to Those in Need", Gizmodo [online], Feb. 3, 2010 [retrieved on Nov. 11, 2010], Gawker Media, New York, NY, USA, Retrieved from the Internet, URL: <http://gizmodo.com/5463368/how-oil+filled-lenses-are-bringing-sight-to-those-in-need> 4 pages.

Kim et al., "Vision-Based Eye-Gaze Tracking for Human Computer Interface", Proceedings of the 1999 Conference on Systems, Man, and Cybernetics, Oct. 12-15, 1999, pp. 324-329, vol. 2. IEEE: Toyko, Japan, 3 pages.

Lee et al., "Robust Gaze Tracking Method for Stereoscopic Virtual Reality Systems", J. Jacko (Ed.). Proceedings of the 12th international conference on Human-computer interaction: intelligent multimodal interaction environments (HCI'07), Jul. 22-27, 2007, pp. 700-709. Retrieved from the Internet: URL: <http://delivery.acm.org/10.1145/1770000/1769669/p700-lee.pdf?key1=1769669&key2=3272740821&coll=Guide&dl=GUIDE&CFID=98778950&CFTOKEN=13851951>, 10 pages.

Liu, et al.,"Real Time Auto-Focus Algorithm for Eye Gaze Tracking System", Proceedings of the 2007 International Symposium on Intelligent Signal Processing and Communication Systems, Nov. 28-Dec. 1, 2007, pp. 742-745, Xiamen, China, 4 pages.

Ren, et al., "Tunable-focus liquid lens controlled using a servo motor", Optics Express, Sep. 4, 2006, pp. 8031-8036, vol. 14, No. 18, Optical Society of America, Washington, D.C., USA, 6 pages.

Rolland, et al., "Displays—Head-Mounted", In Encyclopedia of Optical Engineering, New York: Marcel Dekker, 2005 [retrieved on Nov. 11, 2010] Retrieved from the Internet: URL: <http://www.optics.arizona.edu/opti588/reading/HMD_Rolland_Hua_2005.pdf>, 16 pages.

"Vibrating Lens Gives Movie Camera Great Depth of Focus", Popular Science, May 1942, pp. 88-89, vol. 140, No. 5, Popular Science Publishing Co., Inc.: New York, NY, USA [retrieved on Sep. 29, 2010] Retrieved from the Internet: URL: <http://books.google.com/books?id=gCcDAAAAMBAJ&pg=PA88&dq=vibrating+lens&hl=en&ei=TC75Tev1FqjkiAK9Idj9DA&sa=X&oi=book_result&ct=result&resnum=1&ved=0CCoQ6AEwAA#v=onepage&q=vibrating%20lens&f=false>, 3 pages.

Ajanki, et al., "Contextual Information Access with Augmented Reality", In Proceedings of IEEE International Workshop on Machine Learning for Signal Processing (MLSP), Aug. 29-Sep. 1, 2010, pp. 95-100, Kittila, Finland, 6 pages.

Barras, Colin, "Innovation: Gaze trackers eye computer garners", NewScientist [online]. Mar. 26, 2010 [retrieved on Aug. 26, 2010] Retrieved from the Internet: URL: <http://www.newscientist.com/article/dn18707-innovation-gaze-trackers-e>, 4 pages.

"Gaze-enhanced User Interface Design", Stanford HCI Group [online]. Retrieved from the Internet on Aug. 27, 2010: URL: <http://hci.stanford.edu/research/GUIDe/>, 3 pages.

Nilsson, et al., "Hands Free Interaction with Virtual Information in a Real Environment: Eye Gaze as an Interaction Tool in an Augmented Reality System", PsychNology Journal, vol. 7, No. 2, pp. 175-196, Apr. 28, 2009, 22 pages.

Cadden, Ricky, "Nokia Has Been Fine-Tuning Eye-Tracking Glasses", Symbian-Guru.com [online], Sep. 6, 2009 [retrieved on Aug. 26, 2010] Retrieved from the Internet: URL: <http://www.symbian-guru.com/welcome/2009/09/nokia-has-been-fine-tuning-eye-tracking-glasses.html>, 3 pages.

Handa, et al., "Development of head-mounted display with eye-gaze detection function for the severely disabled", 2008 IEEE International Conference on Virtual Environments, Human-Computer Interfaces, and Measurement Systems (VECIMS 2008), Jul. 14-16, 2008, Istanbul, Turkey, 5 pages.

"Head Fixed Eye Tracking System Specifications", Arrington Research [online], Retrieved from the Internet on Jun. 10, 2011: <URL: http://www.arringtonresearch.com/techinfo.html>, 2 pages.

Gang, Wen, "Chapter 3 Gaze Estimation System", National University of Singapore, ScholarBank@NUS [online], 2004 [retrived on Jun. 10, 2011], Retrieved from the Internet: URL:<http://scholarbank.nus.edu.sg/bitstream/handle/10635/13692/Chapter3_GazeDetectionSystem.pdf?sequence=5>,10 pages.

Reale, et al., "Viewing Direction Estimation Based on 3D Eyeball Construction for HRI", IEEE Computer Society Conference on Computer Vision and Pattern Recognition Workshops, Jun. 13-18, 2010, pp. 24-31, San Francisco, CA, IEEE Publishers, 8 pages.

Ebisawa, Yoshinobu, "Unconstrained Pupil Detection Technique Using Two Light Sources and the Image Difference Method", Visualization and Intelligent Design in Engineering and Architecture II, Published 1995, 11 pages.

Hennessey, et al., "A Single Camera Eye-Gaze Tracking System with Free Head Motion", Proceedings of the 2006 Symposium on Eye Tracking Research and Applications, Mar. 27-29, 2006, pp. 87-94, ACM, New York, NY, 8 pages.

Villanueva, et al., "Geometry Issues of Gaze Estimation", Advances in Human Computer Interaction, Oct. 2008, InTech, pp. 513-534, 22 pages.

Pomplun, et al., "Using Pupil Size as a Measure of Cognition Workload in Video-Based Eye-Tracking Studies", Department of Computer Sciences, Research Article [online], [retrieved on Jun. 10, 2011] Retrieved from the Internet: <URL: http://www.cs.umb.edu/~marc/pubs/pomplun_sunkara_fairley_xiao_draft.pdf>, 37 pages.

Ajanki, et al., "Ubiquitous Contextual Information Access with Proactive Retrieval and Augmentation", Proceedings of the Fourth International Workshop in Ubiquitous Augmented Reality (IWUVR 2010), May 17, 2010, Helsinki, Finland, 5 pages.

Herbelin, et al., "Coding gaze tracking data with chromatic gradients for VR Exposure Therapy", Proceedings of the 17th International Conference on Artificial Reality and Telexistence (ICAT '07), Nov. 28-30, 2007, Esbjerg, Denmark, 8 pages.

Kollenberg, et al., "Visual Search in the (Un)Real World: How Head-Mounted Displays Affect Eye Movements, Head Movements and Target Detection", Proceedings of the 2010 Symposium on Eye-Tracking Research & Applications (ETRA '10), Mar. 22-24, 2010, Austin Texas, 4 pages.

ZionEyez, A Social Media Company [online], Copyright ZionEyez 2011 [retrieved on Jun. 15, 2011], Retrieved from the Internet: <URL:http://www.zioneyez.com/#/home/>, 6 pages.

U.S. Appl. No. 12/949,650, filed Nov. 18, 2010.

U.S. Appl. No. 12/941,825, filed Nov. 8, 2010.

U.S. Appl. No. 12/970,695, filed Dec. 16, 2010.

U.S. Appl. No. 13/221,739, filed Aug. 30, 2011.

Office Action dated Nov. 21, 2013 in U.S. Appl. No. 12/949,650, 40 pages.

Response to Office Action filed May 21, 2014 in U.S. Appl. No. 12/949,650, 9 pages.

Final Office Action dated Jul. 14, 2014 in U.S. Appl. No. 12/949,650, 24 pages.

Supplementary European Search Report dated Jul. 11, 2013 in European Patent Application No. 11842082.7, 3 pages.

Office Action dated Sep. 12, 2013 in European Patent Application No. 11842082.7, 6 pages.

(56) References Cited

OTHER PUBLICATIONS

Response to Office Action filed Jan. 15, 2014 in European Patent Application No. 11842082.7, with Set of Claims and Description pages, 21 pages.
Communication under Rule 71(3) EPC Intention to Grant, Dated Aug. 6, 2014 in European Patent Application No. 11842082.7, 7 pages.
First Office Action dated Sep. 18, 2013 in Chinese Patent Application No. 201110386149.4, with English Summary, 13 pages.
English Abstract for CN101268388A published Sep. 17, 2008, 2 pages.
English Abstract of CN101634750 published Jan. 27, 2010, 1 page.
Response to Office Action filed Jan. 16, 2014 in Chinese Patent Application No. 201110386149.4, with Summary of the Response and English Translation of the Pending Claims, 9 pages.
Second Office Action dated Apr. 17, 2014 in Chinese Patent Application No. 201110386149.4, with English Summary, 7 pages.
Response to Office Action filed Jun. 19, 2014 in Chinese Patent Application No. 201110386149.4, with Summary of the Response and English Translation of the Pending Claims, 13 pages.
Response to Office Action filed Sep. 16, 2013 in U.S. Appl. No. 12/941,825, 20 pages.
Final Office Action dated Dec. 31, 2013 in U.S. Appl. No. 12/941,825, 26 pages.
Response to Final Office Action dated Jun. 2, 2014 in U.S. Appl. No. 12/941,825, 17 pages.
Search Report dated Feb. 14, 2014 in European Patent Application No. 118401645, 3 pages.
Sheng Liu et al: "A Novel Prototype for an Optical See-Through Head-Mounted Display with Addressable Focus Cues", IEEE Transactions on Visualization and Computer Graphics, IEEE Service Center, Los Alamitos, CA, US, vol. 16, No. 3, May 1, 2010 pp. 381-393, XP011344617, ISSN: 1077-2626, 001: 10.11 09/TVCG.2009.95.
Rolland J P et al: "Dynamic Focusing in Head-Mounted Displays", Proceedings of SPIE, S PIE—International Society for Optical Engineering, US, vol. 3639, Jan. 25, 1999 pp. 463-470, XP008022044, ISSN: 0277-786X, 001: 10.1117/12.349412.
Andrew K. Kirby et al: "Adaptive lenses based on polarization modulation", Proceedings of SPIE, vol. 6018, Dec. 9, 2005, pp. 601814-601814-5, XP055101928, ISSN: 0277-786X, 001: 10.1117/12.669373.
Anonymous: "Lens (optics)—From Wikipedia, the free encyclopedia", , Oct. 18, 2010, pp. 1-6, XP055102319, Retrieved from the Internet: URL:http://en.wikipedia.org/w/index.php?title=Lens_(optics)&0ldid=391538808 [retrieved on Feb. 14, 2014].
Examination Report dated Mar. 10, 2014 in European Patent Application No. 118401645, 9 pages.
Responses to Office Action filed Jun. 9, 2014 in European Patent Application No. 118401645, 27 pages.
First Office Action dated Jan. 3, 2014 in Chinese Patent Application No. 201110364954.7, with English Summary, 13 pages.
Responses to Office Action filed May 13, 2014 in Chinese Patent Application No. 201110364954.7, with English Summary of the Response and English translation of the pending Claims, 7 pages.
Second Office Action dated Sep. 2, 2014 in Chinses Patent Application No. 201110364954.7, with English Summary, 7 pages.
Response to Office Action filed Oct. 1, 2013 in U.S. Appl. No. 12/970,695, 13 pages.
Final Office Action dated Jan. 16, 2014 in U.S. Appl. No. 12/970,695, 28 pages.
Response to Office Action filed Jul. 11, 2014 in U.S. Appl. No. 12/970,695, 12 pages.
First Office Action dated Feb. 12, 2014 in Chinese Patent Application No. 201110443987, with English Summary, 14 pages.
English Abstract of CN101026776A published Aug. 29, 2007, 2 pages.
Response to Office Action filed Jun. 27, 2014 in Chinese Patent Application No. 201110443987, with English language translation of the Amended claims, 17 pages.

Office Action dated Jul. 29, 2014 in Chinese Patent Application No. 201110443987, with English Summary of the Office Action, 10 pages.
Office Action dated Sep. 6, 2013 in U.S. Appl. No. 13/941,439, 13 pages.
Response to Office Action filed Nov. 14, 2013 in U.S. Appl. No. 131941,439, 10 pages.
Final Office Action dated Dec. 23, 2013 in U.S. Appl. No. 13/941,439, 14 pages.
Response to Office Action filed Mar. 24, 2014 in U.S. Appl. No. 13/941,439, 10 pages.
Notice of Allowance dated Apr. 2, 2014 in U.S. Appl. No. 13/941,439, 35 pages.
Notice of Allowance dated Sep. 5, 2014 in U.S. Appl. No. 13/941,439, 10 pages.
Response to Office Action filed Oct. 13, 2014 in Chinese Patent Application No. 201110443987, with English Summary of Arguments and Amended claims, 9 pages.
Search Report dated Apr. 16, 2015 in European Patent Application No. 11849398.0, 3 pages.
Office Action dated May 14, 2015 in U.S. Appl. No. 12/941,825, 37 pages.
Notice of Allowance dated Apr. 15, 2015 in U.S. Appl. No. 13/844,453, 19 pages.
Response to Office Action dated Feb. 10, 2015 with English translation of the amended claims in CN Patent Application No. 201110443987.0, 17 pages.
Notice of Allowance dated Apr. 2, 2015 with English translation of the allowed claims in CN Patent Application No. 201110443987.0, 8 pages.
Notice of Allowance dated Sep. 28, 2014 in Chinese Patent Application No. 201110386149.4, with partial English language translation and English Translation of the Allowed Claims, 8 pages.
Notice of Allowance dated Nov. 19, 2014 in U.S. Appl. No. 13/844,453, filed Mar. 15, 2013, 52 pages.
Response to Office Action dated Dec. 15, 2014 in U.S. Appl. No. 12/949,650, filed Nov. 18, 2010, 11 pages.
Notice of Allowance dated Jan. 7, 2015 in U.S. Appl. No. 12/949,650, filed Nov. 18, 2010, 8 pages.
Response to Office Action dated Nov. 17, 2014 in Chinese Patent Application No. 201110364954.7, with English language summary, 13 pages.
Office Action dated Dec. 3, 2014 in Chinese Patent Application No. 201110443987.0, with partial English language translation, 7 pages.
Office Action dated Apr. 9, 2015 in U.S. Appl. No. 12/949,650, filed Nov. 18, 2010, 27 pages.
Office Action dated Apr. 10, 2015 in Taiwan Patent Application No. 100134409, with partial English language translation, 12 pages.
Notice of Allowance with English translation dated Jan. 27, 2015 in Chinese Patent Application No. 201110364954.7, 10 pages.
Office Action with English translation dated Apr. 13, 2015 in Israel Patent Application No. 225874, 3 pages.
Office Action with English translation dated Apr. 13, 2015 in Israel Patent Application No. 225995, 3 pages.
Response to Office Action dated Jul. 13, 2015 with English translation of amendments in Taiwan Patent Application No. 100134409, 82 pages.
Response to Office Action dated Jul. 14, 2015 in European Patent Application No. 11849398.0, 18 pages.
Notice of Allowance dated Aug. 6, 2015 in U.S. Appl. No. 12/970,695, 48 pages.
Examination Report dated Jun. 9, 2015 in European Patent Application No. 11849398.0, 5 pages.
Response to Office Action dated Jul. 8, 2015 in U.S. Appl. No. 12/949,650, 10 pages.
Response to Office Action dated Jul. 10, 2015 in U.S. Appl. No. 12/941,825, 17 pages.
Notice of Allowance dated Dec. 3, 2015 in U.S. Appl. No. 12/949,650, 36 pages.
Notice of Allowance dated Dec. 8, 2015 in U.S. Appl. No. 12/941,825, 33 pages.

(56) References Cited

OTHER PUBLICATIONS

Office Action with English translation dated Sep. 28, 2015 in Japanese Patent Application No. 2013-539871, 9 pages.

Office Action with English translation of search dated Nov. 6, 2015 in Taiwan Patent Application No. 100140759, 11 pages.

Response to Office Action with English translation of amended claims dated Nov. 16, 2015 in Japanese Patent Application No. 2013-538778, 12 pages.

Response to Office Action with English translation of amended claims dated Jan. 19, 2016 in Japanese Patent Application No. 2013-539871, 7 pages.

Office Action with English translation dated Dec. 22, 2015 in Japanese Patent Application No. 2013-544548, 8 pages.

English translation of Ameded Claims as filed with Response to Office Action dated Feb. 2, 2016 in Taiwan Patent Application No. 100140759, 7 pages.

Notice of Allowance dated Feb. 23, 2016 in Japanese Patent Application No. 2013-539871, 3 pages.

* cited by examiner

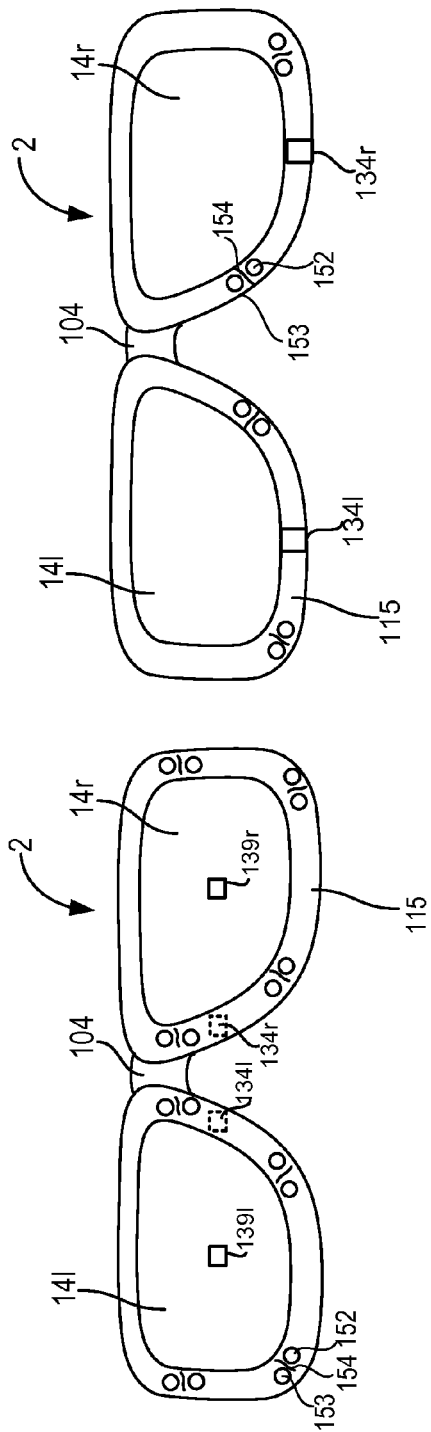
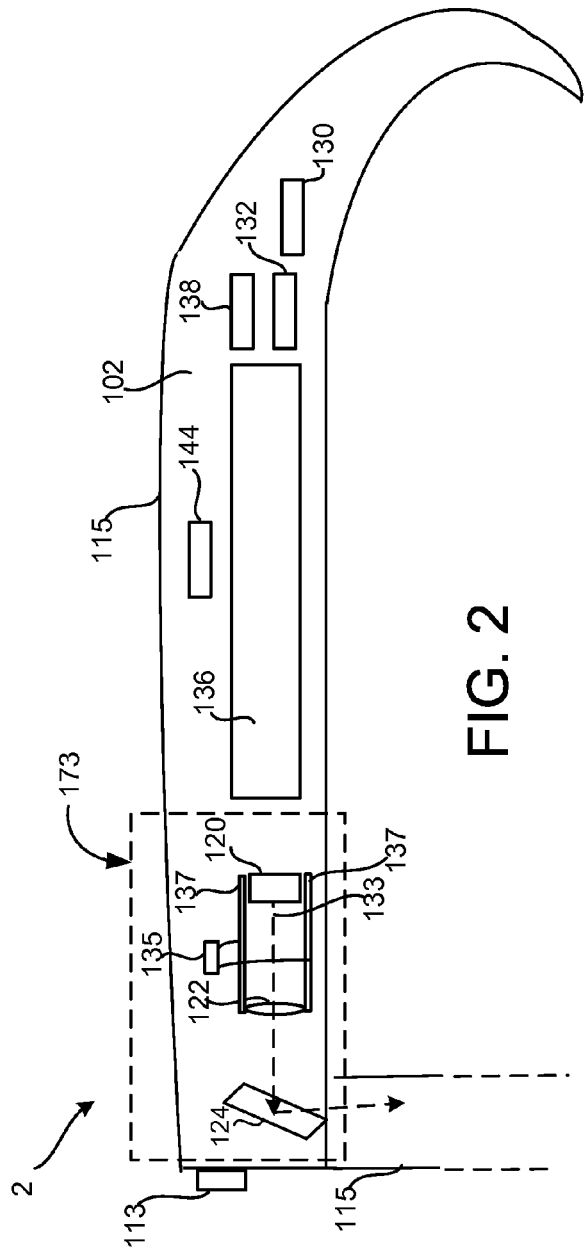
FIG. 1D
FIG. 1C
FIG. 2

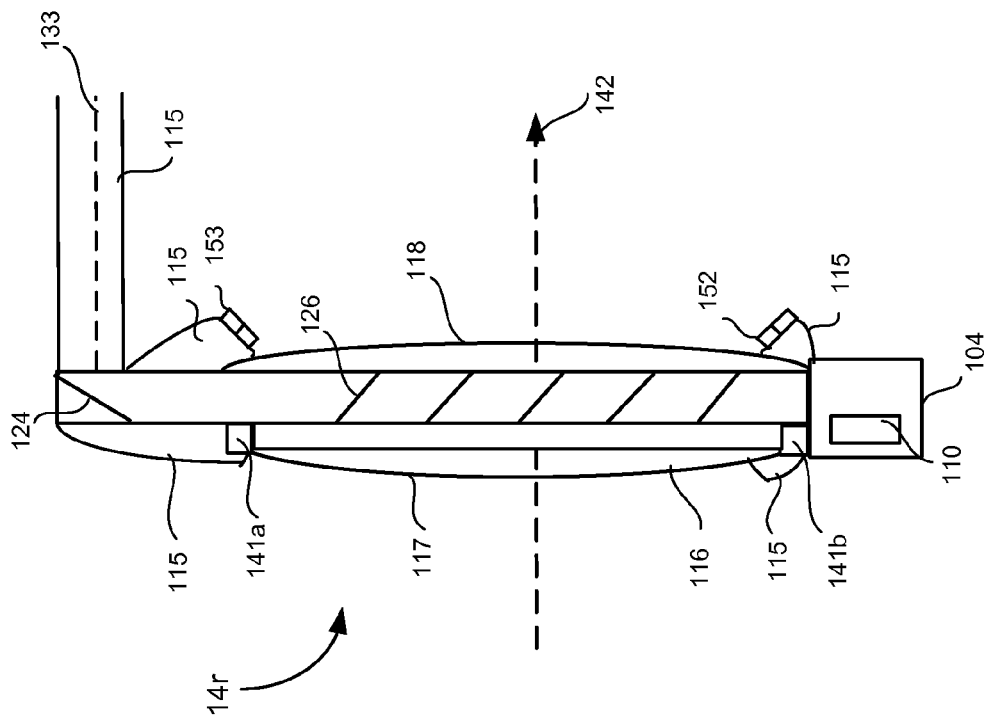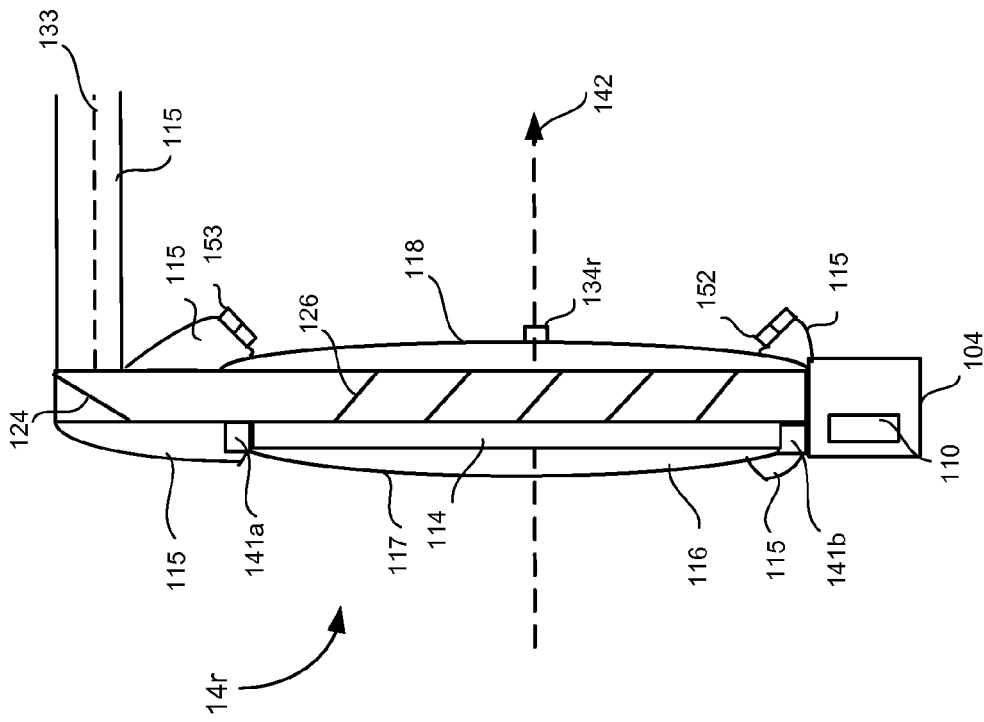

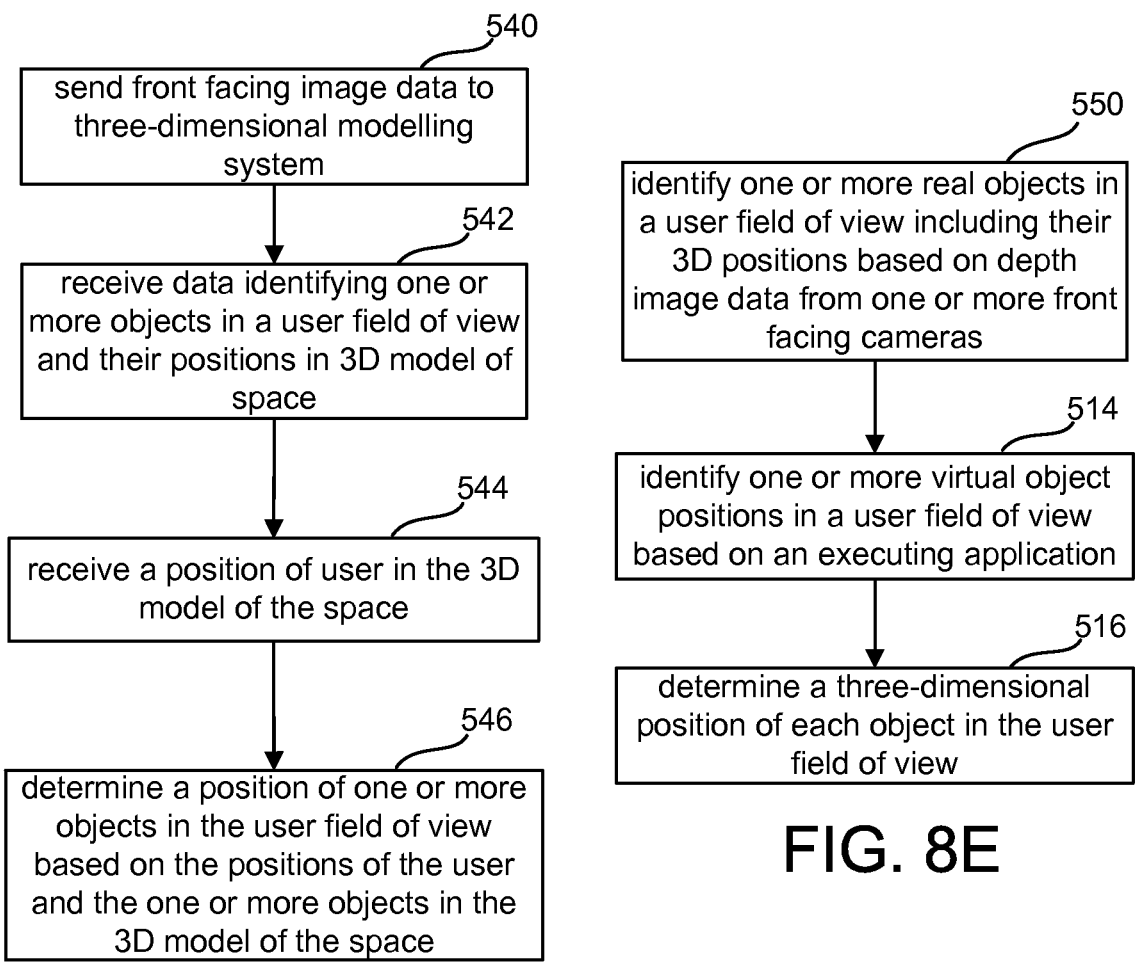

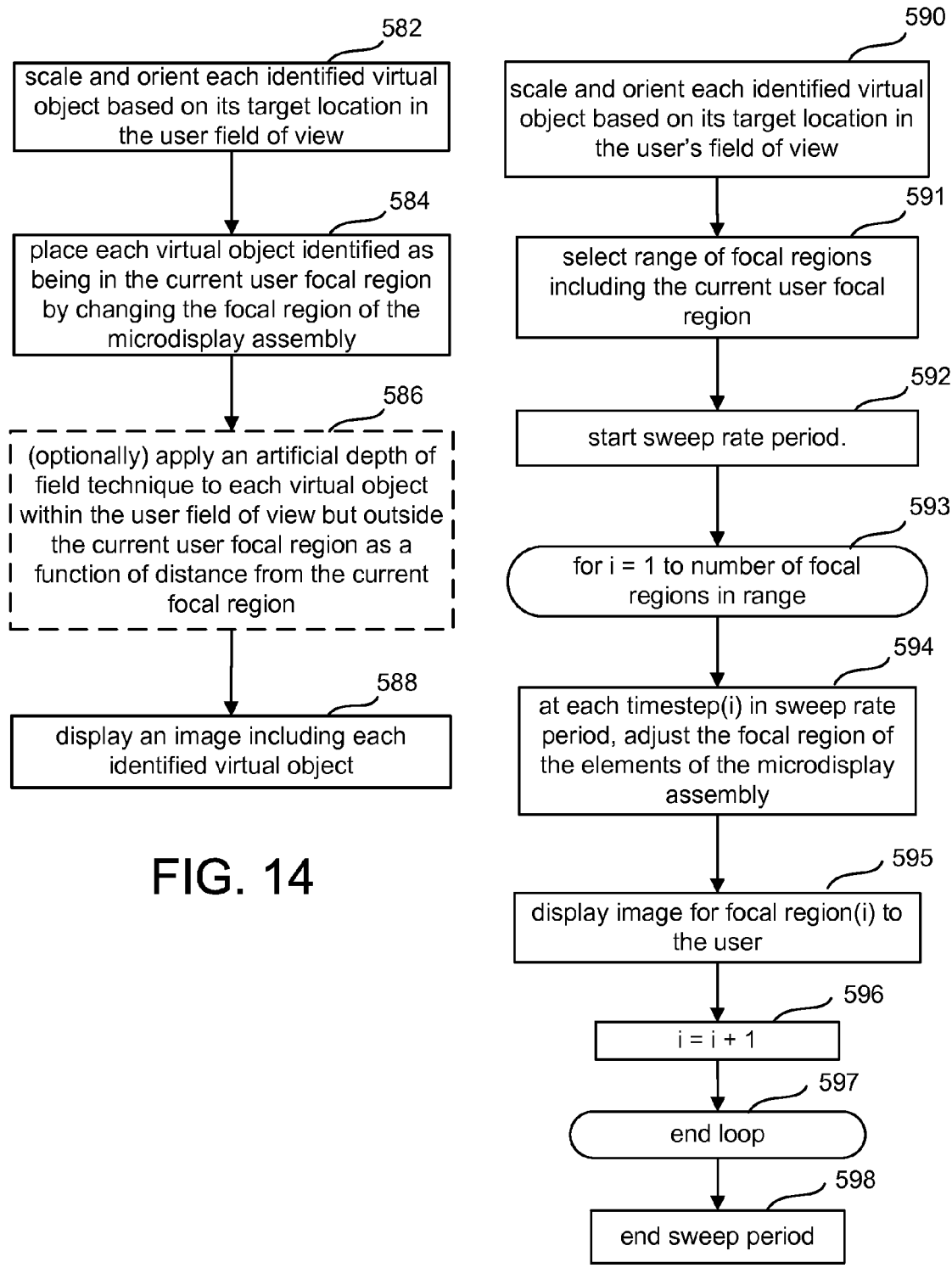

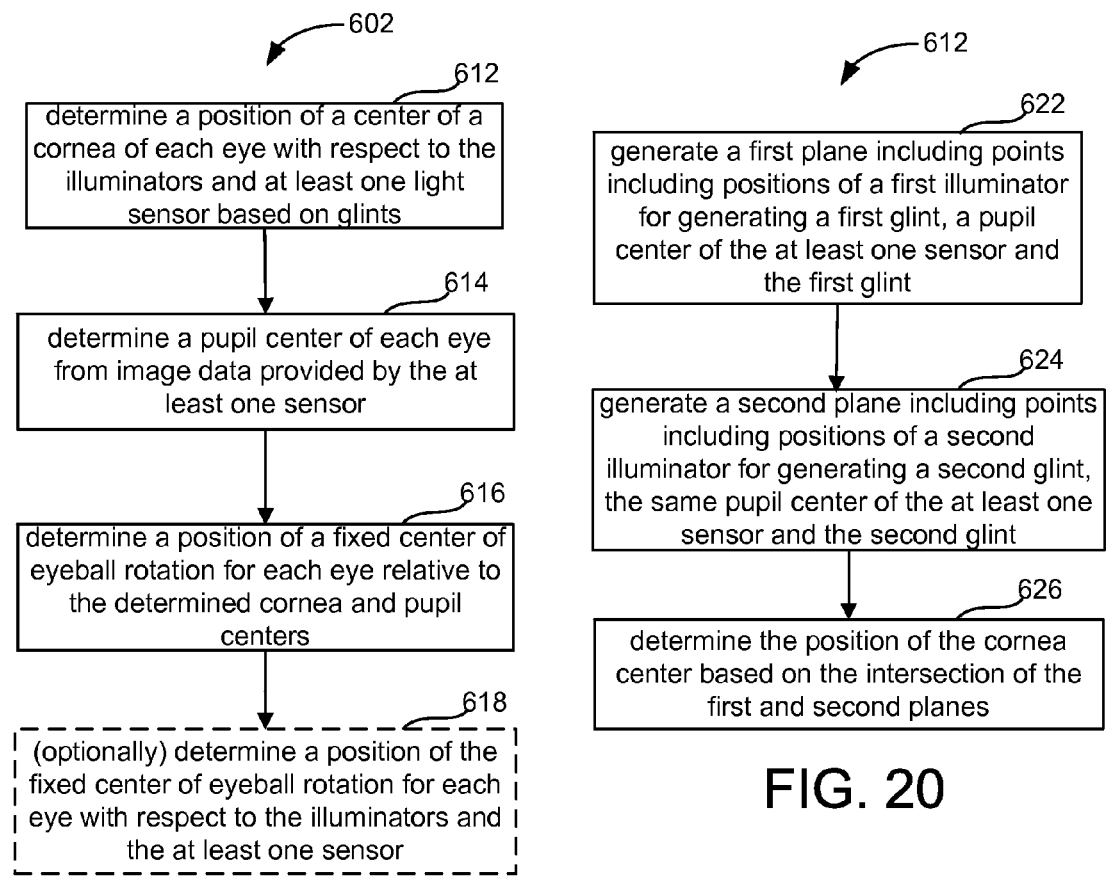
FIG. 19
FIG. 20
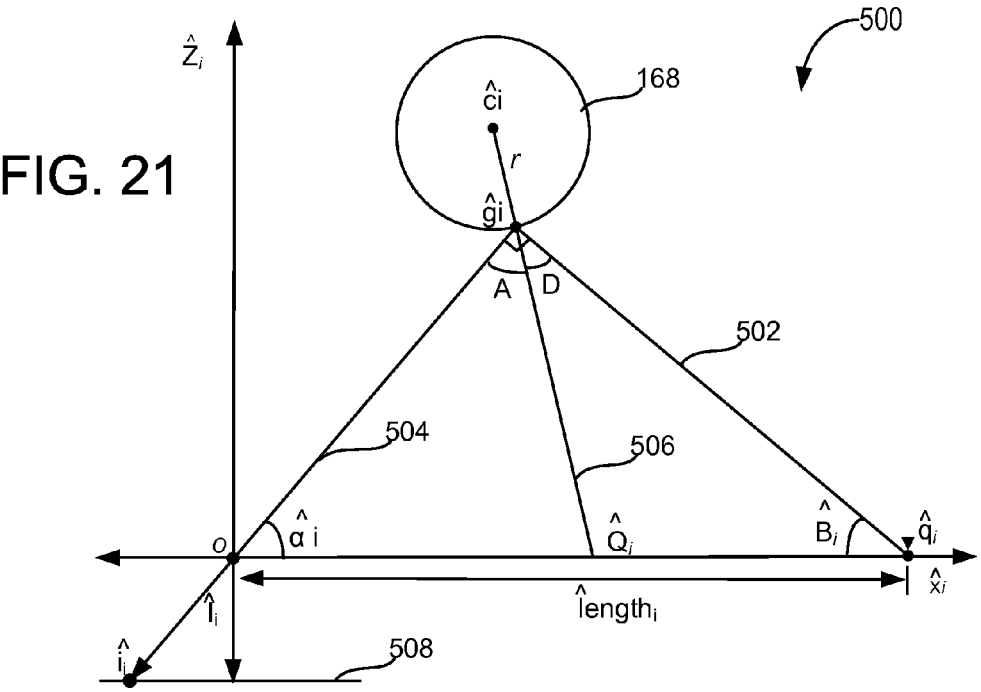
FIG. 21

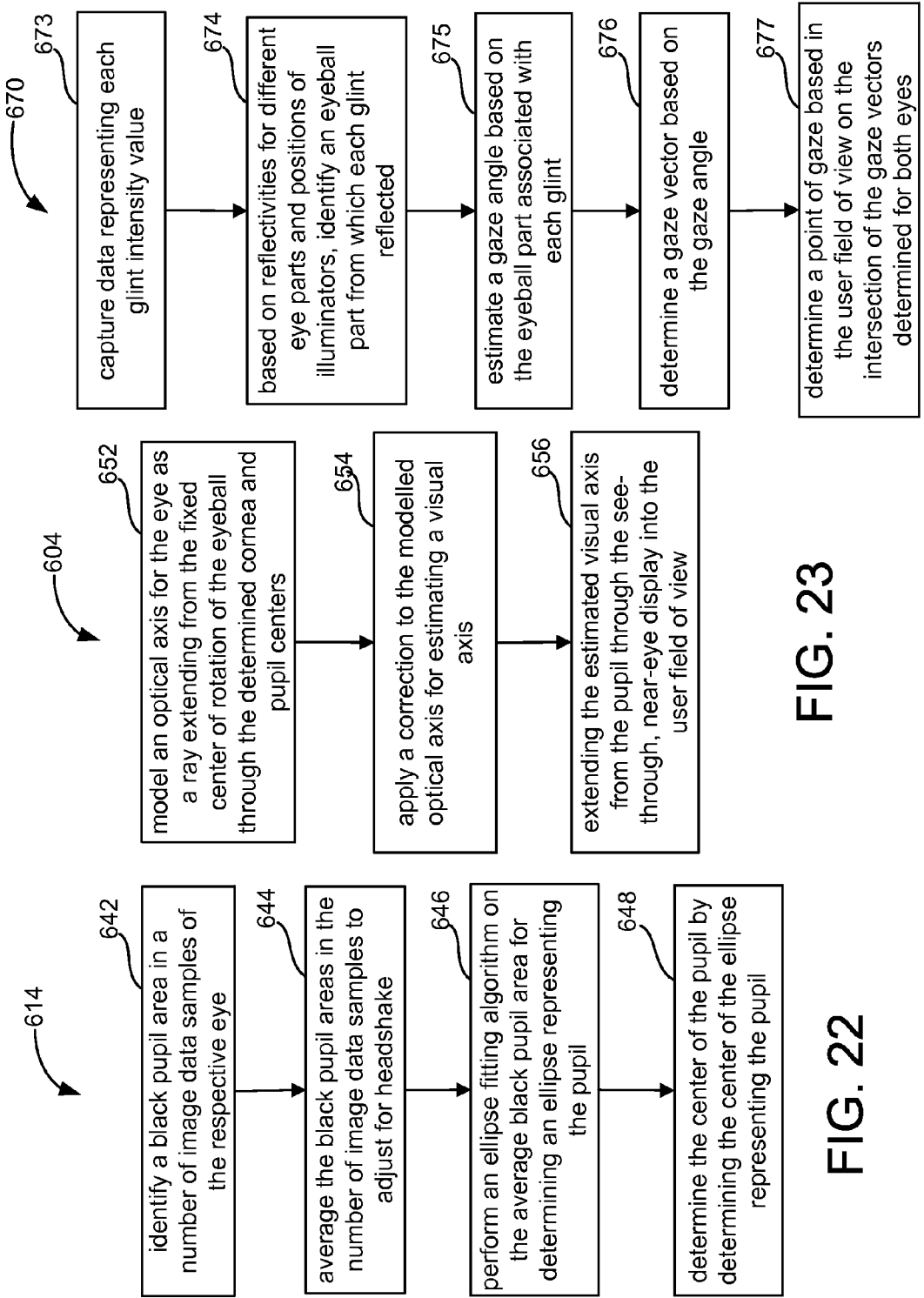

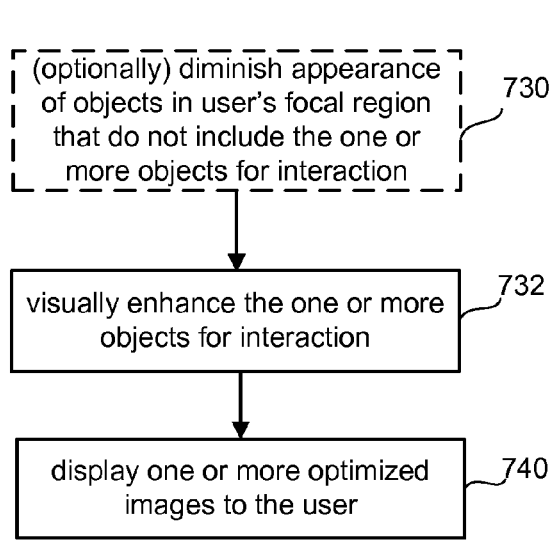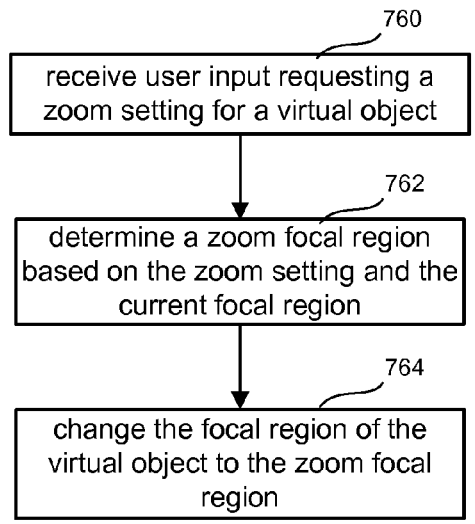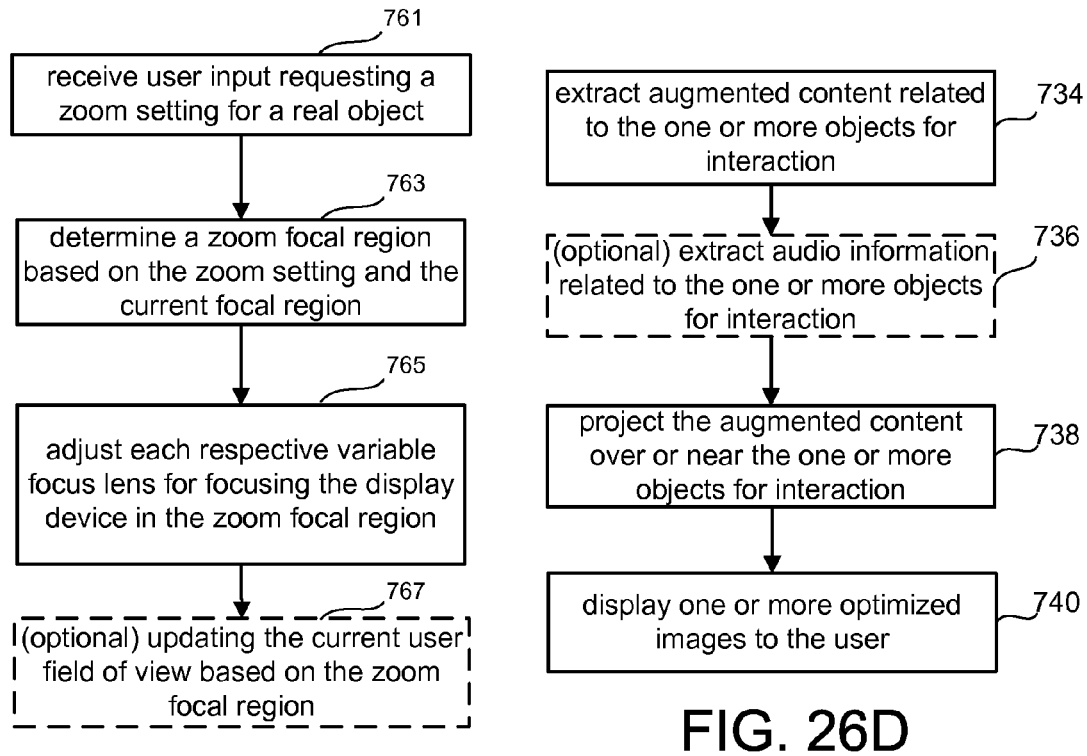
FIG. 26A
FIG. 26B
FIG. 26C
FIG. 26D

ENHANCING AN OBJECT OF INTEREST IN A SEE-THROUGH, MIXED REALITY DISPLAY DEVICE

BACKGROUND

Augmented reality is a technology that allows virtual imagery to be mixed with a real world physical environment or space. Typically, near-eye displays are worn by users to view the mixed imagery of virtual and real objects. Augmented reality is also referred to as mixed reality. Near-eye displays may use a combination of optics and stereopsis to focus virtual object imagery within the space at a fixed distance. The space may be a room or the outside world as a user walks down the street. The user's field of view and, specifically what he or she is looking at, keeps changing with eye and head movements. How virtual objects are selected for display and how they are displayed within a user field of view can be the difference between visual discomfort and distracting images marking a user experience and a user experience of seamless integration of virtual objects with real objects.

SUMMARY

Technology is provided for enhancing the user experience of a user wearing a see-through, near-eye, augmented reality display device. One or more embodiments provide for determining a current user focal region within a current user field of view based on a point of gaze determined from gaze vectors. One or more images is displayed including one or more virtual objects to appear as if at a respective focal region in the field of view for a natural sight view. In a natural sight view, as the current user focal region changes, the one or more virtual objects move in and out of focus like real objects do if the user viewed them with the naked eye. One or more real or virtual objects of interest are identified. For example, the user intent to interact with an object may be determined from a gaze duration with respect to the object. In some instances, content related to the object is retrieved and projected over or next to the object. In other examples, the object is visually enhanced in appearance by adjusting its focal region.

The technology provides an embodiment of a see-through, near-eye, augmented reality display system comprising a see-through, near-eye, augmented reality display device. For each eye, the device comprises a respective display optical system positioned to be seen through by the respective eye. At least one image generation unit is attached to the see-through display device for generating an image and having an optical alignment with at least one of the display optical systems. The at least one image generation unit has a variable focal length. For each display optical system, there is a respective arrangement of gaze detection elements including illuminators for generating glints and a detection area of at least one sensor for detecting glints and generating eye data.

One or more processors are communicatively coupled to the image generation unit and the at least one sensor and have access to a memory for storing software and data including the eye data. Under the control of software, the one or more processors determine a current user focal region based on the eye data in a current user field of view and identifies one or more virtual objects having a target location in the current user field of view. The one or more processors controls the image generation unit for creating one or more images in which each of the one or more virtual objects appear at a respective focal region in the current user field of view for a natural sight view.

The technology further provides an embodiment of a method for generating an optimized image based on an object of interest in a system including a see-through, near-eye mixed reality display device. The method comprises determining a current user field of view of a user wearing the see-through, near-eye, mixed reality device. The field of view includes one or more real objects. A gaze vector is determined for each user eye based on an arrangement of gaze detection elements in fixed positions with respect to each other on a respective display optical system for each eye of the display device. A current user focal region is determined based on the gaze vectors within the current user field of view. One or more images is displayed including one or more virtual objects appearing at a respective focal region in the current user field of view for a natural sight view.

An object of interest is identified by determining a user intent to interact with the object in the current user focal region. An optimized image is generated based on the object of interest. The optimized image is displayed to the user via the see-through display device.

The technology further provides an embodiment of a method for enhancing a display view of an object of interest in a see-through, near-eye mixed reality display device. The method comprises the steps of the method embodiment above of determining a current user field of view, determining a gaze vector for each user eye based on an arrangement of gaze detection elements, determining a current user focal region and displaying one or more images including one or more virtual objects appearing at a respective focal region in the current user field of view for a natural sight view. The method further comprises identifying an object of interest to the user in the current user field of view and visually enhancing an appearance of the object of interest by adjusting a focal region of the object in the display view of the see-through, near-eye, mixed reality display device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1C illustrates an exemplary arrangement of positions of respective sets of gaze detection elements in a gaze detection system for each eye positioned facing each respective eye on a mixed reality display system embodied in a set of eyeglasses.

FIG. 1D illustrates another exemplary arrangement of positions of respective sets of gaze detection elements in a gaze detection system for each eye positioned facing each respective eye by the set of eyeglasses.

FIG. 2 is a side view of an eyeglass temple in an embodiment of a mixed reality display device providing support for hardware and software components.

FIG. 3C is a top view of a third embodiment of a display optical system of the mixed reality device of FIG. 2 including an arrangement of gaze detection elements in a gaze detection system.

FIG. 3D is a top view of a fourth embodiment a display optical system of the mixed reality device of FIG. 2 including an arrangement of gaze detection elements in a gaze detection system.

FIG. 8D is a flowchart of a method embodiment for identifying one or more objects in a user field of view.

FIG. 8E is a flowchart of a method embodiment for identifying one or more objects in a user field of view.

FIG. 14 is a flowchart of an implementation example of a process for displaying each identified virtual object to appear at a respective focal region for a natural sight view.

FIG. 15 is a flowchart of another implementation example of a process for displaying each identified virtual object to appear at a respective focal region for a natural sight view.

FIG. 19 is a flowchart of a method embodiment which may be used to determine boundaries for a gaze detection coordinate system.

FIG. 20 is a flowchart illustrating a method embodiment for determining a position of a center of a cornea in the coordinate system with optical gaze detection elements of the see-through, near-eye, mixed reality display.

FIG. 21 provides an illustrative example of defining a plane using the geometry provided by the arrangement of optical elements to form the gaze detection coordinate system which may be used by the embodiment of FIG. 20 to find the cornea center.

FIG. 22 is a flowchart illustrating a method embodiment for determining a pupil center from image data generated by a sensor.

FIG. 23 is a flowchart illustrating a method embodiment for determining a gaze vector based on the determined centers for the pupil, the cornea and a center of rotation of an eyeball.

FIG. 24 is a flowchart illustrating a method embodiment for determining gaze based on glint data.

FIG. 26A is a flowchart describing one embodiment of a process for generating an optimized image with one or more objects based on the user's intent to interact with them and displaying the optimized image to the user via the see-through, near-eye display device.

FIG. 26B is a flowchart describing one embodiment of a process for visually enhancing a virtual object by zooming the object for an optimized image.

FIG. 26C is a flowchart describing one embodiment of a process for visually enhancing a real object by zooming the display view of the see-through, mixed reality display device.

FIG. 26D is a flowchart describing one embodiment of a process for displaying additional augmented content for an object, based on determining the user's intent to interact with the object.

DETAILED DESCRIPTION

Technology is disclosed by which a user's experience is enhanced when using a see-through, near eye mixed reality display device. A user looks at a scene via a near eye display device such as a head mounted display device in the form of eyeglasses. The user's field of view, which is a portion of the environment or space that the user may observe at a current head position, is determined and real objects in the user field of view are identified. One or more virtual objects are identified for display based on determining where they are in the current user field of view in accordance with an executing application. A current user focal region is determined based on a point of gaze which is determined based upon a gaze vector from each eye. One or more processors control an image generation unit of the display device for generating one or more images including each of the identified one or more virtual objects at a respective focal region in the current user field of view for a natural sight view.

Furthermore, an object of possible interest within the current user field of view may be identified as an object with which the user wishes to interact. The intent may be explicitly expressed, for example via a user physical action such as a gesture or voice command, but may also be inferred, for example based on a gaze duration derived from detecting the user's eye movement patterns in the user's focal region and noting a threshold time period that a user is focused on one or more objects. In another example, the user's intent to interact with one or more objects is automatically determined by accessing user-specific information related to the user and environmental factors such as the time of day, location, and external inputs may also be used as a basis for determining intent. An optimized image is generated based on the user's intent to interact with one or more objects. The optimized image is displayed to the user via the see-through, near-eye, augmented reality display device. Visual content, audio content or both may be projected over or next to the one or more objects with which the user wishes to interact in the current user focal region. In other examples, the optimized image may include one or more of an enhanced appearance of objects in the user's focal region, and a diminished appearance of objects outside the user's focal region but within the user's field of view. In some examples, the appearance of the one or more objects that the user intends to interact with may be visually enhanced by adjusting a focal region of the one or more objects. Any one or more of such enhancements may be used in combination.

Figure 1A:
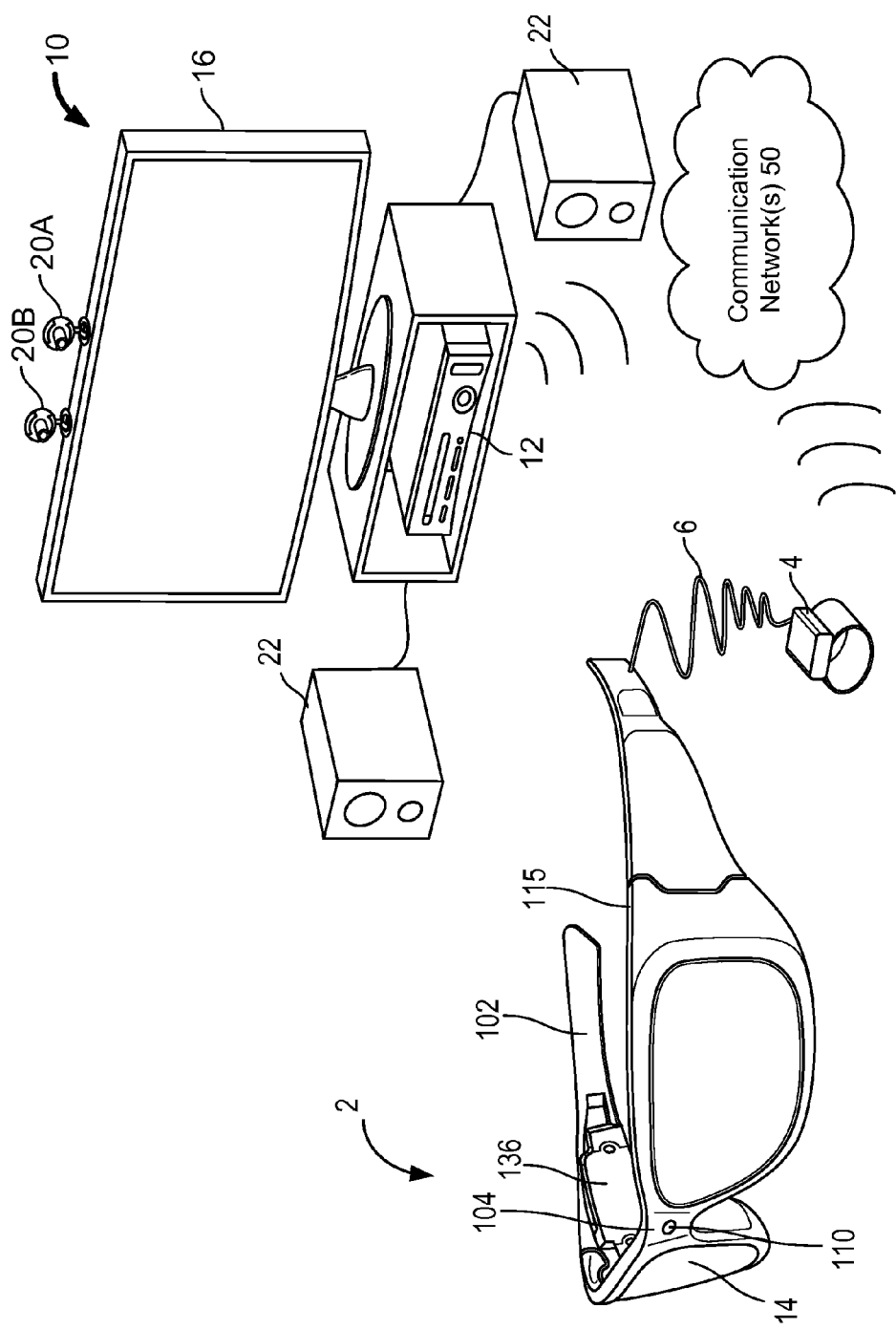
FIG. 1A is a block diagram depicting example components of one embodiment of a see-through, mixed reality display device.

FIG. 1A is a block diagram depicting example components of one embodiment of a mixed reality display system. System 10 includes a see-through display device as a near-eye, head mounted display device 2 in communication with processing unit 4 via wire 6. In other embodiments, head mounted display device 2 communicates with processing unit 4 via wireless communication. Processing unit 4 may take various embodiments. In some embodiments, processing unit 4 is a separate unit which may be worn on the user's body, e.g. the wrist in the illustrated example or in a pocket, and includes much of the computing power used to operate near-eye display device 2. Processing unit 4 may communicate wirelessly (e.g., WiFi, Bluetooth, infra-red, or other wireless communication means) to one or more hub computing systems 12. In other embodiments, the functionality of the processing unit 4 may be integrated in software and hardware components of the display device 2.

Head mounted display device 2, which in one embodiment is in the shape of eyeglasses in a frame 115, is worn on the head of a user so that the user can see through a display, embodied in this example as a display optical system 14 for each eye, and thereby have an actual direct view of the space in front of the user. The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images, on the display that are viewable by the person wearing the see-through display device while that person is also viewing real world objects through the display.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor or goggles. The frame 115 includes a temple or side arm for resting on each of a user's ears. Temple 102 is representative of an embodiment of the right temple. Nose bridge 104 of the frame includes a microphone 110 for recording sounds and transmitting audio data to processing unit 4. In one embodiment, processing unit 4 is worn on the user's wrist and includes much of the computing power used to operate near-eye display device 2. Processing unit 4 may communicate wirelessly (e.g., WiFi, Bluetooth, infra-red, 3G, 4G, cellular or other wireless communication means) to one or more hub computing systems 12.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. An application may be executing on hub computing system 12, the display device 2, as discussed below on a mobile device 5 or a combination of these.

Hub computing system 12 further includes one or more capture devices, such as capture devices 20A and 20B. In other embodiments, more or less than two capture devices can be used to capture the room or other physical environment of the user. Capture devices 20A and 20B may be, for example, cameras that visually monitor one or more users and the surrounding space such that gestures and/or movements performed by the one or more users, as well as the structure of the surrounding space, may be captured, analyzed, and tracked to perform one or more controls or actions within an application and/or animate an avatar or on-screen character.

Capture devices 20A and 20B may be depth cameras. According to an example embodiment, each capture device 20A, 20B may be configured to capture video with depth information including a depth image that may include depth values via any suitable technique including, for example, time-of-flight, structured light, stereo image, or the like. According to one embodiment, the capture device 20A, 20B may organize the depth information into "Z layers," or layers that may be perpendicular to a Z axis extending from the depth camera along its line of sight. The capture device 20A, 20B may include an image camera component which may include an IR light component, a three-dimensional (3-D) camera, and an RGB camera that may be used to capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera. Hub computing system 12 may be connected to an audiovisual device 16 such as a television, a monitor, a high-definition television (HDTV), or the like that may provide game or application visuals. In some instances, the audiovisual device 16 may be a three-dimensional display device. In one example, audiovisual device 16 includes internal speakers. In other embodiments, audiovisual device 16, a separate stereo or hub computing system 12 is connected to external speakers 22.

Figure 1B:
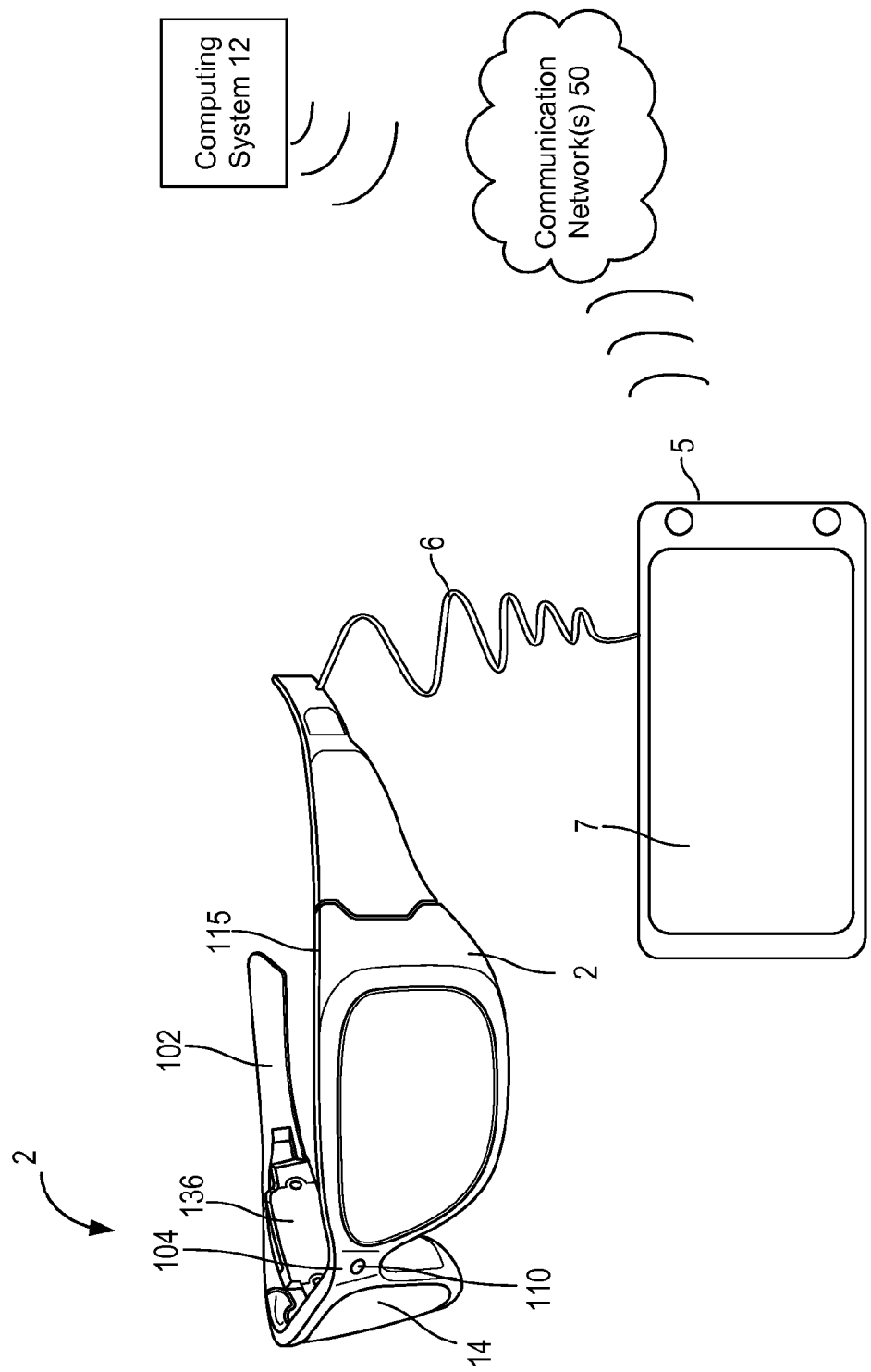
FIG. 1B is a block diagram depicting example components of another embodiment of a see-through, mixed reality display device.

FIG. 1B is a block diagram depicting example components of another embodiment of a see-through mixed reality display system. In this embodiment, the near-eye display device 2 communicates with a mobile computing device 5 as an example embodiment of the processing unit 4. In the illustrated example, the mobile device 5 communicates via wire 6, but communication may also be wireless in other examples.

Furthermore, as in the hub computing system 12, gaming and non-gaming applications may execute on a processor of the mobile device 5 which user actions control or which user actions animate an avatar as may be displayed on a display 7 of the device 5. The mobile device 5 also provides a network interface for communicating with other computing devices like hub computing system 12 over the Internet or via another communication network via a wired or wireless communication medium using a wired or wireless communication protocol. A remote network accessible computer system like hub computing system 12 may be leveraged for processing power and remote data access by a processing unit 4 like mobile device 5. Examples of hardware and software components of a mobile device 5 such as may be embodied in a smartphone or tablet computing device are described in FIG. 6 and these components can embody the hardware and software components of a processing unit 4 such as those discussed in the embodiment of FIG. 5. Some other examples of mobile devices 5 are a laptop or notebook computer and a netbook computer.

As noted above, in some embodiments, gaze detection of each of a user's eyes is based on a three dimensional coordinate system of gaze detection elements on a near-eye, mixed reality display device like the eyeglasses 2 in relation to one or more human eye elements such as a cornea center, a center of eyeball rotation and a pupil center. Examples of gaze detection elements which may be part of the coordinate system including glint generating illuminators and at least one sensor for capturing data representing the generated glints. As discussed below (see FIG. 21 discussion, a center of the cornea can be determined based on two glints using planar geometry. The center of the cornea links the pupil center and the center of rotation of the eyeball, which may be treated as a fixed location for determining an optical axis of the user's eye at a certain gaze or viewing angle.

FIG. 1C illustrates an exemplary arrangement of positions of respective sets of gaze detection elements in a gaze detection system for each eye positioned facing each respective eye by a see-through, near-eye, mixed reality display system embodied in a set of eyeglasses 2. What appears as a lens for each eye represents a display optical system 14 for each eye, e.g. 14r and 14l. A display optical system includes a see-through lens, e.g. 118 and 116 in FIGS. 3A-3D, as in an ordinary pair of glasses, but also contains optical elements (e.g. mirrors, filters) for seamlessly fusing virtual content with the actual and direct real world view seen through the lenses 118, 116. A display optical system 14 has an optical axis which is generally in the center of the see-through lens 118, 116 in which light is generally collimated to provide a distortionless view. For example, when an eye care professional fits an ordinary pair of eyeglasses to a user's face, a goal is that the glasses sit on the user's nose at a position where each pupil is aligned with the center or optical axis of the respective lens resulting in generally collimated light reaching the user's eye for a clear or distortionless view.

In the example of FIG. 1C, a detection area 139r, 139l of at least one sensor is aligned with the optical axis of its respective display optical system 14r, 14l so that the center of the detection area 139r, 139l is capturing light along the optical axis. If the display optical system 14 is aligned with the user's pupil, each detection area 139 of the respective sensor 134 is aligned with the user's pupil. Reflected light of the detection area 139 is transferred via one or more optical elements to the actual image sensor 134 of the camera, in this example illustrated by dashed line as being inside the frame 115.

In one example, a visible light camera also commonly referred to as an RGB camera may be the sensor, and an example of an optical element or light directing element is a visible light reflecting mirror which is partially transmissive and partially reflective.

The visible light camera provides image data of the pupil of the user's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera is not sensitive to the virtual image reflections on the eye.

In other examples, the at least one sensor 134 is an IR camera or a position sensitive detector (PSD) to which the IR radiation may be directed. For example, a hot reflecting surface may transmit visible light but reflect IR radiation. The IR radiation reflected from the eye may be from incident radiation of the illuminators 153, other IR illuminators (not shown) or from ambient IR radiation reflected off the eye. In some examples, sensor 134 may be a combination of an RGB and an IR camera, and the optical light directing elements may include a visible light reflecting or diverting element and an IR radiation reflecting or diverting element. In some examples, a camera may be small, e.g. 2 millimeters (mm) by 2 mm. An example of such a camera sensor is the Omnivision OV7727. In other examples, the camera may be small enough, e.g. the Omnivision OV7727, e.g. that the image sensor or camera 134 may be centered on the optical axis or other location of the display optical system 14. For example, the camera 134 may be embedded within a lens of the system 14. Additionally, an image filtering technique may be applied to blend the camera into a user field of view to lessen any distraction to the user.

In the example of FIG. 1C, there are four sets of an illuminator 153 paired with a photodetector 152 and separated by a barrier 154 to avoid interference between the incident light generated by the illuminator 153 and the reflected light received at the photodetector 152. To avoid unnecessary clutter in the drawings, drawing numerals are shown with respect to a representative pair. In this embodiment, two sets of illuminator 153 and photodetector 152 pairs are positioned near the top of each frame portion 115 surrounding a display optical system 14, and another two sets of illuminator and photodetector pairs are positioned near the bottom of each frame portion 115 for illustrating another example of a geometrical relationship between illuminators and hence the glints they generate. This arrangement of glints may provide more information on a pupil position in the vertical direction. Each illuminator may be an infra-red (IR) illuminator which generates a narrow beam of light at a predetermined wavelength. Each of the photodetectors may be selected to capture light at the predetermined wavelength. Infra-red may also include near-infrared. As there can be wavelength drift of an illuminator or photodetector or a small range about a wavelength may be acceptable, the illuminator and photodetector may have a tolerance range about a wavelength for generation and detection. In embodiments where the sensor is an IR camera or IR position sensitive detector (PSD), the photodetectors may be additional data capture devices and may also be used to monitor the operation of the illuminators, e.g. wavelength drift, beam width changes, etc. The photodetectors may also provide glint data with a visible light camera as the sensor 134.

As mentioned above, in some embodiments which calculate a cornea center as part of determining a gaze vector, two glints, and therefore two illuminators will suffice. However, other embodiments may use additional glints in determining a pupil position and hence a gaze vector. As eye data representing the glints is repeatedly captured, for example at 30 frames a second or greater, data for one glint may be blocked by an eyelid or even an eyelash, but data may be gathered by a glint generated by another illuminator.

FIG. 1D illustrates another exemplary arrangement of positions of respective sets of gaze detection elements in a gaze detection system for each eye positioned facing each respective eye by the set of eyeglasses. In this example, the sensor 134r, 134l itself is in line or aligned with the optical axis at the center of its respective display optical system 14r, 14l but located on the frame 115 below the system 14. Additionally, in some embodiments, the camera 134 may be a depth camera or include a depth camera. In this example, there are two sets of illuminators 153 and photodetectors 152.

FIG. 2 is a side view of an eyeglass temple 102 of the frame 115 in an embodiment of the see-through, mixed reality display device embodied as eyeglasses and providing support for hardware and software components. At the front of frame 115 is physical environment facing video camera 113 that can capture video and still images. Particularly in embodiments where the display device 2 is not operating in conjunction with depth cameras like capture devices 20a and 20b of the hub system 12, the physical environment facing camera 113 is a depth camera as well as a visible light sensitive camera. For example, the depth camera may include an IR illuminator transmitter and a hot reflecting surface like a hot mirror in front of the visible image sensor which lets the visible light pass and directs reflected IR radiation within a wavelength range or about a predetermined wavelength transmitted by the illuminator to a CCD or other type of depth sensor. The data from the sensors may be sent to the processing unit 4,5 which may process them but which may also send to a computer system over a network or hub computing system 12 for processing. The processing identifies and maps the user's real world field of view. Additionally, the physical environment facing camera 113 may also include a light meter for measuring ambient light. A change of a certain amount may trigger a message for recalibration of training gaze data sets in some embodiments as discussed further below.

Control circuits 136 provide various electronics that support the other components of head mounted display device 2. More details of control circuits 136 are provided below with respect to FIG. 4. Inside, or mounted to temple 102, are ear phones 130, inertial sensors 132 and temperature sensor 138. In one embodiment inertial sensors 132 include a three axis magnetometer 132A, three axis gyro 132B and three axis accelerometer 132C (See FIG. 4). The inertial sensors are for sensing position, orientation, and sudden accelerations of head mounted display device 2. From these movements, head position may also be determined.

The display device 2 provides an image generation unit which can create one or more images including one or more virtual objects. In some embodiments, a microdisplay may be used as the image generation unit. A microdisplay assembly 173 comprises light processing elements and a variable focus adjuster 135. An example of a light processing element is a microdisplay unit 120. Other examples include one or more optical elements such as one or more lenses of a lens system 122 and one or more reflecting elements such as surfaces 124a and 124b in FIGS. 3A and 3B or 124 in FIGS. 3C and 3D. Lens system 122 may comprise a single lens or a plurality of lenses.

Mounted to or inside temple 102, the microdisplay unit 120 includes an image source and generates an image of a virtual object. The microdisplay unit 120 is optically aligned with the lens system 122 and the reflecting surface 124 or reflecting surfaces 124a and 124b as illustrated in the following figures. The optical alignment may be along an optical axis 133 or an optical path 133 including one or more optical axes. The microdisplay unit 120 projects the image of the virtual object through lens system 122, which may direct the image light, onto reflecting element 124 which directs the light into light-guide optical element 112 as in FIGS. 3C and 3D or onto reflecting surface 124a (e.g. a mirror or other surface) which directs the light of the virtual image to a partially reflecting element 124b which combines the virtual image view along path 133 with the natural or actual direct view along the optical axis 142 as in FIGS. 3A-3D. The combination of views are directed into a user's eye.

The variable focus adjuster 135 changes the displacement between one or more light processing elements in the optical path of the microdisplay assembly or an optical power of an element in the microdisplay assembly. The optical power of a lens is defined as the reciprocal of its focal length, e.g. 1/focal length, so a change in one effects the other. The change in focal length results in a change in the region of the field of view which is in focus for an image generated by the microdisplay assembly 173.

In one example of the microdisplay assembly 173 making displacement changes, the displacement changes are guided within an armature 137 supporting at least one light processing element such as the lens system 122 and the microdisplay 120 in this example. The armature 137 helps stabilize the alignment along the optical path 133 during physical movement of the elements to achieve a selected displacement or optical power. In some examples, the adjuster 135 may move one or more optical elements such as a lens in lens system 122 within the armature 137. In other examples, the armature may have grooves or space in the area around a light processing element so it slides over the element, for example, microdisplay 120, without moving the light processing element. Another element in the armature such as the lens system 122 is attached so that the system 122 or a lens within slides or moves with the moving armature 137. The displacement range is typically on the order of a few millimeters (mm) In one example, the range is 1-2 mm. In other examples, the armature 137 may provide support to the lens system 122 for focal adjustment techniques involving adjustment of other physical parameters than displacement. An example of such a parameter is polarization.

For more information on adjusting a focal distance of a microdisplay assembly, see U.S. patent Ser. No. 12/941,825 entitled "Automatic Variable Virtual Focus for Augmented Reality Displays," filed Nov. 8, 2010, having inventors Avi Bar-Zeev and John Lewis and which is hereby incorporated by reference.

In one example, the adjuster 135 may be an actuator such as a piezoelectric motor. Other technologies for the actuator may also be used and some examples of such technologies are a voice coil formed of a coil and a permanent magnet, a magnetostriction element, and an electrostriction element.

There are different image generation technologies that can be used to implement microdisplay 120. For example, microdisplay 120 can be implemented using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the system described herein. Additionally, microdisplay 120 can be implemented using an emissive technology where light is generated by the display. For example, a PicoP™ engine from Microvision, Inc. emits a laser signal with a micro mirror steering either onto a tiny screen that acts as a transmissive element or beamed directly into the eye (e.g., laser).

As mentioned above, the configuration of the light processing elements of the microdisplay assembly 173 create a focal distance or focal region in which a virtual object appears in an image. Changing the configuration changes the focal region for the virtual object image. The focal region determined by the light processing elements can be determined and changed based on the equation $1/S1+1/S2=1/f$.

The symbol f represents the focal length of a lens such as lens system 122 in the microdisplay assembly 173. The lens system 122 has a front nodal point and a rear nodal point. If light rays are directed toward either nodal point at a given angle relative to the optical axis, the light rays will emerge from the other nodal point at an equivalent angle relative to the optical axis. In one example, the rear nodal point of lens system 122 would be between itself and the microdisplay 120. The distance from the rear nodal point to the microdisplay 120 may be denoted as S2. The front nodal point is typically within a few mm of lens system 122. The target location is the location of the virtual image to be generated by the microdisplay 120 in a three-dimensional physical space. The distance from the front nodal point to the target location of the virtual image may be denoted as S1. Since the image is to be a virtual image appearing on the same side of the lens as the microdisplay 120, sign conventions give that S1 has a negative value.

If the focal length of the lens is fixed, S1 and S2 are varied to focus virtual objects at different depths. For example, an initial position may have S1 set to infinity, and S2 equal to the focal length of lens system 122. Assuming lens system 122 has a focal length of 10 mm, consider an example in which the virtual object is to be placed about 1 foot or 300 mm into the user's field of view. S1 is now about −300 mm, f is 10 mm and S2 is set currently at the initial position of the focal length, 10 mm, meaning the rear nodal point of lens system 122 is 10 mm from the microdisplay 120. The new distance or new displacement between the lens 122 and microdisplay 120 is determined based on $1/(-300)+1/S2=1/10$ with all in units of mm. The result is about 9.67 mm for S2.

In one example, the processing unit 4,5 can calculate the displacement values for S1 and S2, leaving the focal length f fixed and cause the control circuitry 136 to cause a variable adjuster driver 237 (see FIG. 4) to send drive signals to have the variable virtual focus adjuster 135 move the lens system 122 along the optical path 133 for example. In other embodiments, the microdisplay unit 120 may be moved instead or in addition to moving the lens system 122. In other embodiments, the focal length of at least one lens in the lens system 122 may be changed instead or with changes in the displacement along the optical path 133 as well.

Figure 3A:
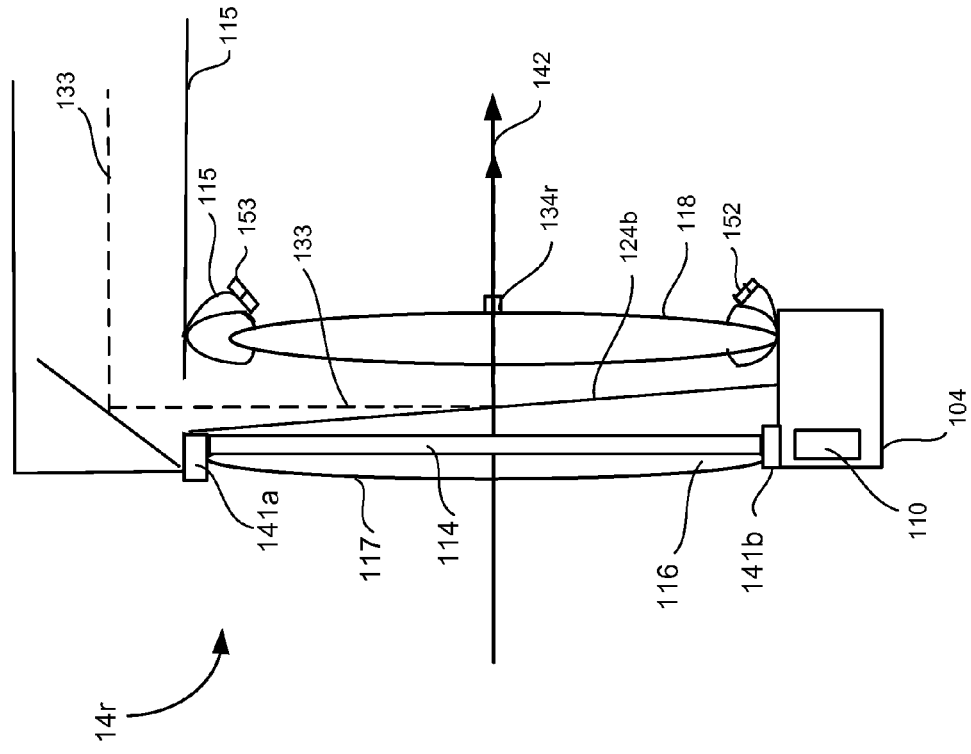
FIG. 3A is a top view of an embodiment of a display optical system of the mixed reality device of FIG. 2 including an arrangement of gaze detection elements in a gaze detection system.

FIG. 3A is a top view of an embodiment of a display optical system 14 of a see-through, near-eye, mixed reality device 2 including an arrangement of gaze detection elements in a gaze detection system. A portion of the frame 115 of the near-eye display device 2 will surround a display optical system including providing support for one or more lenses as illustrated. In order to show the components of the display system 14, in this case 14r for the right eye system, a top portion of the frame 115 surrounding the display optical system is not depicted.

The display optical system 14 in this embodiment has an optical axis 142 and includes see-through lenses 116 and 118. A see-through lens allows the user an actual direct view of the real world. In this example, the see-through lens 118 is a standard lens used in eye glasses and can be made to any prescription (including no prescription). In another embodiment, see-through lens 118 can be replaced by a variable prescription lens. In some embodiments, see-through, near-eye display device 2 will include additional lenses. In this embodiment, lens 116 is a variable focus lens. An example of a variable focus lens is a liquid lens. In this example, the lens includes a flexible surface 117 which can change its shape. For example it may be made more convex, made straight, or more concave. An example of a focal region adjustment unit 141 affecting the optical power or focal length of a liquid lens embodiment by affecting the radius of curvature is illustrated below in FIGS. 3E to 3F. The optical power of a lens is defined as the reciprocal of its focal length, e.g. 1/focal length so a change in one effects the other. In one example, lens 116 may be made of a clear film such as a version of Mylar®, and the liquid may be a silicone oil such as Dow-Corning DC-703 or DC-705.

The display optical system 14 further comprises representative partially reflecting surface 124b. In this embodiment, light from the microdisplay 120 is directed along optical path 133 via a partially reflective element 124b which combines the virtual image view traveling along optical path 133 with the natural or actual direct view along the optical axis 142 so that the combined views are directed into a user's eye at the optical axis, the position with the most collimated light for a clearest view.

Opacity filter 114 filters out natural light (either on a per pixel basis or uniformly) to enhance the contrast of the virtual imagery. In alternative embodiments, an opacity filter 114 may not be utilized. In one embodiment, the opacity filter can be a see-through LCD panel, electro chromic film, or similar device. When the system renders a scene for the augmented reality display, it takes note of which real-world objects are in front of which virtual objects. If a virtual object is in front of a real-world object, then the opacity should be on for the coverage area of the virtual object. If the virtual is (virtually) behind a real-world object, then the opacity should be off, as well as any color for that pixel, so the user will only see the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. More details of an opacity filter are provided in U.S. patent application Ser. No. 12/887,426, "Opacity Filter For See-Through Mounted Display," filed on Sep. 21, 2010, incorporated herein by reference in its entirety.

A detection area 139r of a light sensor is also part of the display optical system 14r. An optical element 125 embodies the detection area 139r by capturing reflected light from the user's eye received along the optical axis 142 and directs the captured light to the sensor 134r, in this example positioned in the bridge 104. As shown, the arrangement allows the detection area 139 of the sensor 134r to have its center aligned with the center of the display optical system 14. For example, if sensor 134r is an image sensor, sensor 134r captures the detection area 139, so an image captured at the image sensor is centered on the optical axis because the detection area 139 is. In one example, sensor 134r is a visible light camera or a combination of RGB/IR camera, and the optical element 125 includes an optical element which reflects visible light reflected from the user's eye, for example a partially reflective mirror. In other embodiments, the sensor 134r is an IR sensitive device such as an IR camera, and the element 125 includes a hot reflecting surface which lets visible light pass through it and reflects IR radiation to the sensor 134r. Another example of an IR sensor is a position sensitive device (PSD).

The depiction of the reflecting elements 125, 124, 124a and 124b in FIGS. 3A-3D are representative of their functions. The surfaces may take any number of forms and be implemented with one or more optical components in one or more arrangements for directing light to its intended destination such as a camera sensor or a user's eye. As shown, the arrangement allows the detection area 139 of the sensor to have its center aligned with the center of the display optical system 14. The image sensor 134r captures the detection area 139, so an image captured at the image sensor is centered on the optical axis because the detection area 139 is.

The display optical system 14 includes other gaze detection elements in this embodiment. Attached to frame 115 and on the sides of lens 118, are at least 2 but may be more, infra-red (IR) illuminating devices 153 which direct narrow infra-red light beams within a particular wavelength range or about a predetermined wavelength at the user's eye to each generate a respective glint on a surface of the user's cornea. In other embodiments, the illuminators and any photodiodes may be on the lenses, for example at the corners or edges. In this embodiment, in addition to the at least 2 infra-red (IR) illuminating devices 153 are IR photodetectors 152. Each photodetector 152 is sensitive to IR radiation within the particular wavelength range of its corresponding IR illuminator 153 across the lens 118 and is positioned to detect a respective glint. As shown in FIGS. 1C-1D, the illuminator and photodetector are separated by a barrier 154 so that incident IR light from the illuminator 153 does not interfere with reflected IR light being received at the photodetector 152. In the case where the sensor is an IR sensor, the photodetectors 152 may not be needed or may be an additional capture source. With a visible light camera, the photodetectors 152 capture light from glints and generate glint intensity values.

In some embodiments, sensor 134r may be an IR camera which captures not only glints, but also an infra-red or near-infra-red image of the user's eye including the pupil. In other embodiments, the sensor device 134r is a position sensitive device (PSD), sometimes referred to as an optical position sensor. The position of detected light on the surface of the sensor is identified. A PSD can be selected which is sensitive to a wavelength range of IR illuminators for the glints. When light within the wavelength range of the position sensitive device is detected on the sensor or light sensitive portion of the device, an electrical signal is generated which identifies the location on the surface of the detector. In some embodiments, the surface of a PSD is divided into discrete sensors like pixels from which the location of the light can be determined. In other examples, a PSD isotropic sensor may be used in which a change in local resistance on the surface can be used to identify the location of the light spot on the PSD. Other embodiments of PSDs may also be used. By operating the illuminators 153 in a predetermined sequence, the location of the reflection of glints on the PSD can be identified and hence related back to their location on a cornea surface.

Figure 3B:
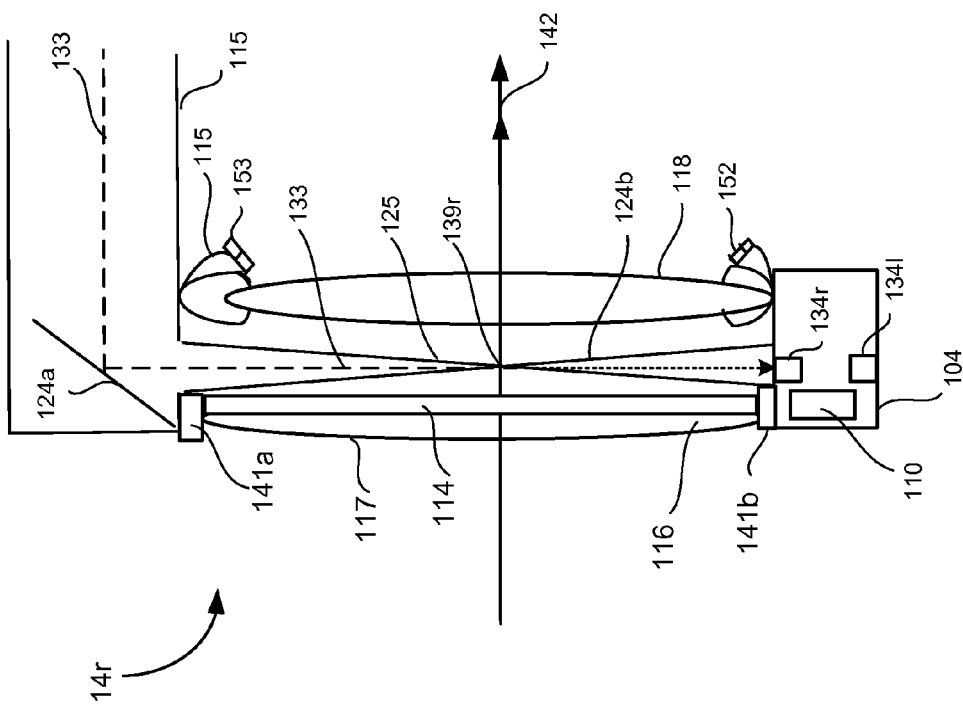
FIG. 3B is a top view of another embodiment of a display optical system of the mixed reality device of FIG. 2 including an arrangement of gaze detection elements in a gaze detection system.

FIG. 3B is a top view of another embodiment of a display optical system 14 of the mixed reality device 2 including an arrangement of gaze detection elements in a gaze detection system. In this embodiment, in addition to the at least 2 infra-red (IR) illuminating devices 153 are IR photodetectors 152. In this embodiment, the hot reflecting surface 125 has been removed to show operation without a position sensitive detector.

In the embodiments of FIGS. 3A-3D, the positions of the gaze detection elements, e.g. the detection area 139 and the illuminators 153 and photodetectors 152 are fixed with respect to each other. In these examples, they are also fixed in relation to the optical axis of the display optical system 14.

In the embodiment of FIG. 3B, light sensor 134r may be embodied as a visible light camera, sometimes referred to as an RGB camera, or it may be embodied as an IR camera or a camera capable of processing light in both the visible and IR ranges, e.g. a depth camera. In this example, the image sensor 134r is the detection area 139r, and the image sensor 134 of the camera is located vertically on the optical axis 142 of the display optical system. In some examples, the camera may be located on frame 115 either above or below see-through lens 118 or embedded in the lens 118. In some embodiments, the illuminators 153 provide light for the camera, and in other embodiments the camera captures images with ambient lighting or light from its own light source. Gaze determination techniques based on image data, glint data or both may be used based on the geometry of the gaze detection elements.

In one embodiment, glint reflections can estimate gaze based on a few data points of the intensity values detected for the glints, rather than processing much, much larger sets of image data of eyes. The position of the illuminators 153 on the eyeglass frame 115 or other support structure of a near-eye display device may be fixed so that the position of glints detected by one or more sensors is fixed in the sensor detection area. The cornea and hence the iris, sclera and the pupil rotate within the eyeball about a fixed center. The iris, pupil, and the sclera which is sometimes referred to as the white portion of the eyeball, move underneath the glint as the user's gaze changes. So a glint detected at a same sensor location may result in different intensity values due to different reflectivities associated with the different eye parts. As the pupil is a hole with tissue that absorbs most incoming light, the intensity value for it would be very low or near zero, while that for the iris would be a higher intensity value due to its higher reflectivity. An intensity value for the sclera may be highest as the sclera has the highest reflectivity. In some examples, an illuminator may be positioned as in FIGS. 3A through 3D on either side of the display optical system 14 and hence on either side of the pupil of the user's eye. In other embodiments, additional illuminators may be positioned on the frame 115 or lens 118, for example, four illuminators may be positioned to generate a surrounding geometric shape, e.g. a box, of glints on the eyeball which would be approximately centered on the pupil when a user is looking straight ahead. The microdisplay assembly 173 can display a virtual image or send a message, e.g. a visual virtual image or an audio instruction to a user to cause the user to look straight ahead for initializing the glints on or near the pupil. In other embodiments, gaze detection based on glints is based on intensity values generated from illuminators with the glint positioning being independent of being centered on the pupil.

FIG. 3C is a top view of a third embodiment of a display optical system 14 of the mixed reality device 2 including an arrangement of gaze detection elements in a gaze detection system. The display includes a light guide optical element 112 between see-through lenses 116 and 118. Lightguide optical element 112 channels artificial light to the eye.

Lightguide optical element 112 transmits light from microdisplay 120 to the eye of the user wearing head mounted display device 2. Lightguide optical element 112 also allows light from in front of the head mounted display device 2 to be transmitted through lightguide optical element 112 to the user's eye thereby allowing the user to have an actual direct view of the space in front of head mounted display device 2 in addition to receiving a virtual image from microdisplay 120. Thus, the walls of lightguide optical element 112 are see-through. Lightguide optical element 112 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar, substrate comprising light-guide optical element 112 by internal reflection.

After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye of the user. As different light rays will travel and bounce off the inside of the substrate at different angles, the different rays will hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a lightguide optical element can be found in United States Patent Application Publication 2008/0285140, Ser. No. 12/214,366, published on Nov. 20, 2008, "Substrate-Guided Optical Devices" incorporated herein by reference in its entirety. In one embodiment, each eye will have its own lightguide optical element 112. When the head mounted display device has two light guide optical elements, each eye can have its own microdisplay 120 that can display the same image in both eyes or different images in the two eyes. In another embodiment, there can be one lightguide optical element which reflects light into both eyes.

In this embodiment, as in FIG. 1D and one of the examples for FIG. 3B, the display optical system 14 is similarly arranged with IR illuminators 153 and photodetectors 152, and a visible light camera 134r located on the frame 115 or lens 118 below or above optical axis 142, typically at a center of lenses 116 and 118 supporting the lightguide optical element 112.

FIG. 3D is a top view of a fourth embodiment of a display optical system 14 of the mixed reality device 2 including an arrangement of gaze detection elements in a gaze detection system. This embodiment is similar to FIG. 3C's embodiment including a light guide optical element 112. However, the only light detectors are the IR photodetectors 152, so this embodiment relies on glint detection only for gaze detection as discussed in the examples below.

In the embodiments above, the specific number of lenses shown are just examples. Other numbers and configurations of lenses operating on the same principles may be used. Additionally, in the examples above, only the right side of the see-through, near-eye display 2 are shown. A full near-eye, mixed reality display device would include as examples another set of lenses 116 and/or 118, another opacity filter 114, another lightguide optical element 112 for the embodiments of FIGS. 3C and 3D, another microdisplay 120, another lens system 122, likely another environment facing camera 113, another eye tracking camera 134 for the embodiments of FIGS. 3A to 3C, earphones 130, and a temperature sensor 138.

Figure 3E:
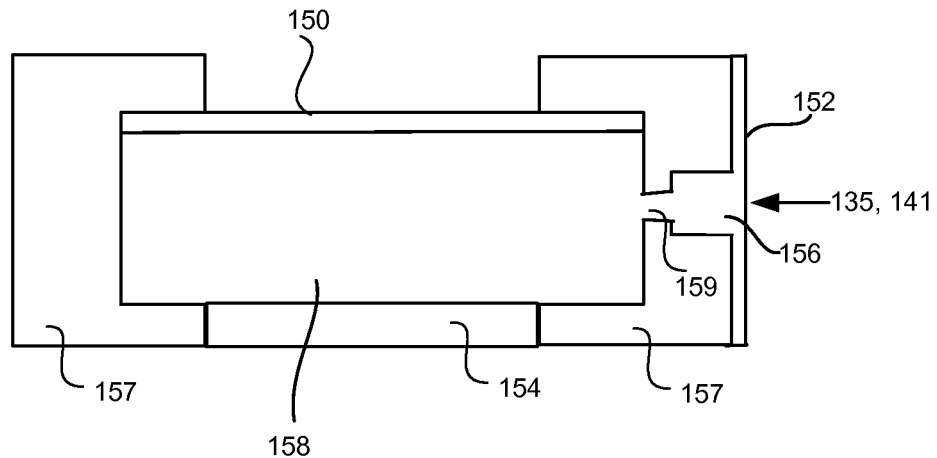
FIG. 3E and FIG. 3F are examples of a liquid lens exhibiting different radii of curvature under control of a focal region adjustment unit, the liquid lens being for use as a see-through variable focus lens.
Figure 3F:
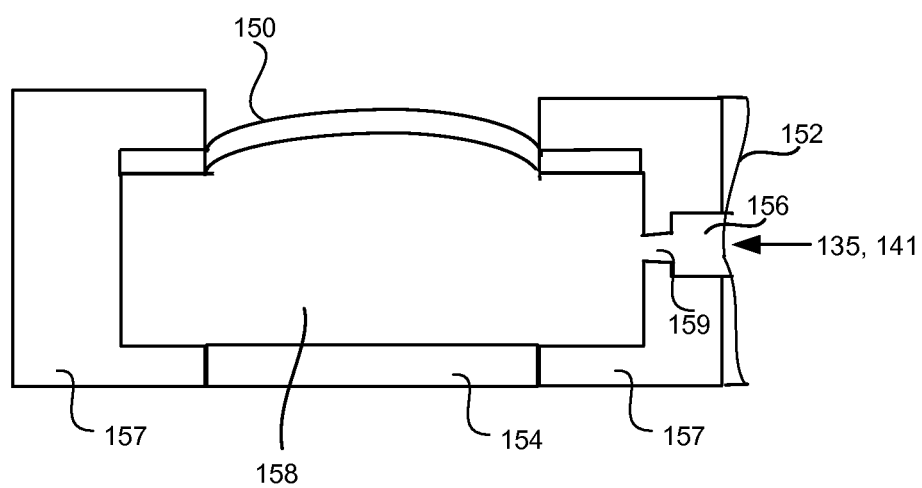

FIG. 3E and FIG. 3F are examples of a liquid lens exhibiting different radii of curvature under control of a focal region adjustment unit, the liquid lens being for use as a see-through variable focus lens. (See Hongwen et al., *Tunable-focus liquid lens controlled using a servo motor*, OPTICS EXPRESS, 4 Sep. 2006, Vol. 14, No. 18, pp. 8031-8036, hereafter "Hongwen" for more details and which is hereby incorporated by reference.) The liquid lens can be used as part of a microdisplay assembly or a see-through display lens. The focal length of the lens may be changed by changing the radius of curvature. The relationship between radius of curvature, R, and a focal length, f, is given by $f=R/n_{liquid}-1$. The refractive index of the liquid or liquid of the lens is $n_{liquid}$.

This embodiment comprises a support 157, for example an sealing ring having a flexible external membrane 152, in one example a rubber membrane, as a portion or connected to it. The external membrane 152 is in contact with a reservoir of liquid 156. A lens membrane 150 rests on top of or forms a flexible side of a liquid lens 158 which can receive from and release liquid into the reservoir 156 through a channel 159. In the cited example, the flexible lens membrane 150 is an elastic membrane such as polydimethylsiloxane (PDMS) elastomeric membrane. Glass plate 154 behind the liquid cell provides support. The pushing and releasing of membrane 152 causes the volume of water in the reservoir 156 to go into and out of the liquid lens 158 via the channel 159, thus convexing the elastic membrane 150 and relaxing the elastic membrane 150 due to the volume of liquid changes. Changes in the volume of liquid cause changes in the radius of curvature of the lens membrane 150 and thus in the focal length of the liquid lens 158. They relationship between the radius of curvature and the change in volume ΔV may be expressed as follows:

$$\Delta V = (1/3)\pi(2R^2 - r_0^2 - 2R\sqrt{R^2 - r_0^2})(2R + \sqrt{R^2 - r_0^2})$$

where $r_0$ is the radius of the lens aperture.

In the example of the microdisplay assembly 173 when the lens 122 is a variable focus lens, the armature 137 may provide the support structure 157 with or without the glass plate 154 as well as a flexible membrane portion 152 for the variable virtual focus adjuster 135 as controlled by control circuitry 136 to push against as shown in FIG. 3F and release (see FIG. 3E). Similarly, in the examples of FIG. 3A-3D including a see-through variable lens 116 being analogous to liquid lens 158 and its flexible surface 117 being analogous to membrane 150, the opacity filter 14 or the light guide element 112 may provide the analogous structural support of support structure of the glass plate 154. Each of the side supports 141a, 141b are analogous to the side walls 157 and may include a reservoir 156 and a flexible external membrane 152 which can be pushed and released against the reservoir 156 under the control of a driver of the control circuitry 136. The flexible membrane may be an actuator or motor such as a piezo-electric actuator or motor which can push and release under the control of a focal region unit driver 241. In other embodiments the channel 159 can be open and closed to adjust the volume of the liquid. Furthermore, pumps may be used instead of the flexible external membrane 152.

FIGS. 3E and 3F provide examples of adjusting the optical power of a variable focus liquid lens by mechanical adjustment. Other ways of adjusting the liquid lens may also be used. For example, electro-wetting may also be used to change the optical power of a liquid lens. See US2008/0117289 Schowengerdt et al. entitled Variable Fixation Viewing Distance Scanned Light Displays. Other ways of adjusting a variable focus lens may be used as well, and the variable focus lens may be embodied in other than liquid or fluid lenses as well.

Figure 4:
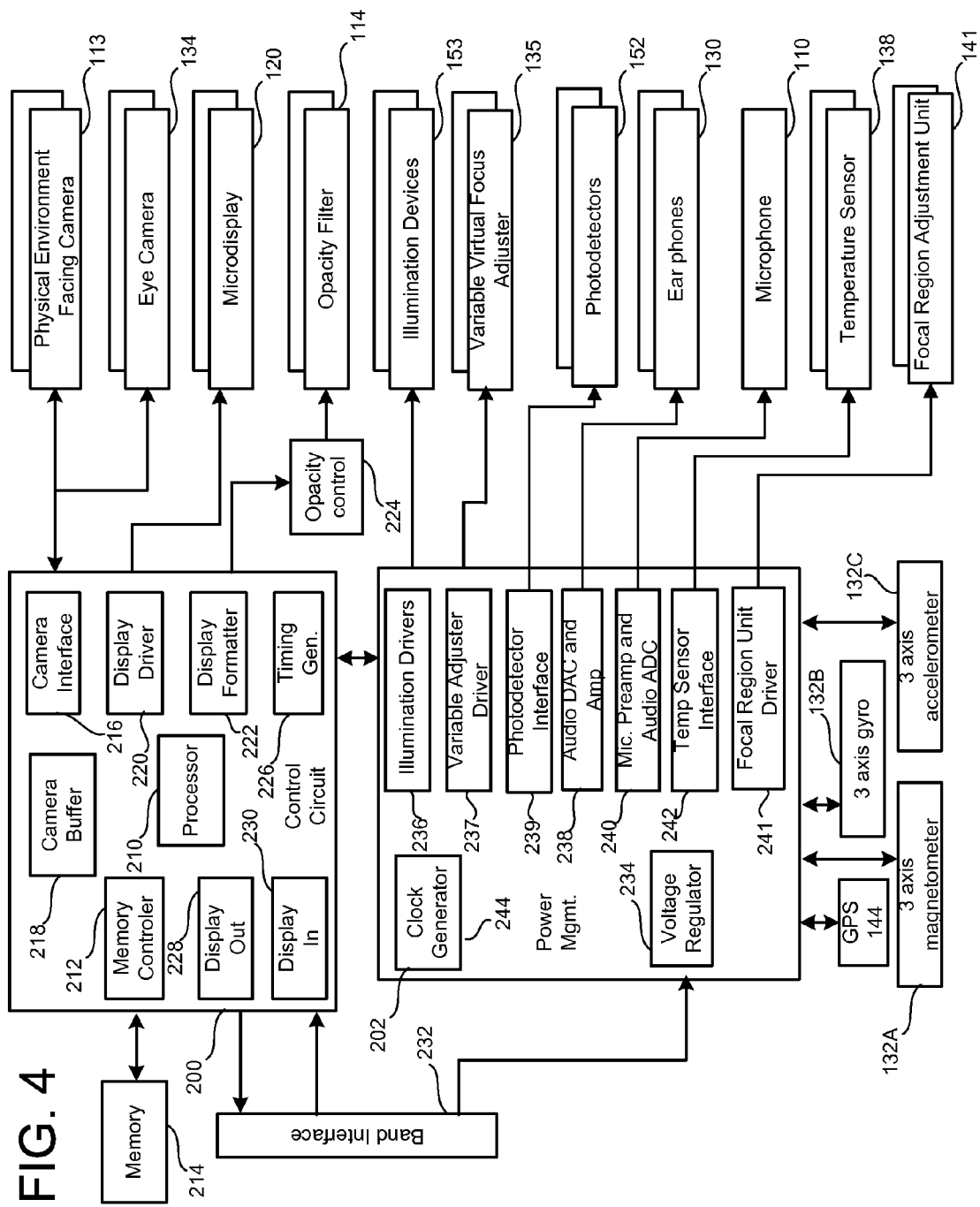
FIG. 4 is a block diagram of one embodiment of hardware and software components of a see-through, near-eye, mixed reality display unit as may be used for the embodiment of FIG. 2.
Figure 5:
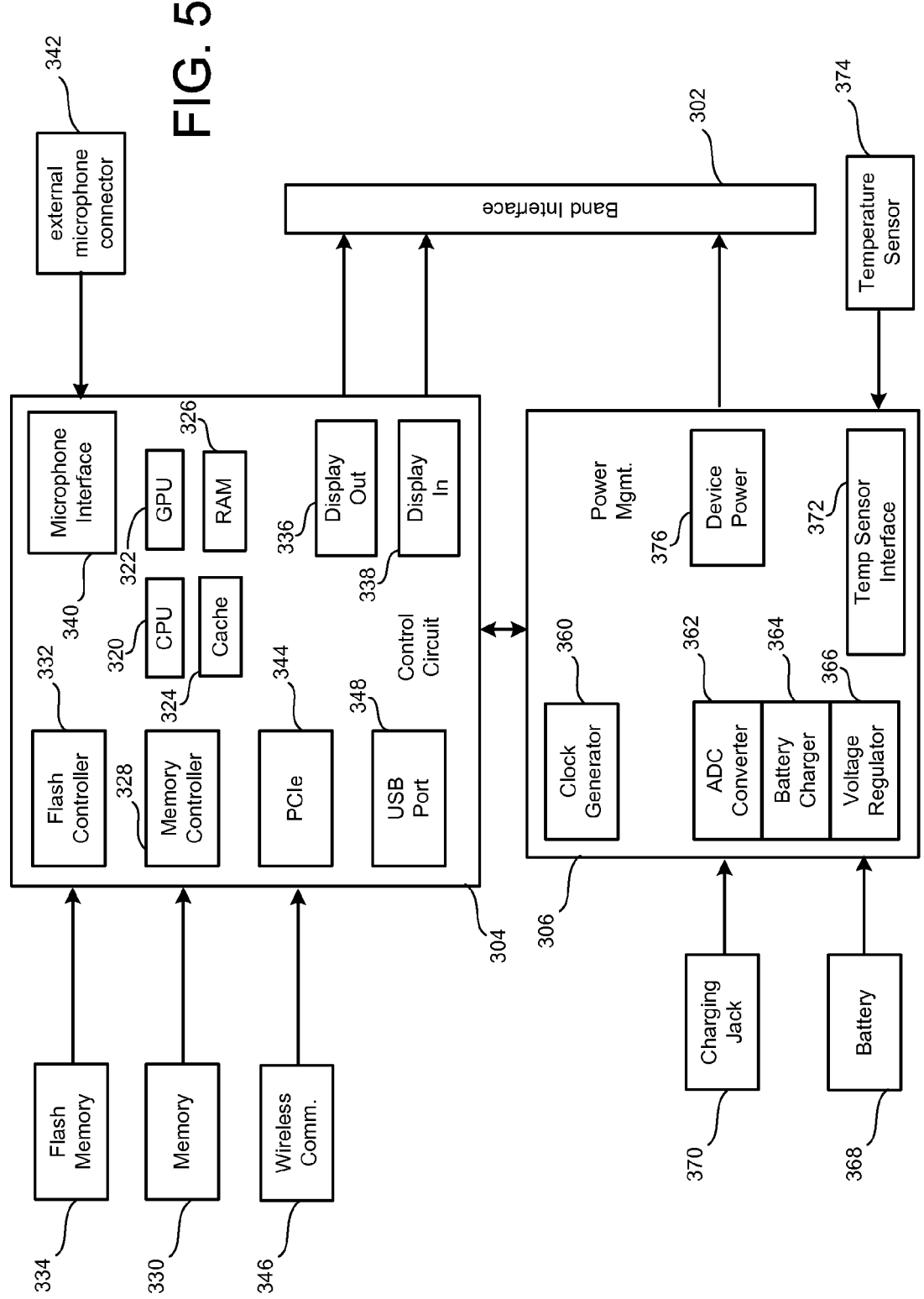
FIG. 5 is a block diagram of one embodiment of the hardware and software components of a processing unit associated with a see-through, near-eye display unit.

FIG. 4 is a block diagram of one embodiment of hardware and software components of a see-through, near-eye display unit 2 as may be used with the embodiments described in this disclosure. FIG. 5 is a block diagram describing the various components of processing unit 4. In this embodiment, near-eye display device 2, receive instructions about a virtual image from processing unit 4 and provides the sensor information back to processing unit 4. Processing unit 4, the components of which are depicted in FIG. 5, will receive the sensory information from the display device 2 and may also receive sensory information from hub computing device 12 (See FIG. 1). Based on that information, processing unit 4 will determine where and when to provide a virtual image to the user and send instructions accordingly to the control circuitry 136 of the display device 2.

Note that some of the components of FIG. 4 (e.g., physical environment facing camera 113, eye camera 134, variable virtual focus adjuster 135, photodetector interface 139, micro display 120, illumination device 153 or illuminators, earphones 130, and temperature sensor 138) are shown in shadow to indicate that there are two of each of those devices, one for the left side and one for the right side of head mounted display device 2. FIG. 4 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230. In one embodiment, all of components of control circuit 220 are in communication with each other via dedicated lines of one or more buses. In another embodiment, each of the components of control circuit 200 are in communication with processor 210.

Camera interface 216 provides an interface to the two physical environment facing cameras 113 and each eye camera 134 and stores respective images received from the cameras 113, 134 in camera buffer 218. Display driver 220 will drive microdisplay 120. Display formatter 222 may provide information, about the virtual image being displayed on microdisplay 120, to opacity control circuit 224, which controls opacity filter 114 and to one or more processors of one or more computer systems, e.g. 4, 5, 12, 210 performing processing for the augmented reality system. Timing generator 226 is used to provide timing data for the system. Display out 228 is a buffer for providing images from physical environment facing cameras 113 and the eye cameras 134 to the processing unit 4. Display in 230 is a buffer for receiving images such as a virtual image to be displayed on microdisplay 120. Display out 228 and display in 230 communicate with band interface 232 which is an interface to processing unit 4.

Power management circuit 202 includes voltage regulator 234, eye illumination driver 236, variable adjuster driver 237, focal region unit driver 241, photodetector interface 239, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Illumination driver 236 controls, for example via a drive current or voltage, the illumination devices 153 to operate about a predetermined wavelength or within a wavelength range. Audio DAC and amplifier 238 receives the audio information from earphones 130. Microphone preamplifier and audio ADC 240 provides an interface for microphone 110. Temperature sensor interface 242 is an interface for temperature sensor 138. Power management unit 202 also provides power and receives data back from three axis magnetometer 132A, three axis gyro 132B and three axis accelerometer 132C. Power management unit 202 also provides power and receives data back from and sends data to GPS transceiver 144.

The variable adjuster driver 237 provides a control signal, for example a drive current or a drive voltage, to the adjuster 135 to move one or more elements of the microdisplay assembly 173 to achieve a displacement for a focal region calculated by software executing in one or more processors such as the processor 210 of the control circuitry 136, or the processors 320, 322 of the processing unit 4, 5 or a processor (e.g. 801 below) of the hub computer 12 or a combination of these. In embodiments of sweeping through a range of displacements and, hence, a range of focal regions, the variable adjuster driver 237 receives timing signals from the timing generator 226, or alternatively, the clock generator 244 to operate at a programmed rate or frequency.

The photodetector interface 239 receives performs any analog to digital conversion needed for voltage or current readings from each photodetector 152, stores the readings in a processor readable format in memory via the memory controller 212, and monitors the operation parameters of the photodetectors 152 such as temperature and wavelength accuracy.

The focal region unit driver 241 provides a control signal, for example, a driver current or a drive voltage to the focal region adjustment unit 141, in a mechanical adjustment example, to move one or more elements of the unit 141 to change the optical power of the variable focus lens 116 based on an adjustment value calculated by software executing in the processing unit 4, 5 or the hub computer 12 or both. For example, a flexible membrane 152 of one of the side supports 141a, 141b including the reservoir 156 and channel 159 to the liquid in the lens 116 may be pushed or released by an actuator such as a piezo-electric actuator responding to the drive signal from the focal region unit driver 241.

FIG. 5 is a block diagram of one embodiment of the hardware and software components of a processing unit 4, 5 associated with a see-through, near-eye display unit. The mobile device 5 may include this embodiment of hardware and software components as well or similar components which perform similar functions. FIG. 5 shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with see-through, near-eye display device 2 via band interface 302 and band interface 232, display in buffer 338 in communication with near-eye display device 2 via band interface 302 and band interface 232, microphone interface 340 in communication with an external microphone connector 342 for connecting to a microphone, PCI express interface for connecting to a wireless communication device 346, and USB port(s) 348.

In one embodiment, wireless communication component 346 can include a Wi-Fi enabled communication device, Bluetooth communication device, infrared communication device, etc. The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to insert virtual images into the view of the user.

Power management circuit 306 includes clock generator 360, analog to digital converter 362, battery charger 364, voltage regulator 366, see-through, near-eye display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the display device 2.

Figure 6:
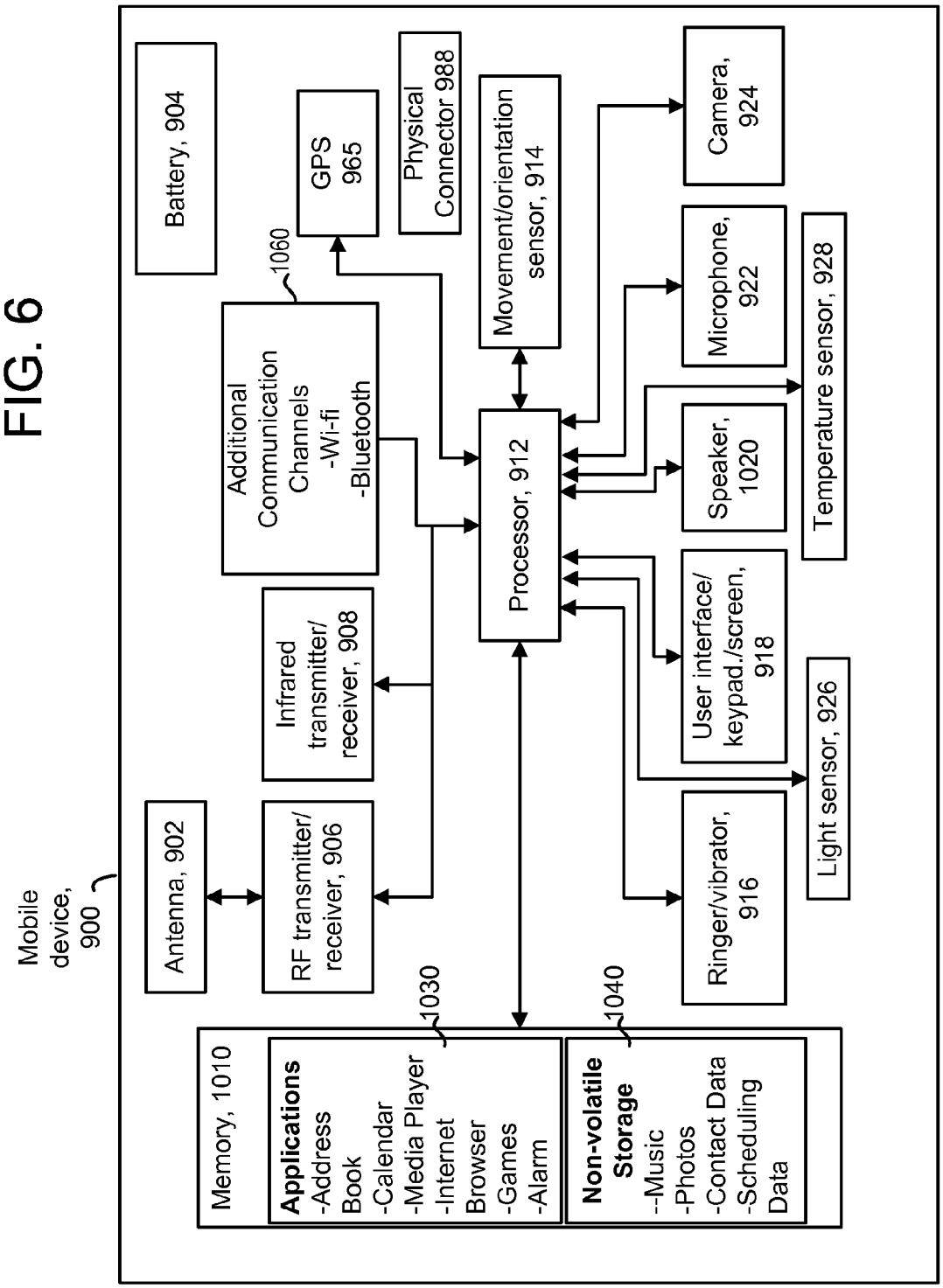
FIG. 6 is a block diagram of an exemplary mobile device which may operate in embodiments of the technology.

FIG. 6 is a block diagram of an exemplary mobile device which may operate in embodiments of the technology. Exemplary electronic circuitry of a typical mobile phone is depicted. The phone 900 includes one or more microprocessors 912, and memory 1010 (e.g., non-volatile memory such as ROM and volatile memory such as RAM) which stores processor-readable code which is executed by one or more processors of the control processor 912 to implement the functionality described herein.

Mobile device 900 may include, for example, processors 912, memory 1010 including applications and non-volatile storage. The processor 912 can implement communications, as well as any number of applications, including the interaction applications discussed herein. Memory 1010 can be any variety of memory storage media types, including non-volatile and volatile memory. A device operating system handles the different operations of the mobile device 900 and may contain user interfaces for operations, such as placing and receiving phone calls, text messaging, checking voicemail, and the like. The applications 1030 can be any assortment of programs, such as a camera application for photos and/or videos, an address book, a calendar application, a media player, an internet browser, games, other multimedia applications, an alarm application, other third party applications, the interaction application discussed herein, and the like. The non-volatile storage component 1040 in memory 1010 contains data such as web caches, music, photos, contact data, scheduling data, and other files.

The processor 912 also communicates with RF transmit/receive circuitry 906 which in turn is coupled to an antenna 902, with an infrared transmitted/receiver 908, with any additional communication channels 1060 like Wi-Fi or Bluetooth, and with a movement/orientation sensor 914 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a microelectromechanical system (MEMS) which is a tiny mechanical device (of micrometer dimensions) built onto a semiconductor chip. Acceleration direction, as well as orientation, vibration and shock can be sensed. The processor 912 further communicates with a ringer/vibrator 916, a user interface keypad/screen, biometric sensor system 918, a speaker 1020, a microphone 922, a camera 924, a light sensor 926 and a temperature sensor 928.

The processor 912 controls transmission and reception of wireless signals. During a transmission mode, the processor 912 provides a voice signal from microphone 922, or other data signal, to the RF transmit/receive circuitry 906. The transmit/receive circuitry 906 transmits the signal to a remote station (e.g., a fixed station, operator, other cellular phones, etc.) for communication through the antenna 902. The ringer/vibrator 916 is used to signal an incoming call, text message, calendar reminder, alarm clock reminder, or other notification to the user. During a receiving mode, the transmit/receive circuitry 906 receives a voice or other data signal from a remote station through the antenna 902. A received voice signal is provided to the speaker 1020 while other received data signals are also processed appropriately.

Additionally, a physical connector 988 can be used to connect the mobile device 900 to an external power source, such as an AC adapter or powered docking station. The physical connector 988 can also be used as a data connection to a computing device. The data connection allows for operations such as synchronizing mobile device data with the computing data on another device.

A GPS transceiver 965 utilizing satellite-based radio navigation to relay the position of the user applications is enabled for such service.

The example computer systems illustrated in the figures include examples of computer readable storage media. Computer readable storage media are also processor readable storage media. Such media may include volatile and nonvolatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

For a see-through mixed reality display device, the gaze vectors are determined to identify a point of gaze in a three-dimensional (3D) user field of view which includes both real objects, typically not under computer control, and virtual objects generated by an application. The gaze vectors may intersect at an object 10 feet away or at a distance effectively at infinity. The following figures briefly discuss embodiments for determining a 3D user field of view.

References to front facing image data are referring to image data from one or more front facing camera like camera 113 in FIGS. 1A and 1B. In these embodiments, the field of view of the front facing cameras 113 approximates the user field of view as the camera is located at a relatively small offset from the optical axis 142 of each display optical system 14. The offset may be taken into account in the image data.

Figure 7:
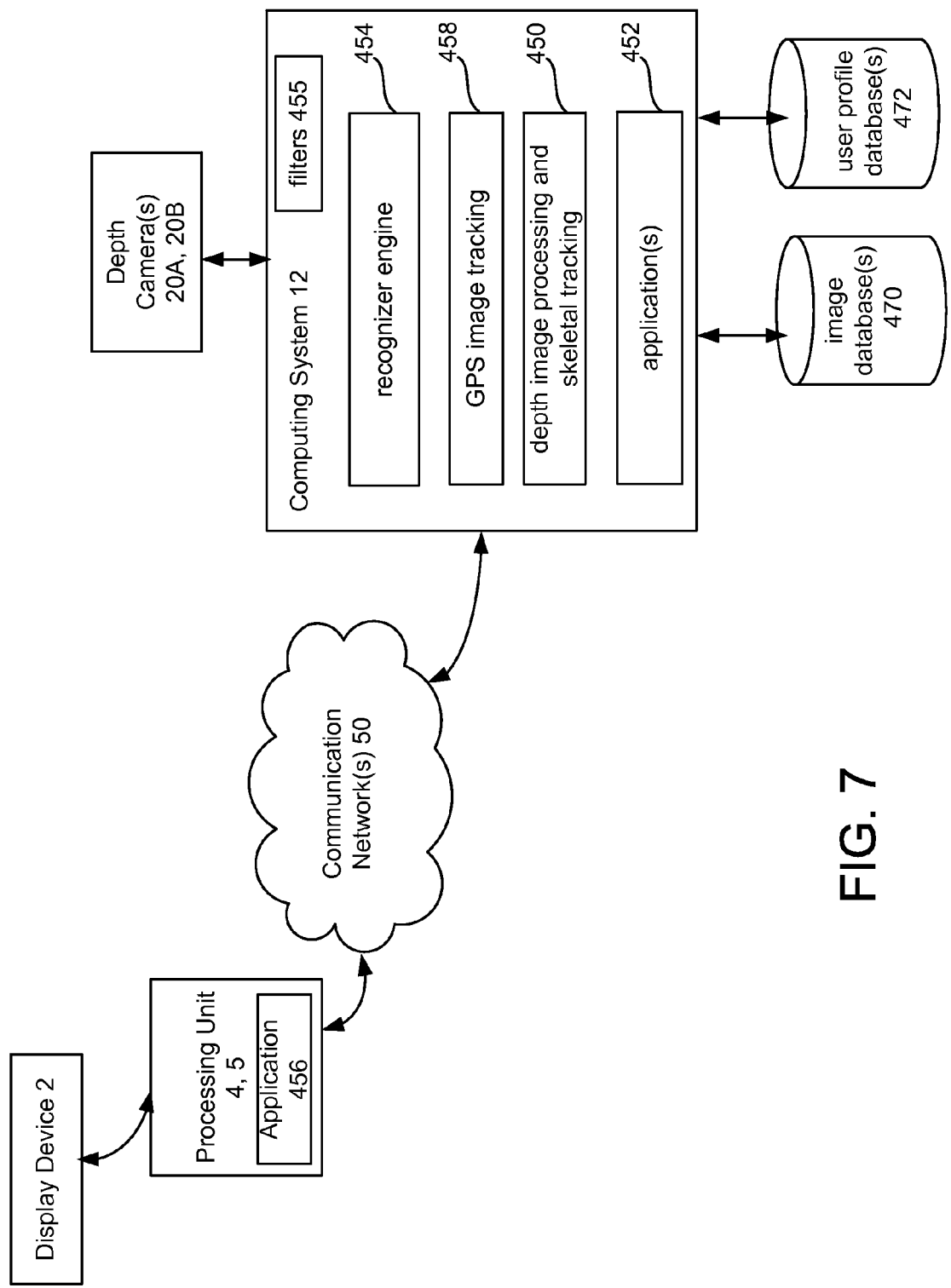
FIG. 7 is a block diagram of a system embodiment for determining positions of objects within a user field of view of a see-through, near-eye display device.

FIG. 7 is a block diagram of a system embodiment for determining positions of objects within a user field of view of a see-through, near-eye display device. This embodiment illustrates how the various devices may leverage networked computers to map a three-dimensional model of a user field of view and the real and virtual objects within the model. An application 456 executing in a processing unit 4,5 communicatively coupled to a display device 2 can communicate over one or more communication networks 50 with a computing system 12 for processing of image data to determine and track a user field of view in three dimensions. The computing system 12 may be executing an application 452 remotely for the processing unit 4,5 for providing images of one or more virtual objects. Either or both of the applications 456 and 452 working together may map a 3D model of space around the user. A depth image processing application and skeletal tracking application 450 detects objects, identifies objects and their locations in the model. An object may be a person or a thing. Additionally, the depth image processing application performs skeletal tracking of at least humans. The application 450 may perform its processing based on depth image data from depth camera like 20A and 20B, two-dimensional or depth image data from one or more front facing cameras 113, and GPS metadata associated with objects in the image data obtained from a GPS image tracking application 458.

There are many methods that can be used to track the skeleton of a person using depth images. One suitable example of tracking a skeleton using depth image is provided in U.S. patent application Ser. No. 12/603,437, "Pose Tracking Pipeline" filed on Oct. 21, 2009, Craig, et al. (hereinafter referred to as the '437 application), incorporated herein by reference in its entirety. The process of the '437 application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. Other methods for tracking can also be used. Suitable tracking technologies are also disclosed in the following four U.S. patent applications, all of which are incorporated herein by reference in their entirety: U.S. patent application Ser. No. 12/475,308, "Device for Identifying and Tracking Multiple Humans Over Time," filed on May 29, 2009; U.S. patent application Ser. No. 12/696,282, "Visual Based Identity Tracking," filed on Jan. 29, 2010; U.S. patent application Ser. No. 12/641,788, "Motion Detection Using Depth Images," filed on Dec. 18, 2009; and U.S. patent application Ser. No. 12/575,388, "Human Tracking System," filed on Oct. 7, 2009.

The GPS image tracking application 458 identifies images of the user's location in one or more image database(s) 470 based on GPS data received from the processing unit 4,5 or other GPS units identified as being within a vicinity of the user, or both. Additionally, the image database(s) may provide accessible images of a location with metadata like GPS data and identifying data uploaded by users who wish to share their images. The GPS image tracking application provides distances between objects in an image based on GPS data to the depth image processing application 450. Additionally, the application 456 may perform processing for mapping and locating objects in a 3D user space locally and may interact with the GPS image tracking application for receiving distances between objects. Many combinations of shared processing are possible between the applications by leveraging network connectivity.

The depth image processing and skeletal tracking module 450 provides the tracking information to one or more applications 452 or 456 Visual image data may also be provided to application 452, 456 and depth image processing and skeletal tracking module 450. Application 452, 456 provides the tracking information, audio data and visual image data to recognizer engine 454. In another embodiment, recognizer engine 454 receives the tracking information directly from depth image processing and skeletal tracking module 450 and receives the audio data and visual image data from the front facing cameras 113 and the microphone 110 via the processing unit 4,5 and over a communication link from capture devices 20A and 20B if present in the environment.

Recognizer engine 454 is associated with a collection of filters 455 each comprising information concerning a gesture, action or condition that may be performed by any person or object detectable by a capture device 113, 20A or 20B. For example, captured data may be processed by filters 455 to identify when a user or group of users has performed one or more gestures or other actions. Those gestures may be associated with various controls, objects or conditions of an application 452, 456.

A filter 455 comprises information defining a gesture, action or condition along with parameters, or metadata, for that gesture, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand travels (either absolute, or relative to the size of the user as a whole), and a confidence rating by the recognizer engine that the gesture occurred. These parameters for the gesture may vary between applications, between contexts of a single application, or within one context of one application over time.

In one embodiment, the functionality that recognizer engine 454 implements includes an input-over-time archive that tracks recognized gestures and other input over time. Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

An application 452, 456 may use the filters 455 provided with the recognizer engine 454, or it may provide its own filter, which plugs in to recognizer engine 454. More information about recognizer engine 454 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated herein by reference in their entirety.

In one embodiment, computing system 12 includes a user profile database 472 that includes user-specific information related to one or more users interacting with hub computing system 12. In one example, the user-specific information includes information related to a user such as the user's expressed preferences, the user's friends' list, the user's preferred activities, a list of the user's reminders, the user's social groups, the user's current location, the user's past intents to interact with objects in the user's environment and other user created content, such as the user's photos, images and recorded videos. In one embodiment, the user-specific information may be obtained from one or more data sources such as the user's social networking sites, address book, email data, Instant Messaging data, user profiles or other sources on the Internet. In one approach, and as will be discussed in detail below, the user-specific information is utilized to automatically determine the user's intent to interact with one or more objects in the user's environment.

Figure 8A:
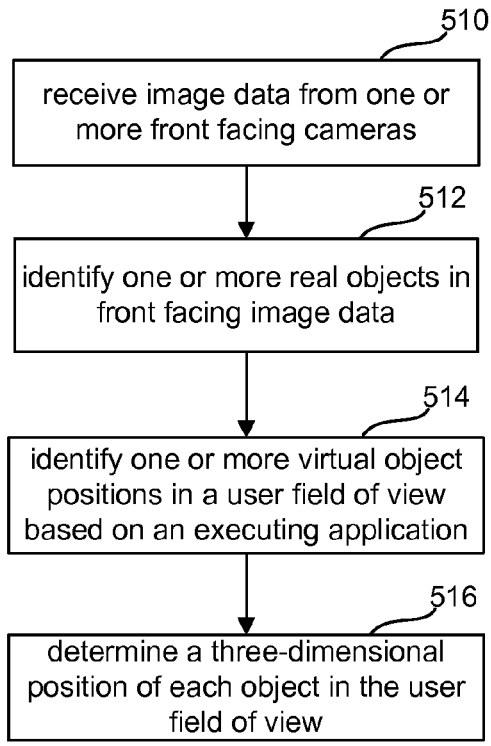
FIG. 8A is a flowchart of a method embodiment for determining a three-dimensional user field of view.

FIG. 8A is a flowchart of a method embodiment for determining a three-dimensional user field of view. In step 510, one or more processors of the control circuitry 136, the processing unit 4,5, the hub computing system 12 or a combination of these receive image data from one or more front facing cameras, and in step 512 identify one or more real objects in front facing image data. Data from the orientation sensor 132, e.g. the three axis accelerometer 132C and the three axis magnetometer 132A, can also be used with the front facing camera 113 image data for mapping what is around the user, the position of the user's face and head in order to determine which objects, real or virtual, he or she is likely focusing on at the time. Based on an executing application, the one or more processors in step 514 identify virtual object positions in a user field of view which may be determined to be the field of view captured in the front facing image data. In step 516, a three-dimensional position is determined for each object in the user field of view. In other words, where each object is located with respect to the display device 2, for example with respect to the optical axis 142 of each display optical system 14.

Figure 8B:
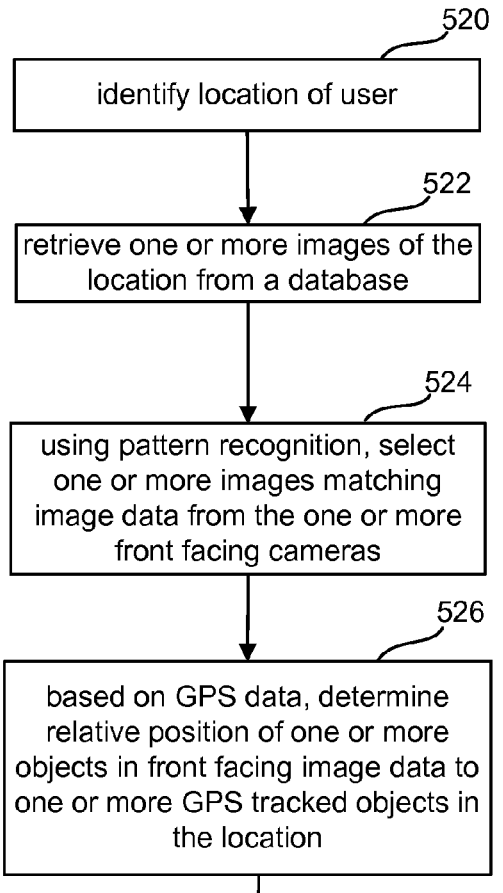
FIG. 8B is a flowchart of a method embodiment for identifying one or more real objects in a user field of view.

FIG. 8B is a flowchart of a method embodiment for identifying one or more real objects in a user field of view. This embodiment may be used to implement step 512. Each of the implementing examples in FIGS. 8B, 8D and 8E may be used separately or in conjunction with one another to identify the location of objects in the user field of view. In step 520, a location of user wearing the display device 2 is identified. For example, GPS data via a GPS unit 965 in the mobile device 5 or GPS transceiver 144 on the display device 2 may identify the location of the user. In step 522, one or more processors, retrieve one or more images of the location from a database (e.g. 470), and uses pattern recognition in step 524 to select one or more images matching image data from the one or more front facing cameras. In some embodiments, steps 522 and 524 may be performed remotely by a more powerful computer, e.g. hub 12, having access to image databases. Based on GPS data, in step 526 the one or more processors determines a relative position of one or more objects in front facing image data to one or more GPS tracked objects 528 in the location, and determines in step 529 a position of user from the one or more real objects based on the one or more relative positions.

Figure 8C:
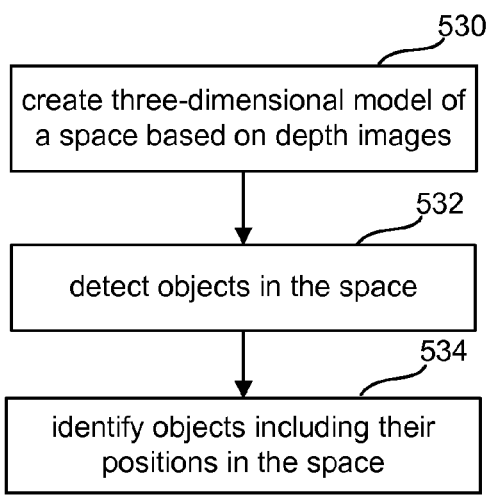
FIG. 8C is a flowchart of a method embodiment for generating a three-dimensional model of a user space.

In some embodiments such as in FIG. 1A, a user wearing a see-through, near-eye display may be in a location in which a computer system or one or more computers provides a three-dimensional mapping of objects within a space, e.g. a store. FIG. 8C is a flowchart of a method embodiment for generating a three-dimensional model of a user space. In step 530, a computer system with access to depth cameras like hub system 12 with capture devices 20A and 20B creates a three-dimensional model of a space based on depth images. The depth images may be from multiple perspectives and may be combined based on a common coordinate space, e.g. the store space, and creates a volumetric or three dimensional description of the space. In step 532, objects are detected in the space. For example, edge detection may be performed on the depth images to distinguish objects, including people, from each other. In step 534, the computer system 12 identifies one or more detected objects including their positions in the space. The objects may also be identified based on comparisons of shape and pattern recognition techniques including facial recognition techniques with reference images of things and people from image databases.

FIG. 8D is a flowchart of a method embodiment for identifying one or more objects in a user field of view based on depth data transmitted to the see-through, mixed reality display device 2. The processing unit 4,5 in step 540 sends front facing image data to a three-dimensional modeling system such as may be implemented by a depth image processing application executing on a computer system like hub computing system 12 communicatively coupled to depth cameras 20A and 20B. Data from the orientation sensor 132 may also be sent for identifying face or head position. For example, when a user enters a store, a computer system at the store provides a 3D mapping of the store and what and who is in it. In step 542, the display device 2 receives data identifying one or more objects in a field of view for the user and their positions in a 3D model of a space. The image data from the one or more front facing cameras 113 approximates the user field of view, so the hub system 12 identifies the object in the front facing image data, for example through image recognition or pattern recognition software. Orientation data may also be used with the front facing image data to refine the user field of view and identify objects tracked by the computer system 12 falling within the user field of view. (The hub system 12 also aligns the front facing image data when received from two or more cameras 113 for identifying the user field of view.) The processing unit 4,5 in step 544 receives a position of the user in the 3D model of the space, and in step 546 the processing unit 4,5, or the processor 210 of the control circuitry 136 or both determines a position of one or more objects in the user field of view based on the positions of the user and the one or more objects in the 3D model of the space. In another example, the processing unit 4,5 receives the position of the user and the one or more objects as determined by the computer system 12.

FIG. 8E is a flowchart of a method embodiment for identifying one or more objects in a user field of view when the front facing camera 113 is a depth camera providing depth image data or has a depth sensor for providing depth data which can be combined with image data to provide depth image data. In step 550, the one or more processors of the display device 2, e.g. processor 210 of the control circuitry or the processing unit 4,5, or both identifies one or more real objects in a user field of view including their three-dimensional positions based on depth image data from one or more front facing cameras. The one or more processors may also map the user field of view based on orientation data from an orientation sensor 132 in addition to the image data. The one or more processors perform step 514 of identifying virtual object positions in the user field of view based on an executing application and step 516 of determining a three-dimensional position of each object in the user field of view. Additionally, a remote computer system 12 may also providing additional processing power to the other processors for performing the steps of FIG. 8E.

Each of the method embodiments of FIGS. 8A through 8E are typically performed repeatedly as the user and objects within the user's environment move around.

Figure 9:
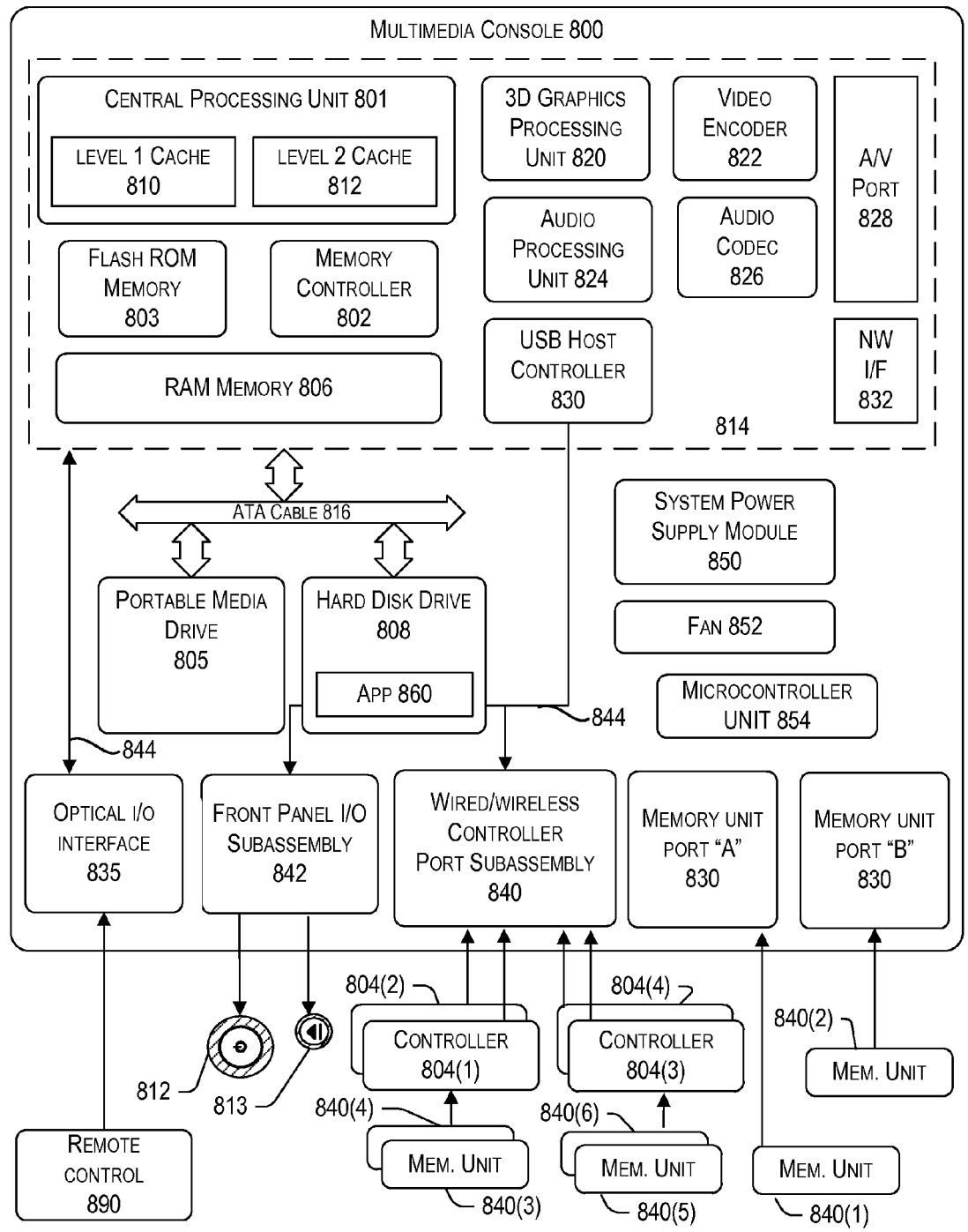
FIG. 9 is a block diagram of one embodiment of a computing system that can be used to implement a hub computing system.

FIG. 9 is a block diagram of one embodiment of a computing system that can be used to implement the hub computing system of FIGS. 1A and 1B. In this embodiment, the computing system is a multimedia console 800, such as a gaming console. As shown in FIG. 9, the multimedia console 800 has a central processing unit (CPU) 801, and a memory controller 802 that facilitates processor access to various types of memory, including a flash Read Only Memory (ROM) 803, a Random Access Memory (RAM) 806, a hard disk drive 808, and portable media drive 806. In one implementation, CPU 801 includes a level 1 cache 810 and a level 2 cache 812, to temporarily store data and hence reduce the number of memory access cycles made to the hard drive 808, thereby improving processing speed and throughput.

CPU 801, memory controller 802, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 801, memory controller 802, ROM 803, and RAM 806 are integrated onto a common module 814. In this implementation, ROM 803 is configured as a flash ROM that is connected to memory controller 802 via a PCI bus and a ROM bus (neither of which are shown). RAM 806 is configured as multiple Double Data Rate Synchronous Dynamic RAM (DDR SDRAM) modules that are independently controlled by memory controller 802 via separate buses (not shown). Hard disk drive 808 and portable media drive 805 are shown connected to the memory controller 802 via the PCI bus and an AT Attachment (ATA) bus 816. However, in other implementations, dedicated data bus structures of different types can also be applied in the alternative.

A graphics processing unit 820 and a video encoder 822 form a video processing pipeline for high speed and high resolution (e.g., High Definition) graphics processing. Data are carried from graphics processing unit (GPU) 820 to video encoder 822 via a digital video bus (not shown). Lightweight messages generated by the system applications (e.g., pop ups) are displayed by using a GPU 820 interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

An audio processing unit 824 and an audio codec (coder/decoder) 826 form a corresponding audio processing pipeline for multi-channel audio processing of various digital audio formats. Audio data are carried between audio processing unit 824 and audio codec 826 via a communication link (not shown). The video and audio processing pipelines output data to an A/V (audio/video) port 828 for transmission to a television or other display. In the illustrated implementation, video and audio processing components 820-828 are mounted on module 214.

FIG. 9 shows module 814 including a USB host controller 830 and a network interface 832. USB host controller 830 is shown in communication with CPU 801 and memory controller 802 via a bus (e.g., PCI bus) and serves as host for peripheral controllers 804(1)-804(4). Network interface 832 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 9 console 800 includes a controller support subassembly 840 for supporting four controllers 804(1)-804(4). The controller support subassembly 840 includes any hardware and software components needed to support wired and wireless operation with an external control device, such as for example, a media and game controller. A front panel I/O subassembly 842 supports the multiple functionalities of power button 812, the eject button 813, as well as any LEDs (light emitting diodes) or other indicators exposed on the outer surface of console 802. Subassemblies 840 and 842 are in communication with module 814 via one or more cable assemblies 844. In other implementations, console 800 can include additional controller subassemblies. The illustrated implementation also shows an optical I/O interface 835 that is configured to send and receive signals that can be communicated to module 814.

MUs 840(1) and 840(2) are illustrated as being connectable to MU ports "A" 830(1) and "B" 830(2) respectively. Additional MUs (e.g., MUs 840(3)-840(6)) are illustrated as being connectable to controllers 804(1) and 804(3), i.e., two MUs for each controller. Controllers 804(2) and 804(4) can also be configured to receive MUs (not shown). Each MU 840 offers additional storage on which games, game parameters, and other data may be stored. In some implementations, the other data can include any of a digital game component, an executable gaming application, an instruction set for expanding a gaming application, and a media file. When inserted into console 800 or a controller, MU 840 can be accessed by memory controller 802. A system power supply module 850 provides power to the components of gaming system 800. A fan 852 cools the circuitry within console 800. A microcontroller unit 854 is also provided.

An application 860 comprising machine instructions is stored on hard disk drive 808. When console 800 is powered on, various portions of application 860 are loaded into RAM 806, and/or caches 810 and 812, for execution on CPU 801, wherein application 860 is one such example. Various applications can be stored on hard disk drive 808 for execution on CPU 801.

Gaming and media system 800 may be operated as a standalone system by simply connecting the system to monitor 16 (FIG. 1A), a television, a video projector, or other display device. In this standalone mode, gaming and media system 800 enables one or more players to play games, or enjoy digital media, e.g., by watching movies, or listening to music. However, with the integration of broadband connectivity made available through network interface 832, gaming and media system 800 may further be operated as a participant in a larger network gaming community.

Figure 10:
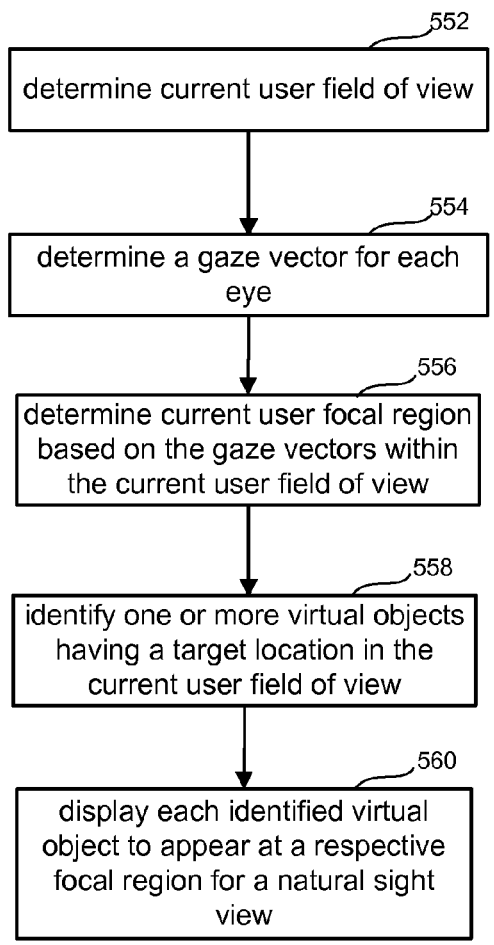
FIG. 10 is a flowchart of an embodiment of a process for generating a natural sight display view of virtual objects with real objects.

FIG. 10 is a flowchart of an embodiment of a process for generating a natural sight display view of virtual objects with real objects. In step 552, the system determines the current user field of view. That is, the system determines a portion of the environment or space within the user's vision and identifies the real and virtual objects therein as discussed above. For determining at what the user is specifically looking during a time period, a current user focal region of the user's depth of focus in the field of view is determined Gaze data indicates what is the focal point or point of gaze which defines the current user focal region within the field of view. The Panum's fusional area can be calculated based on a focal point on a focal curve, the Horopter, within the Panum's fusional area. The Panum's fusional area is the area of single vision for binocular stereopsis used by the human eyes.

In step 554, a gaze vector is determined for each eye based on the geometry of one or more gaze detection elements. FIGS. 3A through 3D illustrate some embodiments of arrangements of gaze detection elements for each respective display optical system 14 of a display device 2. Determination of gaze is discussed in more detail with respect to FIGS. 16 through 24. In step 556, a current user focal region is determined based on the gaze vectors within the current user field of view.

Based on a software application executing in one or more computer systems such as the hub computing device 12 or the processing unit 4, 5, one or more virtual objects having a target location in the current user field of view are identified in step 558. For example, the processing unit 4, 5 or hub system 12 or both use the three-dimensional (3D) model of the environment and position and orientation data of the user's head to determine whether the target location of any virtual object is within the user's field of view. In step 560, the display optical systems 14 of the display device 2 display each identified virtual object to appear at a respective focal region for a natural sight view. FIGS. 14 and 15 provide more details of implementation examples for making each identified virtual object appear to be a respective focal region for a natural sight view. In the system embodiments of FIG. 2 and FIGS. 3A to 3D, a processor can control the variable focus adjuster 135 of the microdisplay assembly 173 to change its focal length and hence in what focal region a virtual object appears to a user. The processing unit 4,5 determines an adjustment value which the variable adjuster driver 237 applies to the adjuster to change a physical characteristic of the assembly 173 like displacement, polarization or optical power resulting in a focal length change.

Figure 11:
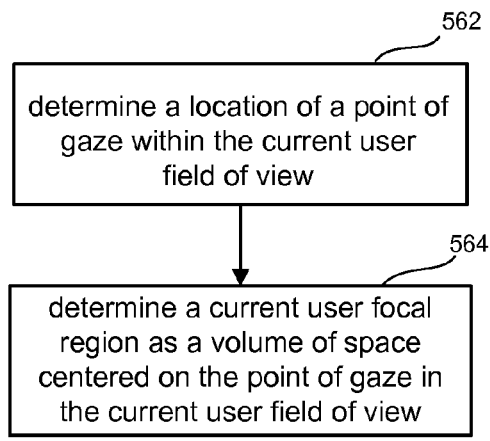
FIG. 11 is a flowchart describing one embodiment of an example implementation process for determining a current user focal region

FIG. 11 provides an overview of how a point of gaze determined at the intersection of the two vectors is used to determine a current user focal region. FIG. 11 is a flowchart describing one embodiment of an example implementation process for determining a current user focal region, which may be used for performing step 556 of FIG. 10. In step 562, one or more processors of the augmented reality system determine a location of a point of gaze within the current user field of view and in step 564 determines a current user focal region as a volume of space centered on the point of gaze in the current user field of view. For example, the user may be facing a wall and, therefore, the field of view for the head mounted display could include anywhere along the wall. However, if the point of gaze indicates user's eyes are pointed to the right, then step 564 concludes that the current user focal region of the user is only the right hand portion of the wall.

For human eyes, the user focal region is a volume known as the Panum's fusional area, in which the human eyes see objects with single vision. Humans have binocular vision or stereoptic vision. Each eye produces an image from a different point of view. Only in this small volume of the Panum's fusional area do humans see an object with single vision. This is generally what is meant when an object is said to be in focus. Outside this area, objects can appear blurry or even appear as double images. Within the center of the Panum's fusional area is a Horopter which is centered on the point of gaze or the focal point of the user's eyes. When a user is focused on a point in space, that focal point or point of gaze is centered on a curved line. Objects on this curved line in space fall on the retinas of the eyes in the fovea. The curved line is sometimes referred to as the horizontal horopter. There is also a vertical horopter which is a line through the curved line which tilts away from the eyes above the focal point and towards the eyes below the focal point on the curve. The term Horopter as used hereafter refers to both of its vertical and horizontal components. The Horopter may be thought of as a surface within the Panum's fusional area. The Horopter surface shape changes with the focal distance to the point of gaze or fixation. In some embodiments, a current user focal region may be modeled based on the Horopter surface shape for the focal distance from the eyes or retinas to the point of gaze.

In other embodiments, to save computation time, e.g. when a user is walking down the street wearing the display device, the current user focal region may be modeled as a simpler volumetric shape of a certain size like a rectangle centered at the point of gaze. The size of the volumetric shape may be an approximation of the size of the Panum's fusional area around the center of the Horopter horizontal and vertical components. The size of the rectangle may be adjusted based on focal distance to the point of gaze if desired. Other focal regions can be defined in location from the current focal region. In some embodiments, the current focal region may be treated as a two dimensional focal plane, and other focal planes defined as focal distances from the eyes.

The processing steps of the figures are performed continuously during operation of the system such that the user's field of view and focal region are continuously updated as the user moves his or her head.

Figure 12:
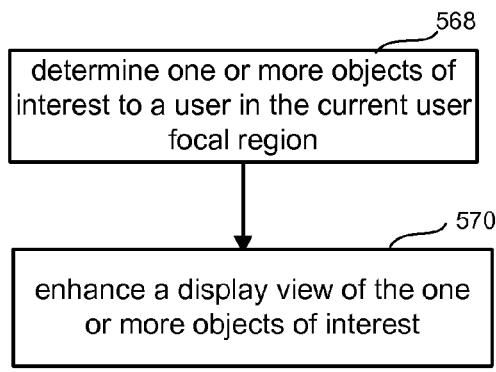
FIG. 12 is a flowchart of an embodiment of a method for enhancing the display view of the one or more objects of interest in a see-through, mixed reality display device.

FIG. 12 is a flowchart of an embodiment of a method for enhancing the display view of the one or more objects of interest in a see-through, mixed reality display device. In step 568, one or more processors of the augmented reality system determine one or more objects of interest to a user in the current user focal region. By identifying the objects of interest to a user, more relevant information may be targeted to a user, and the display view decluttered. In step 570, the one or more processors controls the different display elements for enhancing the display view of the one or more objects of interest. Both real and virtual objects of interest may be enhanced. For example, FIGS. 26B and 26C provide examples of how a zoom function may be implemented for a virtual object and for a real object for enhancing the display view of the one or more objects.

Figure 13:
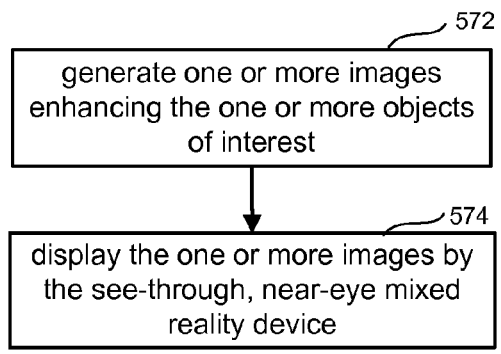
FIG. 13 is a flowchart of a process embodiment for enhancing the display view of the one or more objects of interest in a see-through, mixed reality display device.
Figure 27A:
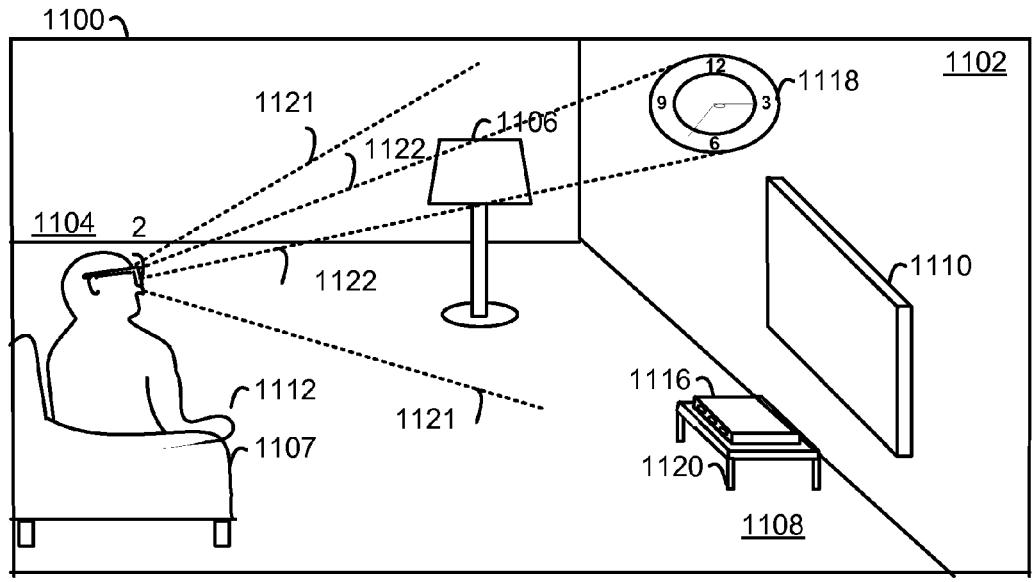
FIGS. 27A, 27B and 27C depict one embodiment of a user's interaction with one or more objects in the user's environment and the generation of an optimized image based on the user's interaction.
Figure 27B:
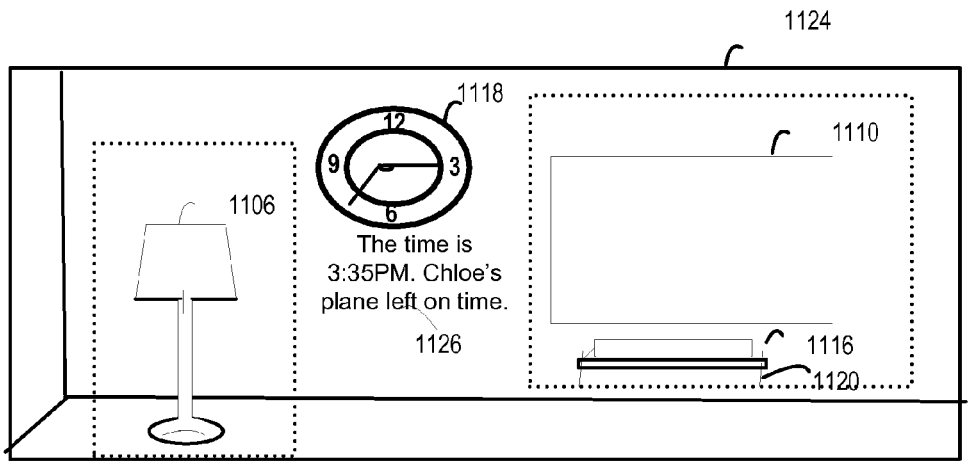
Figure 27C:
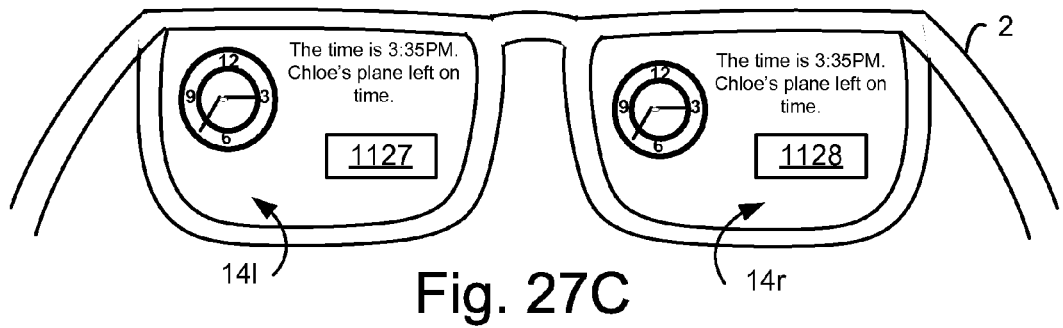

FIG. 13 is a flowchart of a process embodiment for enhancing the display view of the one or more objects of interest in a see-through, mixed reality display device 2. In this embodiment, the one or more processors generate one or more images enhancing the one or more objects of interest in step 572, and displays the one or more images by the see-through, near-eye mixed reality device in step 574. FIGS. 27A, 27B and 27C illustrate examples of images enhanced for the one or more objects of interests.

Before proceeding to the various examples of gaze determination, some examples for implementing step 560 of FIG. 10 are discussed which use the current focal region determination for displaying a virtual object image.

FIG. 14 is a flowchart of an implementation example of a process for displaying each identified virtual object to appear at a respective focal region for a natural sight view. In step 582, software executing in the hub computer system 12, the processing unit 4, 5 or both scales and orients each identified virtual object for an image to be inserted into the user's view. The scaling and orienting of the virtual object will be based on its target location in the user field of view. In step 584, processing unit 4, control circuitry 136 or both share processing to place each virtual object identified as being in the current user focal region by changing the focal region of the microdisplay assembly 173. Optionally, in step 586, an artificial depth of field technique may be applied to each virtual object whose target location is within the user's field of view but outside the user's current focal region as a function of distance from the current focal region. An example of an artificial depth of field technique is an artificial blur technique. In step 588, the microdisplay 173 displays an image including each identified virtual object.

Artificial blur can be achieved by applying a depth of field shader or other a Gaussian blur filter to simulate the object being out of focus as function of distance from the focal region. The technique may be performed in whole or in part by software executing on the hub computer 12, the processing unit 4, 5 or both. For ease of description, reference will be made to the processing unit 4, 5. From a depth value as part of the target location of a virtual object, the focal distance of the object in the image is determined by the processing unit 4, 5 which also determines which pixels on a display optical system 14 like that enclosing the lightguide optical element 112 will map to the virtual objects in an image. Based on the focal distance, one or more weighted Gaussian blur filters are applied to cover at least two dimensions by convolving the image with a Gaussian function such that the transformations applied to pixels further from the focal point or fixation point of the image are receive more blurring effects. In one example, the Gaussian blur filter acts as a low pass filter removing high frequency information.

FIG. 15 is a flowchart of another implementation example of a process for displaying each identified virtual object to appear at a respective focal region for a natural sight view. Virtual object images are generated in different focal regions in an augmented reality display. If there is at least one virtual object having a target location in the user's field of view, then in step 590, software executing in the hub computer system 12, the processing unit 4, 5 or both scales and orients each virtual object based on its target location in the user's field of view for an image to be inserted into the user's view. In step 591, the processing unit 4, 5 selects a range of focal regions including the current user focal region. The processing unit 4, 5 may select the range of focal regions based on criteria such as the context of the executing application, e.g. 452, 456. An application may use a selection of virtual objects with predetermined motion trajectories and events which trigger their appearance. As the model of objects is updated with the movement of objects, the processing unit 4, 5 receives these updates and may use sensor data on position and orientation of the user's head to determine which virtual objects he or she is likely focusing on at the time. The processing unit 4, 5 may select a number of focal regions in which the trajectory of the virtual object will travel based on the three dimensional model of the scene. Therefore, one example criteria is to include each focal region in which a virtual object is located. In addition, focal regions may also be selected in which regions the trajectory of a moving virtual object will be in a predetermined time frame.

The starting focal region point for sweeping through the range of focal regions may be the one closest to infinity in the user field of view from the user's eyes. Other starting locations may be used. In step 592, a sweep rate period is started by the timing generator 226 or clock generator 244 of the control circuitry. In step 593 a counter is initialized to go through a number of focal regions in the range during the sweep period. In some instances, the focal regions are predetermined. At each time step of the sweep period, in step 594 the focal region of the elements of the microdisplay assembly 173 are adjusted, and an image is displayed for each focal region at its sweeptime or timestep to the user in step 595. The next focal region is selected in step 596 by incrementing the counter, and the processing of steps 593 through 597 are repeated until the counter indicates the range sweep is complete. The sweep period ends in step 598. In other examples, an end of frame for a display may interrupt a sweep through the sweep range, and another sweep begin with the next frame. In another embodiment, instead of sweeping through the display of the different images, they may be formed into a composite image which is generated by the microdisplay assembly 173 for display by the device 2.

The processing steps of FIG. 14 or 15 can be performed continuously during operation of the system such that the current user field of view and current user focal region are updated as the user moves his or her head, and the virtual objects may be displayed as naturally moving in and out of focus for the user accordingly.

Figure 16:
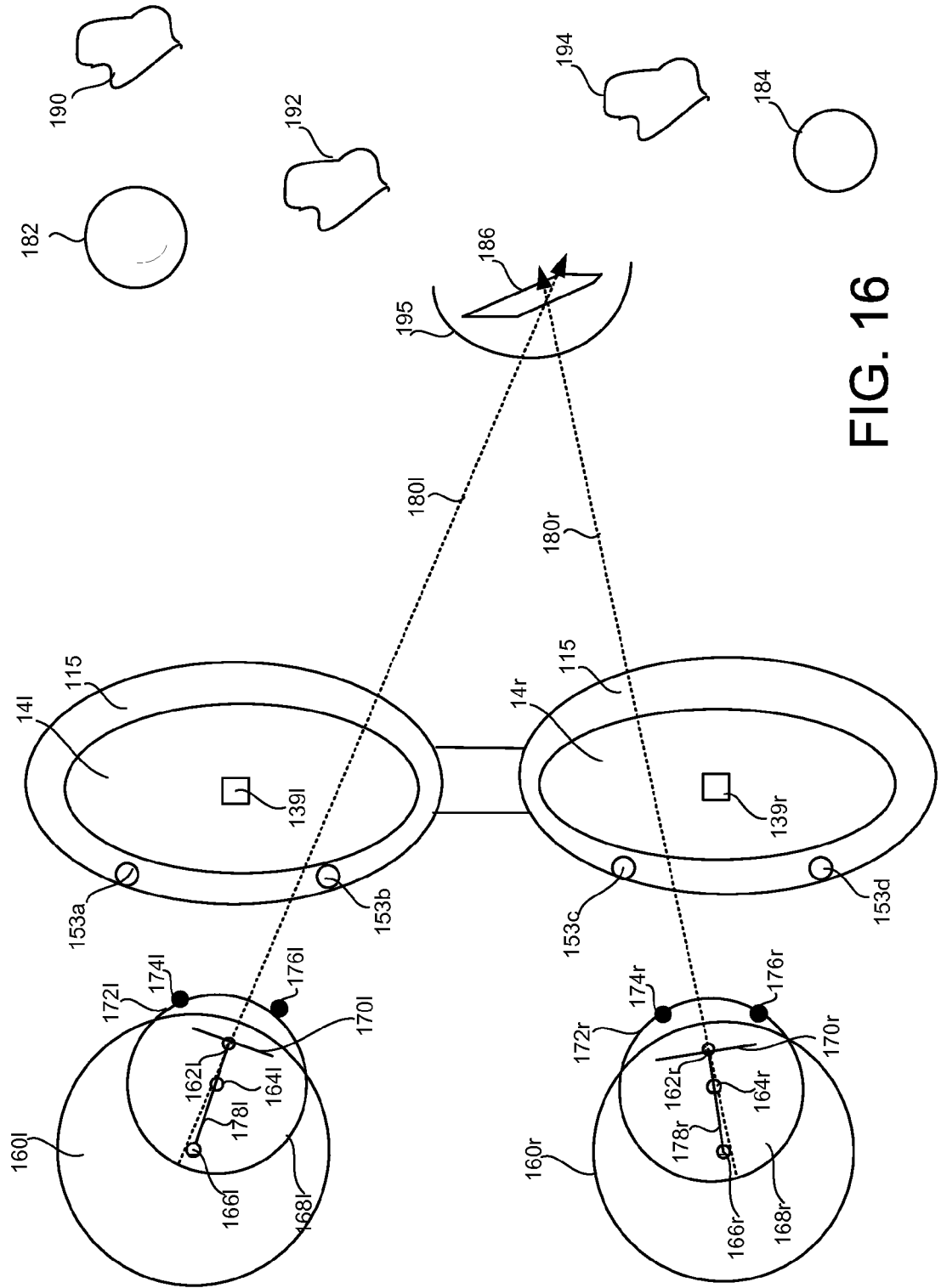
FIG. 16 is a top view illustrating examples of gaze vectors intersecting at a point of gaze where a user's eyes are focused.

Before describing embodiments for gaze determination, an illustration of gaze vectors is provided. FIG. 16 is a top view illustrating examples of gaze vectors intersecting at a point of gaze where a user's eyes are focused. A model of the eyeball 160l, 160r is illustrated for each eye based on the Gullstrand schematic eye model. For each eye, the eyeball 160 is modeled as a sphere with a center of rotation 166 and includes a cornea 168 modeled as a sphere too and having a center 164. The cornea rotates within the eyeball, and the center 166 of rotation of the eyeball may be treated as a fixed point. The cornea includes an iris 170 with a pupil 162 at its center. In this example, on the surface 172 of the respective cornea are glints 174 and 176.

The axis 178 formed from the center of rotation 166 through the cornea center 164 to the pupil 162 is the optical axis of the eye. A gaze vector 180 is sometimes referred to as the line of sight or visual axis which extends from the fovea through the center of the pupil 162. The fovea is a small area of about 1.2 degrees located in the retina. The angular offset between the optical axis computed in the embodiment of FIG. 9 and the visual axes has horizontal and vertical components. The horizontal component is up to 5 degrees from the optical axis, and the vertical component is between 2 and 3 degrees. In many embodiments, the optical axis is determined and a small correction determined through user calibration is applied to obtain the visual axis which is selected as the gaze vector. For each user, a small virtual object may be displayed by the display device at each of a number of predetermined positions at different horizontal and vertical positions. An optical axis may be computed for during display of the object at each position, and a ray modeled as extending from the position into the user eye. An offset angle with horizontal and vertical components may be determined based on how the optical axis must be moved to align with the modeled ray. From the different positions, an average offset angle with horizontal or vertical components can be selected as the small correction to be applied to each computed optical axis. In some embodiments, only a horizontal component is used for the offset angle correction. (For more information, see Hennessey et al. "A Single Camera Eye-Gaze Tracking System with Free Head Motion," ETRA 2006, San Diego, Calif., ACM p. 88, pp. 87-94 (hereafter Hennessey), which is hereby incorporated by reference. In many embodiments, the optical axis is determined and a small correction is applied to obtain the visual axis which is selected as the gaze vector.

In the illustrated embodiment of FIG. 16, a sensor detection area 139 is aligned with the optical axis of each display optical system 14 within an eyeglass frame 115. The respective image sensor in this example is a camera capable of capturing image data representing glints 174l and 176l generated respectively by illuminators 153a and 153b on the left side of the frame 115 and data representing glints 174r and 176r generated respectively by illuminators 153c and 153d.

Through the display optical systems, 14l and 14r in the eyeglass frame 115, the user's field of view includes both real objects 190, 192 and 194 and virtual objects 182, 184, and 186. In this example, the cornea 168l of the left eye is rotated to the right or towards the user's nose, and the cornea 168r of the right eye is rotated to the left or towards the user's nose. Both pupils are gazing at a virtual object 186. Gaze vectors 180l and 180r from each eye enter the Panum's fusional region 195 in which virtual object 186 is located. The Panum's fusional region is the area of single vision in a binocular viewing system like that of human vision. The intersection of the gaze vectors 180l and 180r indicates which that the user is looking at virtual object 186.

Figure 17:
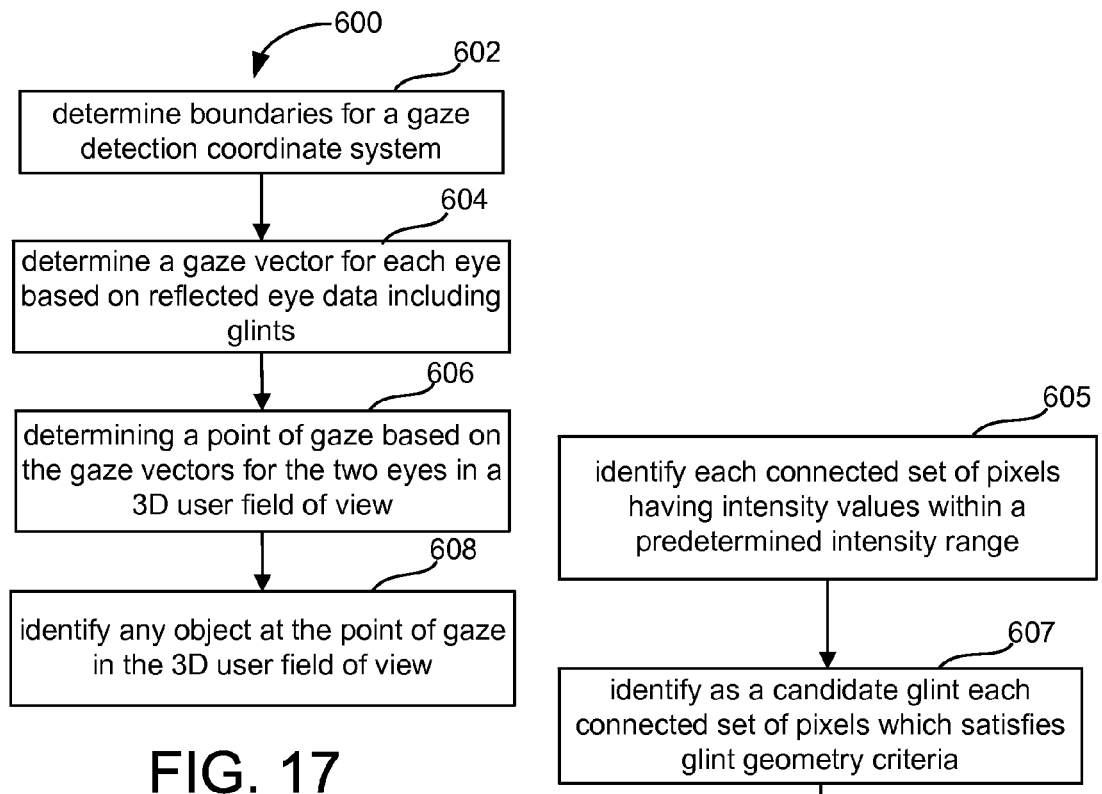
FIG. 17 is a flowchart of a method embodiment for determining gaze in a see-through, near-eye mixed reality display system.

FIG. 17 is a flowchart of a method embodiment for determining gaze in a see-through, near-eye mixed reality display system and provides an overall view of how a near-eye display device can leverage its geometry of optical components to determine gaze and a depth change between the eyeball and a display optical system. One or more processors of the mixed reality system such as processor 210 of the control circuitry, that in processing unit 4, the mobile device 5, or the hub computing system 12, alone or in combination, determine in step 602 boundaries for a gaze detection coordinate system. In step 604, a gaze vector for each eye is determined based on reflected eye data including glints, and in step 606 a point of gaze, e.g. what the user is looking at, is determined for the two eyes in a three-dimensional (3D) user field of view. As the positions and identity of objects in the user field of view are tracked, for example, by embodiments like in FIGS. 8A-8F, in step 608, any object at the point of gaze in the 3D user field of view is identified. In many embodiments, the three-dimensional user field of view includes displayed virtual objects and an actual direct view of real objects. The term object includes a person.

Figure 18:
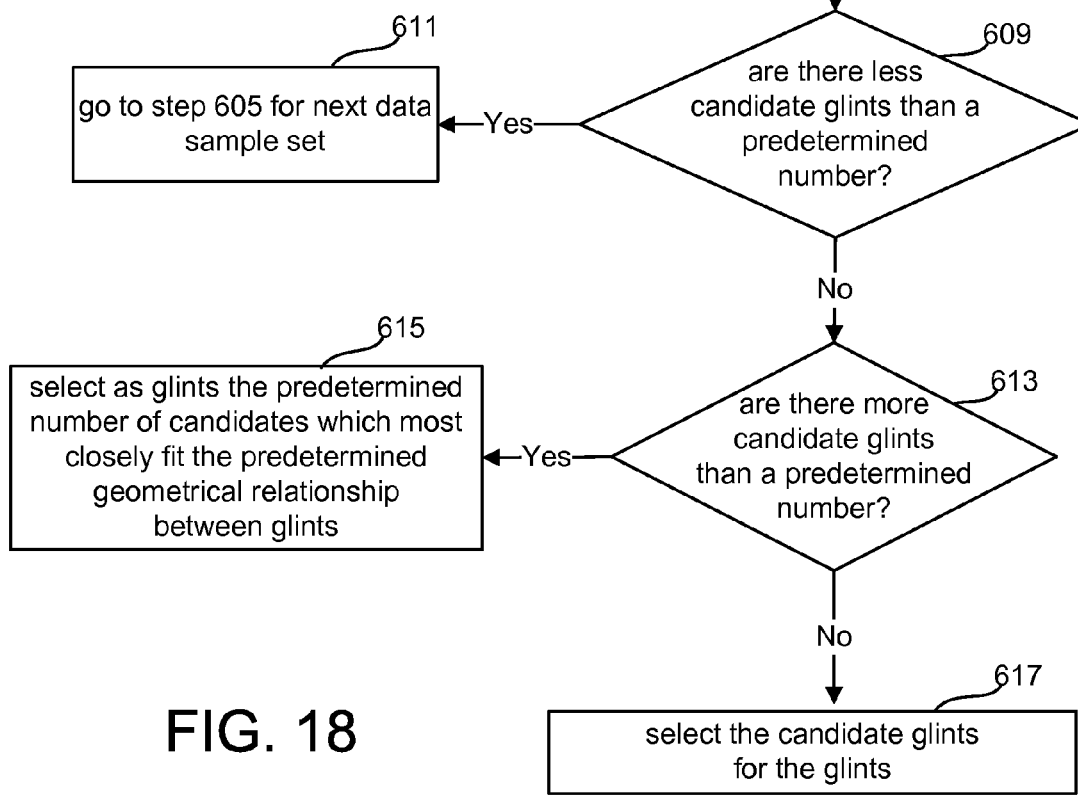
FIG. 18 is a flowchart of a method embodiment for identifying glints in image data.

The method embodiment in FIG. 17 and other method embodiments discussed below which use glint data for other ways of detecting gaze, may identify such glints from image data of the eye. When IR illuminators are used, typically an IR image sensor is used as well. The following method may also work with a discrete surface position sensitive detector (PSD), e.g. one with pixels. FIG. 18 is a flowchart of a method embodiment for identifying glints in image data. As noted above, a glint is a very small and often very bright reflection of light from a light source off of a specularly reflective surface such as the cornea of an eye. In the method embodiment below, each of the steps is performed for a data sample set. In some examples, that may include data from one image or image frame, and in others, the data sample set may be for a number of images or image frames. In step 605, the processor identifies each connected set of pixels having their intensity values within a predetermined intensity range, for example, the range of intensity values may begin at 220 and end at the brightest pixel value 255. In step 607, the candidate glints are pruned by identifying as a candidate glint each connected set of pixels which satisfies glint geometry criteria. An example of glint geometry criteria is size and shape for the glints. Some may be too large, too small, or have too irregular a shape. Furthermore, the illuminators are positioned for the resulting glints to have a spatial or geometric relationship to each other. For example, the illuminators 153 are arranged for the glints to form a rectangle. In the embodiment discussed in FIG. 22 in which a pupil center is determined from image data as well, a spatial relationship to the pupil may also be a criteria, e.g. a distance too far from the pupil may indicate a connected set is not a candidate glint.

In step 609, the one or more processors determine whether there are less candidate glints than a predetermined number. For example, for four illuminators, four glints are expected but the predetermined number may be two. In the example of the rectangle as the geometric relationship, two glints which form a horizontal line or a diagonal line of a predetermined length may have been selected as candidates. There may be an eyelid or eyelash obstruction for the other glints. If there are less than the predetermined number of glints, the data sample set is dropped for further processing, and processing returns in step 611 to step 605 of a next data sample set. If there are not less candidates than a predetermined number, then step 613 determines whether there are more candidate glints than a predetermined number. If there are more candidates, in step 615, the one or more processors select as glints the predetermined number of candidates which most closely fit the predetermined geometrical relationship between the glints. For example, for the rectangle, which candidates most closely form the rectangle of the predetermined size and shape. If there are not more candidates than the number, the number of candidates matches the predetermined number of glints, and the candidates are selected as the glints in step 617.

Due to the geometry of the placement of illuminators for generating the glints as discussed above, the glints appear in the same locations, barring movement of the frame 115 with respect to the eye. Furthermore, as the positioning of the illuminators with respect to each other on the support structure of the frame 115 or lens 118 is fixed, the spatial relationship of the glints to each other in the image is fixed as well. As for size, as the glints are very small, the number of pixels making up the glint area on the sensor and in the sensed image would be correspondingly small. For example, if the image sensor of the camera has a 1000 pixels, each glint may take up less than ten pixels. Glints may be monitored in each image frame taken for example at 30 or 60 frames a second and an area may be identified as a glint from a number of frame samples. There may not be glint data in every frame. Sampling accommodates or smoothes out obstructions of glint, and pupil data, in different image frames such as due to factors like an eyelid or eyelash covering the glint and/or pupil. An image frame is an example of an image format.

FIG. 19 is a flowchart of a method embodiment which may be used to implement step 602 of determining boundaries for a gaze detection coordinate system. One or more processors determines a position of a center 164 of a cornea of each eye with respect to the illuminators 153 and at least one light sensor, e.g. 134 or 152, based on glints in step 612. Based on image data provided by the at least one sensor, in step 614, the one or more processors determine a pupil center of each eye. In step 616, the position of the center of eyeball rotation, which may be treated as fixed, is determined relative to the cornea and pupil centers. For example, based on the pupil center, a ray can be extended back through the determined cornea center 164 to the fixed center 166 of eyeball rotation. Additionally, distance or length approximations are used for approximating the length on the optical axis between the pupil and the cornea, for example about 3 mm, and the length on the optical axis between the center of curvature of cornea and the center of eyeball rotation, about 6 mm. These values have been determined from population studies of human eye parameters such as those compiled by Gullstrand. (See Hennessey, p. 88). Optionally, the one or more processors in step 618 determine a position of the fixed center of eyeball rotation with respect to the illuminators and the at least one sensor for the respective eye.

This position determined in step 618 provides a depth distance between a fixed point, or one that can be approximated as fixed for accuracy considerations of gaze detection, and the display optical system. In effect, a depth axis has been defined for the gaze detection coordinate system. Changes detected along the depth axis may be used to indicate that the near-eye display system has moved and trigger an alignment check of each optical axis with its respective pupil to see if the alignment criteria is still satisfied. If not, automatic readjustment may be performed.

FIG. 20 illustrates a method embodiment for determining a position of the center of the cornea in the coordinate system with optical elements of the see-through, near-eye, mixed reality display. The one or more processors generate in step 622 a first plane including points including positions of a first illuminator for generating a first glint, a pupil center of the at least one image sensor, e.g. camera entrance pupil center, and the first glint. As in the embodiment of FIG. 3A, the pupil center of the camera may be positioned in relation to the detection area 139 which acts as an image plane and which directs the light it receives to an image sensor in another location. In other examples, like in FIGS. 3B and 3C, the detection area 139 may be the image sensor itself which is the image plane. This first plane will also include a position of the cornea center. Similarly, the one or more processors generate in step 624 a second plane including points including positions of a second illuminator for generating a second glint, the same pupil center of at least one sensor and the second glint. The two planes share the same camera pupil center as an origin and a distance vector to each illuminator is fixed with respect to the camera pupil center as the image sensor and illuminators are positioned on the near-eye display device at predetermined locations. These predetermined locations allow the various points in the planes to be related to each other in a third coordinate system including the two illuminators, the position of the camera pupil center, and the cornea center of curvature. The processor determines in step 626 the position of the cornea center of curvature based on the intersection of the first and second planes.

FIG. 21 provides an illustrative example of the geometry of a gaze detection coordinate system 500 which may be used by the embodiment of FIG. 20 to find the cornea center. In this embodiment, the at least one sensor is a camera modeled as a pin-hole camera. The geometry depicted is a slightly modified version of FIG. 3 on page 89 of Hennessey et al. "A Single Camera Eye-Gaze Tracking System with Free Head Motion," ETRA 2006, San Diego, Calif., ACM p. 88, pp. 87-94 (hereafter Hennessey), which is hereby incorporated by reference. A list of variables is provided as follows:

$\hat{q}_i$ is a position of an illuminator$_i$, the light of which produces glint $\hat{g}_i$, (e.g. 174)

$\hat{g}_i$ is the glint produced by illuminator$_i$ (153) on a cornea surface, ô is a camera pupil center of the pin-hole camera model, $\hat{\iota}_i$ is the image of glint $\hat{g}_i$ on the image plane which is the detection area 139 of the camera sensor, length$_i$ is the scalar distance or length from point ô to $\hat{q}_i$, $\hat{I}_i$ is the vector from the camera pupil center ô to the image on the image $\hat{\iota}_i$ sensor of the glint $\hat{g}_i$, $\hat{Q}_i$ is the vector from the camera pupil center ô to the position $\hat{q}_i$ of illuminator$_i$, the $\hat{X}_i$ axis is defined along $\hat{Q}_i$, in this example and the $\hat{Z}_i$ axis of the coordinate system is such so that $\hat{I}_i$ which connects the image $\hat{\iota}_i$ of the glint $\hat{g}_i$ on image plane 139 (detection area) lies in a plane formed by the $\hat{X}_i$ and $\hat{Z}_i$ axes.

$\hat{\beta}$ is an angle formed in the $\hat{X}_i\hat{Z}_i$ plane between a line 502 representing the incident ray of light from the illuminator (153) position $\hat{q}_i$ to the glint $\hat{g}_i$ (174) on a cornea surface.

$\hat{\alpha}$ is the angle formed in the $\hat{X}_i\hat{Z}_i$ plane between a line 504 representing the reflected ray from the glint $\hat{g}_i$ to the camera pupil center of the camera, ô, which is also the origin of the coordinate system.

ĉ is the position of the cornea center which also lies in the $\hat{X}_i\hat{Z}_i$ plane.

As the cornea is modeled as a sphere, r is the radius of the corneal sphere, and each glint $\hat{g}_i$ is a point on the first or external surface of the sphere, so each glint is separated from the cornea center by the radius r. In the above example, the glint $\hat{g}_i$ is modeled as a point on the exterior surface or first surface of the cornea. In such a model, the light of the illuminator is bouncing off the cornea in the same medium, air, of the same index of refraction as the reflected light of the glint directed back to the camera sensor.

As shown in FIG. 21, a line or ray 506 normal to the glint $\hat{g}_i$ on the surface of the cornea can be extended from the glint in the direction of the cornea and also extended to intersect with the $\hat{X}_i$ axis of the $\hat{X}_i\hat{Z}_i$ plane of the coordinate system. Also as shown in FIG. 21, the incident ray 502 and the reflected ray 504 make a right triangle with the line length$_i$ between the position of the illuminator $\hat{q}_i$ and the camera pupil center ô. Thus angle A and angle D is each represented by $$\frac{\pi - \hat{\alpha}_i - \hat{\beta}_i}{2}$$

wherein $$\hat{\alpha}_i = \cos^{-1}\left(\frac{-\hat{I}_i \cdot \hat{Q}_i}{\|-\hat{I}_i\| \cdot \|\hat{Q}_i\|}\right) \text{ and } \hat{\beta}_i = \tan^{-1}\left(\frac{\hat{g}_{ix} \cdot \tan(\hat{\alpha}_i)}{\hat{l}_i - \hat{g}_{ix}}\right).$$

According to Hennessey, the center of the cornea $\hat{c}_i$ can be defined in the coordinate system 500 in terms of the unknown parameter $\hat{g}_{ix}$ resulting in 3 equations for 4 unknowns ($\hat{c}_{ix}, \hat{c}_{iy}, \hat{c}_{iz}, \hat{g}_{ix}$) as follows:

$$\begin{bmatrix} \hat{c}_{ix} \\ \hat{c}_{iy} \\ \hat{c}_{iz} \end{bmatrix} = \begin{bmatrix} \hat{g}_{ix} - r \cdot \sin\left(\frac{\hat{\alpha}_i - \hat{\beta}_i}{2}\right) \\ 0 \\ \hat{g}_{ix} \cdot \tan(\hat{\alpha}_i) + r \cdot \cos\left(\frac{\hat{\alpha}_i - \hat{\beta}_i}{2}\right) \end{bmatrix}$$

Another two-dimensional plane including the cornea center, ĉ, another glint $\hat{g}_i$, the camera pupil center ô of the camera and a position $\hat{q}_i$ of another illuminator is also formed. The camera pupil center ô of the camera and the cornea center are the same in each plane although the camera pupil center ô position is known. This will result in 6 equations with 8 unknowns. In Hennessey, the gaze detection coordinate system is treated as an auxiliary coordinate system for which a rotation matrix $\hat{R}_i$ can transform points between the auxiliary coordinate systems for each plane and a single world coordinate system such as the third coordinate system which relates the position of the detection area 139 to the illuminators 153. A constraint exists in which the cornea center defined for each glint is the same in the world coordinate system, e.g. $\hat{c}_1 = \hat{c}_2$ and 3 equations result for the different axis components, e.g., $\hat{c}_{1x} = \hat{c}_{2x}, \hat{c}_{1y} = \hat{c}_{2y}$, and $\hat{c}_{1z} = \hat{c}_{2z}$, thus providing 9 equations with 8 unknowns. Hennessey (p. 90) states to solve numerically for ĉ using a gradient descent algorithm. Thus, the position center 164 of the cornea 168 is defined with respect to the positions of the illuminators and the image plane or detection area 139.

FIG. 22 illustrates a method embodiment for determining a pupil center from image data generated by a sensor. In step 642, the one or more processors identify a black pupil area in a number of image data samples of the respective eye and in step 644 averages the black pupil areas in the number of image data samples to adjust for headshake. An assumption may be made that a pupil is a circle and when viewed from an angle is an ellipse. One axis of the ellipse, the major axis, remains constant as it represents the diameter of the pupil which does not change, provided the lighting does not change as pupil size changes with lighting changes.

The pupil appears as a circle in an image format such as an image frame of a camera having its detection area centered on the optical axis of the display when the pupil is looking straight ahead through the display. As the pupil changes its gaze and moves from the center of the image frame, the pupil appears as an ellipse, as a circle viewed from an angle appears as an ellipse. The width of the minor axis of the ellipse changes with gaze changes. A narrow ellipse to the left of the center of the image frame indicates the user is looking to the far right. A wider ellipse a distance less to the right of the center of the image frame indicates the user is looking left but not far left.

The center of the pupil is the center of the ellipse. The ellipse is fitted from detected edge points in the image. Because such edge points are noisy and not all of them are on the ellipse, the ellipse fitting process is repeated many times over randomly selected subsets of all edge points. The subset that is most consistent with all the edge points is used to obtain the final ellipse. The processor in step 646 performs an ellipse fitting algorithm on the average black pupil area for determining an ellipse representing the pupil, and in step 648 determines the center of the pupil by determining the center of the ellipse representing the pupil.

With the center of rotation, the cornea center and the pupil center identified, one can extend a ray from the center of rotation through the cornea and pupil centers to obtain an optical axis for the eye. However, as noted previously, a gaze vector in a human is the visual axis or line of sight from the fovea through the pupil center. Photoreceptors in the fovea region of the human retina are more densely packed than in the rest of the retina. This area provides the highest visual acuity or clearness of vision, and also provides stereoscopic vision of nearby objects. After determining the optical axis, a default gaze offset angle may be applied so that the optical axis approximates the visual axis and is selected as the gaze vector.

FIG. 23 illustrates a method embodiment for determining a gaze vector based on the determined centers for the pupil, the cornea and the rotation of the eyeball and which embodiment may be used to implement step 604. In step 652, the one or more processors model an optical axis 178 for the eye as a ray extending from the fixed center of rotation of the eyeball through the determined cornea and pupil centers and in step 654 applies a correction to the modeled optical axis for estimating a visual axis. In step 656, the one or more processors extend the estimated visual axis from the pupil through the display optical system of the see-through, near-eye display into the user field of view.

In one embodiment, with the fixed positioning of the illuminators as a basis, the effect of different areas of the eye on reflectivity and hence on the amount or intensity of light reflected is used as a basis for gaze detection. Intensity data from either IR or visible light sensors may be used to determine gaze, so the reflectivity data may be based on IR based reflectivity or visible light reflectivity. For illustration, the sclera is more reflective than other areas of the eye like the pupil and the iris. If a user looks to the user's far left, an illuminator 153 located on the frame 115 at the user's far right causes a glint reflection on the right sclera of the user's right eye. PSD 134r or a, photodetector 152 on the inner right frame near bridge 104 receives more reflected light represented in a data reading while the light from reflection at the other photodetector 152 or position on the PSD when the illuminator 153 nearest the bridge is turned on receives a lower amount of reflected light in a range associated with the black pupil. The reflectivity of the iris may also be captured by camera 134 and stored for the user by the processor 210, the processing unit 4 or a mobile device 5 embodying the processing unit 4.

The accuracy may not be as much as those based on images of the full eye, but may suffice for many applications. Additionally, such a gaze detection may be useful as an auxiliary or backup gaze detection technique. For example, during computationally intensive periods of generating complex virtual images, such a glint based technique relieves some processor overhead. Furthermore, such a glint-based technique can be executed many more times in a time period than an image based technique which processes more data or a computationally intensive but more accurate technique which may be run at a slower rate to recalibrate accuracy of gaze detection periodically. An example of a gaze detection technique which is both image based and more computationally intensive is one for determining a gaze vector with respect to inner parts of the eye based on glint data and pupil image data like the embodiments described in FIGS. 12 to 18, which may be run at a slower rate to recalibrate accuracy of gaze detection periodically. For example, an embodiment of the more computationally intensive technique based in part on image data may be run at ten (10) times a second while the glint based gaze detection technique may be run at a faster rate of one hundred (100) times per second or even five (500) hundred in some instances.

FIG. 24 is a flowchart illustrating a method embodiment for determining gaze based on glint data. In step 673, data is captured representing each glint intensity value. Based on specular reflectivities of different eye parts, and positions of illuminators, an eyeball part is identified in step 674 based on the intensity value detected for each glint position in a geometrical relationship of the glints. In step 675, a gaze angle is estimated based on the eyeball part associated with each of the glint positions. As described in previous examples, an eyeball part may be an iris, a pupil or a sclera of the eyeball. The positions of the illuminators form a geometry for the glints, e.g. a box, a circle, a rectangle, etc. which frame or surround the pupil, at least on two sides. A gaze vector is determined in step 676 based on the gaze angle, and a point of gaze in the 3D user field of view is determined in step 677 based on the intersection of the gaze vectors determined for both eyes.

As noted above, different methods with different accuracies may be employed at different periodic rates to trade accuracy for speed. A method embodiment based on glint intensity values such as that described in FIG. 24 is an example of a technique with a low computational intensity which may be employed. Other tests for movement may be performed based on a facial feature with a fixed characteristic in image data. In one embodiment, an eye camera may capture about 5 to 10 mm of area around the visible eyeball portion of the cornea bulge, eye white, iris and pupil so as to capture part of an eyelid and eyelashes. A positionally fixed facial feature like a mole or freckle on skin such as an eyelid or on the bottom rim of the skin encasing the lower eyeball may also be present in the image data of the eye. In image samples, the position of the mole or freckle may be monitored for a change in position. If the facial feature has moved up, down, right or left, a vertical or horizontal shift can be detected. If the facial feature appears larger or smaller, a depth change in the spatial relationship between eye and display device 2 can be determined There may be a criteria range in the change of position to trigger recalibration of the training images due to things like camera resolution, etc.

In another example, although lighting is a factor which changes the size of the pupil and the ratio of pupil area to visible iris area within the circumference or perimeter of the iris, the size of the perimeter or circumference of the iris does not change with gaze change or lighting change; hence, the perimeter or circumference is a fixed characteristic of the iris as a facial feature. Through ellipse fitting of the iris, processor 210 or a processor of the processing unit 4,5 of the display device 2 can determine whether the iris has become larger or smaller in image data in accordance with criteria. If larger, the display device 2 with its illuminators 153 and at least one sensor 134 has moved closer in depth to the user's eye; if smaller, the display device 2 has moved farther away. A change in a fixed characteristic can trigger an IPD alignment check.

Besides depth changes, vertical and horizontal changes in pupil alignment can also be determined by a periodic check displaying a virtual object at a predetermined distance for the user to see when looking straight ahead, and seeing if the pupil is centered on the optical axis as per being centered in image data or in a predetermined glint position. Vertical and horizontal changes can also trigger readjustment. As shown in the examples above, the display adjustment mechanism in some embodiments provides for movement in any of three dimensions.

In some examples, comparisons between current sensed data and training images is to determine a closest match and interpolate where the current pupil position data fits between training data sets to estimate a gaze vector. Particularly when using training data for comparison, movement of the gaze detection coordinate system is a cause for recalibrating the training images. One may periodically redetermine the positions of the cornea center and fixed center of rotation to determine whether there has been a change in the spatial relationship between them and the illuminators and at least one sensor. A periodic check may also determine whether a lighting change in accordance with a criteria has occurred triggering generation of new training gaze data sets.

FIGS. 25A through 26D describe embodiments for identifying an object of interest based a user's intent to interact with the object and an optimizing an image or a display view for that interaction. As with the figures above, the steps of the figures below may be performed by one or more processors, under the control of software. The one or more processors may include the hub computing system 12 if a user is interacting with the hub computing system 12 while wearing the display device 2. In another example, the processing unit 4, 5, the control circuitry processor 210 or both may process input such as an audio command or gesture the user performs in front of the front facing camera 113 or via eye movement commands to the eye tracking camera 134 or from sensors (not shown) which measure the potentials on eye muscles for user input protocols. Of course, a combination of processors of the hub computing system 12, the processing unit 4, 5 and the control circuitry may perform the steps too.

Figure 25A:
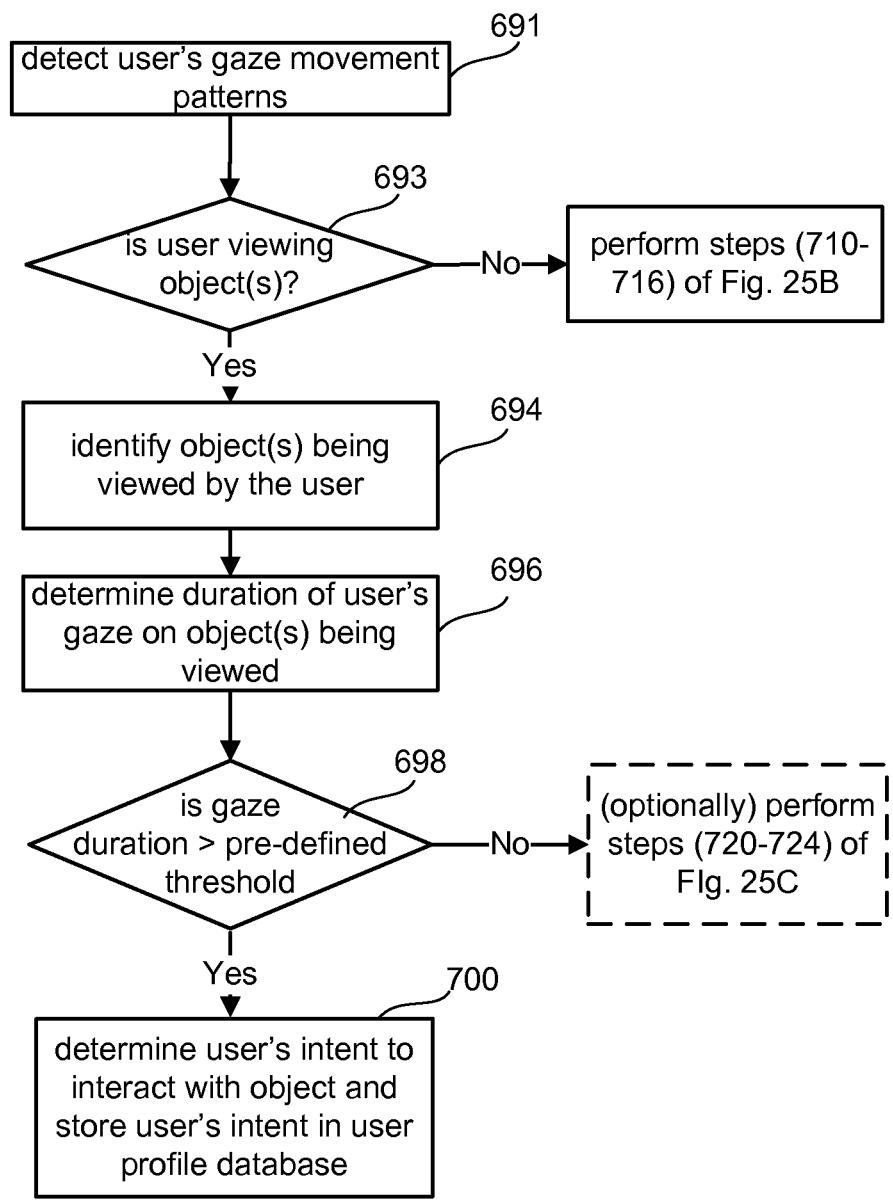
FIG. 25A is a flowchart describing one embodiment of a process for identifying an object of interest based on a user's intent to interact with the object in the user's focal region.

FIG. 25A is a flowchart describing one embodiment of a process for identifying an object of interest based on a user's intent to interact with the object in the user's focal region. For example, the process of FIG. 25A is one example implementation of step 568 of FIG. 12. FIG. 25A describes a process by which a user's intent to interact with one or more objects in the user's focal region is determined based on detecting the user's eye gaze patterns in the user's focal region and determining the duration of the user's gaze on one or more objects being viewed by the user in the user's focal region.

In step 691 of FIG. 25A, the user's eye gaze patterns in the user's focal region are detected. Points of gaze are typically divided into fixations and saccades, when the eye gaze pauses in a certain position, and when it moves to another position, respectively. Eye gaze patterns may therefore be defined as a series of fixations or focal points or points of gaze and saccades followed by the user's eyes when looking at an image or a visual scene. The resulting series of fixations and saccades is generally referred to as a scanpath, which is a path followed by the user's eyes when looking at a visual scene. In addition, most information from the eye is made available during a fixation. The central one or two degrees of the visual angle (the fovea) provide the bulk of visual information and the input from larger eccentricities (the periphery) is less informative. Thus, the locations of fixations along a scanpath show the information loci on the stimulus that were processed by the user's eyes when viewing a visual scene. In one example, the locations of fixations along the scanpath may be used to detect one or more objects being viewed by the user in the user's focal region.

Figure 25B:
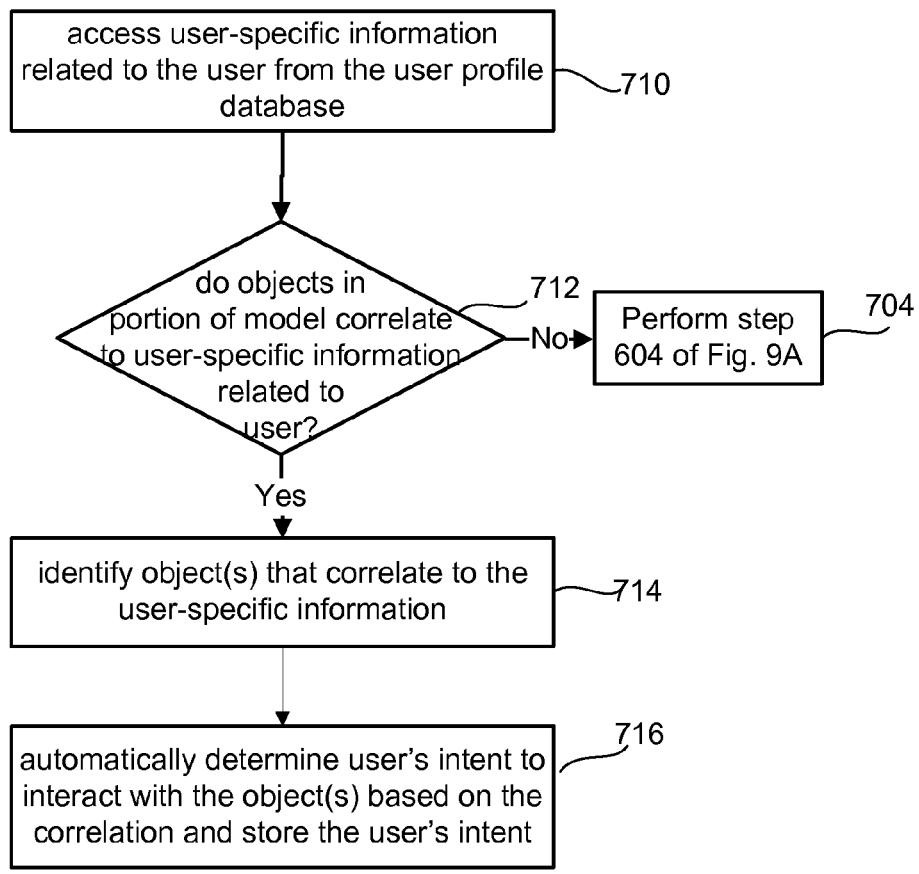
FIG. 25B is a flowchart describing another embodiment of a process for identifying an object of interest based on determining a user's intent to interact with the object in the user's focal region.

In step 693, it is determined if the user is viewing one or more objects. For example, the locations of points of gaze along the scanpath may be used to detect if the user is viewing one or more objects. If it is determined that the user is not viewing any object, then, in one embodiment, steps (710-716) of the process described in FIG. 25B are performed.

If it is determined that the user is viewing one or more objects, then the objects being viewed by the user are identified in step 694. For example, the objects may be identified as a wall clock, a round shiny table, John Doe, a green leather couch, etc. In step 696, the duration of the user's gaze on the one or more objects being viewed is determined. In one example, the duration of the user's gaze is determined based on determining the duration of the user's gaze (or fixation) on the objects within a time window.

In step 698, it is determined if the user's gaze duration is greater than a pre-defined threshold value. In one example, the pre-defined threshold value is 10 seconds. If the gaze duration is greater than the pre-defined threshold value, then the user's intent to interact with the one or more objects in the user's focal region is inferred in step 700. In one example, each of the objects in the user's environment may include a parameter that represents the user's intent to interact with an object. In one example, the system 10, upon determining the user's intent to interact with an object, may assign a binary value to the object's parameter, wherein a binary value of 1 indicates the user's intent to interact with the object. In step 700, the user's intent is stored in the user profile database 472.

In another example, the duration of the user's gaze (determined in step 696) may also determine the type of activity being performed by the user while viewing an object. For example, the length of sequences of saccades derived from the duration of the user's gaze may be used to determine if the user is searching/browsing the object, reading a line of text displayed by the object, or looking intensely at the object. In one embodiment, the type of activity being performed by the user as determined by the duration of the user's gaze on the object may also be used to infer the user's intent to interact with the object.

Figure 25C:
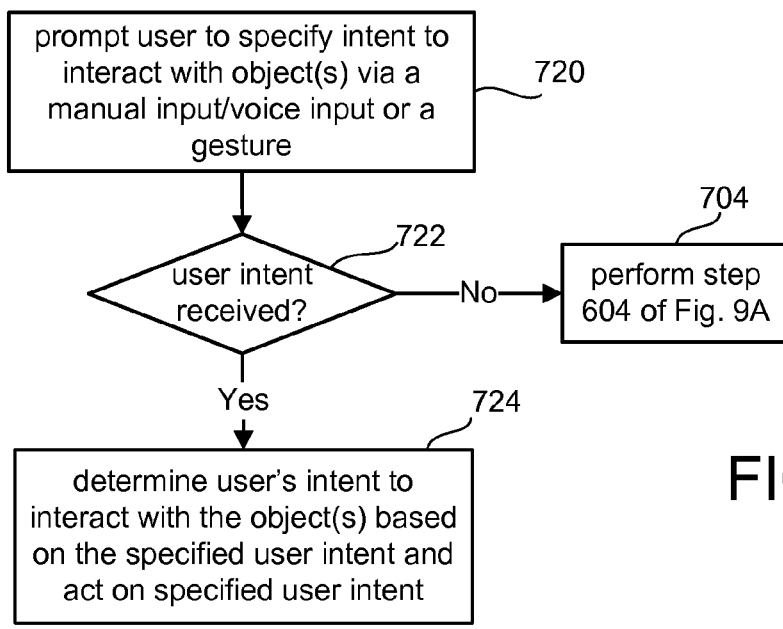
FIG. 25C is a flowchart describing another embodiment of a process for identifying an object of interest based on determining a user's expressed intent to interact with the object.

In step 698, if it is determined that the user's gaze duration is not greater than the pre-defined threshold, in one embodiment, steps (720-724) of the process described in FIG. 25C are optionally performed.

FIG. 25B is a flowchart describing another embodiment of a process for identifying an object of interest based on determining a user's intent to interact with the object in the user's focal region. In one embodiment, the process described in FIG. 25B is performed when the user's eye gaze patterns indicate that the user is not viewing any specific object in the user's focal region (e.g., step 693 of FIG. 25A). For example, consider an exemplary situation in which a user wearing a HMD device has less than normal vision and may not be able to see objects including people in the his or her environment very clearly. In one approach, the user's intent to interact with one or more objects may automatically be inferred by accessing user-specific information related to the user.

In step 710, user-specific information related to the user is accessed from the user profile database 472. As discussed above, user-specific information may include, information related to a user such as the user's expressed preferences, the user's friends' list, the user's preferred activities, the user's social groups, the user's current location, the user's past intents to interact with objects, the user's reminders, and other user created content, such as the user's photos, images and recorded videos.

In step 712, it is determined if any of the objects in the user's focal region correlate to the user-specific information. For example, in an exemplary situation when a user is trying to find his or her friends at a party, the people that appear in the user's focal region may be correlated to the user-specific information related to the user to determine if one or more of the people correspond to any of the user's friends. For example, a facial recognition technique may be utilized to correlate images of people in the user's focal region to visual images of the user's friends that are stored in the user profile database 472 to determine if one or more of the people in the user's focal region correspond to any of the user's friends.

In step 712, if it is determined that none of the objects in the user's focal region correlate to the user-specific information, then in step 704, the process returns to tracking the field of view of the user. In one example, when it is determined that none of the objects or people in the user's focal region correlate to the user-specific information, a virtual text message such as "There is currently no object or person of interest in your focal region", may be displayed to the user, via the user's HMD.

In step 714, the one or more objects or people are identified based on the correlation. For example, the people may be identified as the user's friends, John Doe and Sally Doe. In another embodiment, a user's keys may be identified as placed within the scene. In step 716, the user's intent to interact with the identified objects is automatically inferred based on the correlation. In one example, the system assigns a binary value to a parameter represented by the one or more identified objects. In step 716, the user's intent to interact with the one or more identified objects is stored in the user profile database 472. Step 716 may include automatically inferring intent based on user specific or external factors. Such factors may include, but are not limited to, a user's calendar or schedule information, a user's friend information as stored in a contact database or social graph, geographical positioning information, time of day, and the like. For example, user specific information may indicate that on a Monday, the user is scheduled to attend a meeting and the user's laptop is within the field of view. In accordance with the description provided below in FIG. 26A, the system may highlight the laptop to induce the user to remember to take the laptop with them for the meeting.

FIG. 25C is a flowchart describing another embodiment of an optional process for identifying an object of interest based on determining a user's expressed intent to interact with the object. In one embodiment, the process described in FIG. 25C is performed, for example, when it is determined that the user is viewing one or more objects in the user's focal region but user's gaze duration is not long enough (i.e., not greater than the pre-defined threshold, as discussed in step 698 of FIG. 25A). In step 720, the user is prompted to specify or express intent to interact with one or more objects in the user's focal region. In one example, the system may display virtual text to the user via the user's HMD device to prompt the user to specify intent to interact with one or more objects. For example, the user may be prompted to specify intent via a user physical action such as a voice input, a keyboard entry, a touch or a gesture. The voice input may be a voice command uttered by the user such as spoken words, whistling, shouts and other utterances. For example, in the exemplary situation of a user trying to find his or her friends at a party, the user may utter a command such as "Help me find my friends!"

In step 722, it is determined if an intent to interact with one or more objects has been received by the user. If the user's intent has not been received, then in step 704, the process returns to tracking the field of view of the user. If the user's intent has been received (via the physical action), then the user's intent to interact with the one or more objects is determined and the user's specified or expressed intent is stored in the user profile database 472.

FIG. 26A is a flowchart describing one embodiment of a process for generating an optimized image with one or more objects based on the user's intent to interact with them and displaying the optimized image to the user via the see-through, near-eye display device. In one embodiment, generating an optimized image comprises, in step 730, optionally, diminishing the appearance of objects that are outside the user's focal region but within the user's field of view that the user does not intend to interact with. In one embodiment, the opacity filter 114 in the near-eye display device 2 is utilized to block out or darken the objects that are outside the user's focal region to diminish the appearance of objects that are outside the user's focal region. Thus, a portion of the real-world scene which includes the objects that the user is not interested may be blocked out by the opacity filter 114 from reaching the user's eye, so that the objects that the user intends to interact with in the user's focal region may clearly be seen by the user.

In step 732, the objects that the user intends to interact with in the user's focal region are visually enhanced. In step 740, one or more optimized images are displayed to the user via the head mounted display device 2. In one embodiment, the micro display assembly 120 in the see-through, mixed reality device 2 is utilized to visually enhance the one or more objects for interaction in the user's focal region. The objects may be real or virtual. One or more enhancement techniques may be applied. In one approach, the objects are visually enhanced by highlighting the edges of the objects, displaying a visual indicator, for example a virtual box or a circle, in a region in which the objects are located. In another example, a real or virtual object which is accelerating may have its edges enhanced by highlighting which tracks the object as it increases in speed. In another example, a sharp virtual outline of the edges of an object may be tracked at a focal distance the user has better focusing ability at while the object is still out of focus. Additionally, color may be used to enhance an object. Furthermore, one or more objects that it is determined a user intends to interact with may also be enhanced by zooming the one or more objects in or out. The zooming may be implemented by adjusting a focal region of the one or more objects.

FIG. 26B is a flowchart describing one embodiment of a process for visually enhancing a virtual object by zooming the object for an optimized image. In step 760, one or more processors of the augmented reality system including the display device 2 receives user input requesting a zoom setting for a virtual object. In step 762, the one or more processors determines a zoom focal region based on the zoom setting and the current focal region, and causes the image generation unit, e.g. the microdisplay assembly 173, to the change the focal region of the virtual object to the zoom focal region. The one or more processors may determine a focal distance from the user's eye to a point of gaze based on determined gaze vectors, the focal point, in the current user focal region. Based on a zoom setting, e.g. a magnification level, which may indicate a degree of zooming in or out, e.g. making bigger or smaller, the one or more processors determine a new focal point at which to place the virtual object and calculate a new focal distance or new focal length from each eye to meet at the new focal point. In the embodiments of FIGS. 3A-3D, a new adjustment value for the variable focus adjuster is applied for an image of the virtual object to cause a change in the focal length of the microdisplay assembly 173 by adjusting a physical characteristic such as a displacement in the optical path 133 between the microdisplay 120 and the reflecting surface 124, 124a, a change in optical power of one or more lenses in the lens system 122 or a change in polarization in one or more lenses of the lens system 122. If the user's point of gaze changes, the zoom setting may be maintained by repeating steps 762 and 764 for each change of the current user focal region within a field of view including the virtual object.

FIG. 26C is a flowchart describing one embodiment of a process for visually enhancing a real object by zooming the display view of the see-through, mixed reality display device. In one embodiment, to the extent allowed by the range of size, convexity and concavity of the variable focus lens 116, a user may select a zoom feature. An example of a zoom feature is an ability to focus which is superior to normal ability such as the ability to see in-focus at 20 feet what others with normal vision can only see at 10 feet. A zoom feature may also be to see a specific distance further or closer or a multiplier of the current focal distance.

In step 761, one or more processors in the augmented reality system receive user input requesting a zoom setting for a real object and determines in step 763 a zoom focal region based on the zoom setting and the current focal region. For determining the zoom focal region, the one or more processors determine a new focal point at which to view the real object and calculates a new focal distance or new focal length from each eye to meet at the new focal point. The position and scale of virtual objects on the display are updated with the zoom region as the current focal region. However, unlike moving a virtual object from one focal region to another, the display device 2 does not control the real object. The whole view through the see-through device is zoomed in or out with a focal point on the real object. In step 765, each respective variable focus lens 116 in each respective display optical system 14 has its focal length adjusted for focusing the display device in the zoom focal region.

When the variable focus lens 116 changes, the real world does not change. For example, the front facing camera 113 is still capturing image data of the physical environment as it actually is. The user field of view and user focal region may change while the display device is in a zoom mode. In one embodiment, the environment facing camera 113 has a zoom lens with a zoom setting controllable by the control circuitry 136. The processor causes the zoom setting of the front facing camera to the zoom setting for any zoom focal region so the processor receives image data at the scale the user sees his or her field of view. This image data captured at a focal length for a zoom setting may be processed like image data captured in a non-zoom mode as described in the continuous processing for determining the user field of view, identifying real objects in the user field of view, determining which virtual objects are to be displayed in the current focal region, and their position and scale. In another embodiment, in step 767, the processor, optionally, updates the current focal region of view based on the zoom focal region. For example, a perimeter of a user field of view determined from image data is scaled based on the zoom setting, and the scaled user field of view is used for identifying which real objects can be seen via the display device, and which virtual objects have target locations in the scaled user field of view.

The connectivity provided by networked devices such as the processing unit embodied in a mobile device 5 and networked hub computing systems 12 allows for remote access to user-specific information stored elsewhere and for storing remotely user-specific information created locally with the display device 2. FIG. 26D is an example of optimizing an image by leveraging connectivity.

FIG. 26D is a flowchart describing one embodiment of a process for displaying additional augmented content for an object, based on determining the user's intent to interact with the object. In step 734, augmented content related to the one or more objects is retrieved. In one example, the augmented content may include user-specific information retrieved from the user profile database 472. In another example, the augmented content may include user-specific information that is retrieved in real time from one or more data sources such as the user's social networking sites, address book, email data, Instant Messaging data, user profiles or other sources on the Internet.

In step 736, audio content related to the identified objects is extracted. Step 736 is optional. For example, if the user is looking at a wall clock in the user's living room and it is determined that the user intends to interact with the wall clock object then audio information about the time may be heard by the user. In step 738, the augmented content is projected over or next to the one or more objects in the user's focal region. In one example, the augmented content is a virtual image including one or more virtual objects or virtual text that is displayed to the user. In another example, the augmented content may include a virtual object such as a menu with one or more choices. In step 740, one or more optimized images are displayed to the user via the head mounted display device 2.

FIGS. 27A-C depict one embodiment of a user's interaction with one or more objects in the user's environment and the generation of an optimized image based on the user's interaction. FIG. 27A depicts an environment in which a user views one or more objects in a room 1100 using a HMD device 2. The room 1100 includes a front wall 1102, side wall 1104 and floor 1108, and example furniture such as a lamp 1106, a chair 1107, a wall clock 1118 and a table 1120. A video display screen 1110 is mounted to the wall 1102, in this example, and the hub 1116 rests on the table 1120. In an exemplary situation, user 1112 looks at an object such as the wall clock 1118 placed on the front wall 1102, via HMD device 2. 1121 represents the field of view of the user and 1122 represents the user's focal region.

FIG. 27B depicts an optimized image generated by the camera of the HMD device of FIG. 27A, upon determining the user's intent to interact with the wall clock object 1118. In one embodiment, the user's intent may be determined as discussed by the process described in FIG. 25A. As illustrated in FIG. 27B, the optimized image 1124 includes an enhanced appearance of the wall clock object 1118 in the user's focal region and a diminished appearance of the lamp 1106, the display screen 1110, the hub 1116 and the table 1120 which are outside the user's focal region, but within the user's field of view. In the exemplary illustration, the wall clock object 1118 has been highlighted to enhance its appearance. The dotted lines around the objects 1106, 1110, 1116 and 1120 indicate their diminished appearance. In addition, the optimized image displays augmented content 1126 that shows the time of day in digital format next to the wall clock object 1118 and a message indicating that "Chloe's plane left on time." The message may have been formulated by one or more processors based on user profile data identifying Chloe as a social networking site friend, the flight information being on the user's calendar, and a check to the airline website which indicates the flight has just left. In one example, audio information about the time of day may also be heard by the user.

FIG. 27C depicts the optimized image of FIG. 27B as seen by a user via a HMD device. The optimized image is provided by each of the display optical systems 14*l* and 14*r*, of the see-through, near-eye display device 2. The open regions 1127 and 1128 indicate the locations where light from the display enters the user's eyes as the opacity filter has diminished the appearance of the other furniture.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A near-eye, mixed reality display system comprising:
    at least one display optical system being positioned in a near-eye, mixed reality display device to be seen through by at least one eye;
    at least one image generation unit for generating an image and having an optical alignment with the at least one display optical system, the at least one image generation unit having a variable focal length;
    a gaze detection system comprising a respective arrangement of gaze detection elements positioned by the near-eye, mixed reality display device, the gaze detection elements including illuminators for generating glints and at least one sensor having a detection area for detecting glints for the at least one display optical system and generating eye data;
    one or more software controlled processors communicatively coupled to the at least one image generation unit and the at least one sensor;
    a memory accessible by the one or more processors for storing software and data including the eye data;
    the one or more processors for determining at least one gaze vector for the at least one eye based on the eye data; and
    the one or more software controlled processors operable to determine a current user focal region based on the at least one gaze vector in a current 3D user field of view, the one or more processors operable to identify one or more virtual objects in the current 3D user field of view that the current user intends to interact with in the current user focal region, and the one or more processors operable to control the focal length of the at least one image generation unit of the display optical system of the current user to create one or more images in which each of the one or more virtual objects appears at a respective focal region in the current 3D user field of view for a natural sight view, wherein
    the object in the current user focal region is correlated with user-specific information from a user profile database such that the user intent to interact with the object is based on the correlation.

2. The system of claim 1 further comprising:
    wherein the at least one sensor is an infra-red (IR) image sensor for providing infra-red image data of a pupil and the glints;
    a first illuminator and the detection area of the IR image sensor lie in a first plane with a center of a cornea of the at least one eye;
    a second illuminator and the detection area of the IR image sensor lie in a second plane with the center of the cornea of the at least one eye;
    the arrangement of the illuminators and the detection area cause the first and second planes to intersect; and
    the one or more software controlled processors determining a position of the center of the cornea from the intersection of the planes, identifying a center of the pupil from the image data, and wherein the one or more processors determining at least one gaze vector for the at least one eye based on the eye data further comprises determining a gaze vector for the at least one eye based on the position of the center of the cornea and the center of the pupil.

3. The system of claim 1 further comprising:
    wherein the at least one sensor comprises a position sensitive detector and the one or more processors turn each illuminator on and off in a predetermined sequence for capturing glint data.

4. The system of claim 1 further comprising:
    each illuminator having a fixed position in the arrangement of gaze detection elements and each illuminator transmits a respective infra-red (IR) signal about a predetermined IR wavelength;
    wherein the at least one sensor comprises an infra-red (IR) sensitive sensor for detecting intensity values for at least two glints at predetermined positions on the IR sensitive sensor;
    the one or more processors operable to determine a pupil position for the at least one eye based on determining a reflectivity data value for each glint intensity value, and identifying the glint as being located on a sclera, an iris portion or a pupil portion based on the reflectivity data value for each glint intensity value; and
    wherein the one or more processors for determining at least one gaze vector for the at least one eye based on the eye data further comprises the one or more processors operable to determine the gaze vector based on the pupil position.

5. The system of claim 1 further comprising:
    the near-eye, mixed reality display device being a head mounted display device including an image camera for capturing image data of one or more real objects in front of the user;
    one or more depth cameras for capturing three dimensional image data for positions of one or more real objects in a physical environment surrounding the user;
    the memory storing the image data captured by the one or more image and depth cameras; and
    the one or more software controlled processors being operable for generating a three-dimensional model of an augmented reality scene based on locations of the one or more real objects derived from the image data captured by the cameras and locations of one or more virtual objects based on an executing software application.

6. The system of claim 5 further comprising:
    the near-eye, mixed reality display device being a pair of eyeglasses and including an orientation sensor on a temple of the eyeglasses; and
    the one or more processors being operable for determining a head position based on orientation data from the orientation sensor and the current user field of view based on the head position.

7. The system of claim 6 further comprising:
    wherein the at least one image generation unit is a microdisplay assembly including a variable focus adjuster; and wherein the one or more software controlled processors operable to control the focal length of the at least one image generation unit to create one or more images in which each of the one or more virtual objects appears at a respective focal region in the current 3D user field of view for the natural sight view further comprises:

the one or more processors operable to control the variable focus adjuster of the microdisplay assembly to change the focal length in an optical alignment between the microdisplay assembly and the at least one display optical system.

8. A method for generating an optimized image based on an object of interest in a system including a near-eye mixed reality display device, the method comprising:

determining a three dimensional (3D) current user field of view of a user wearing the near-eye, mixed reality display device, the current user field of view including one or more real objects;

determining at least one gaze vector for at least one eye based on an arrangement of gaze detection elements in fixed positions with respect to each other positioned by the near-eye, mixed reality display device for at least one display optical system positioned to be seen through by the at least one eye by the display device;

determining a current user focal region based on the at least one gaze vector within the 3D current user field of view;

displaying one or more images including one or more virtual objects to appear at a respective focal region in the current 3D user field of view for a natural sight view;

identifying an object of interest by determining a user intent to interact with the object in the current user focal region;

generating an optimized image based on the object of interest; and displaying the optimized image within the current user focal region to the user and displaying images appearing outside of the current user focal region and within the current 3D user field of view that the user does not intend to interact with as diminished using an opacity filter, via the near-eye mixed reality display device.

9. The method of claim 8 wherein the arrangement of gaze detection elements comprises:

an image sensor having a detection area facing the at least one eye, and the at least one gaze vector is determined based on image data captured by the image sensor.

10. The method of claim 8 wherein determining the user intent to interact with the object further comprises:

detecting eye gaze patterns of the user in the current user focal region;

determining a gaze duration of the user for the object in the current user focal region based on a time period a point of gaze is maintained in the eye gaze patterns on the object, the point of gaze being determined based on the at least one gaze vector; and determining the user intent to interact with the object based on whether the gaze duration of the user for the object satisfies a gaze duration threshold.

11. The method of claim 8, wherein determining the user intent to interact with the object in the current user focal region further comprises:

accessing user-specific information related to the user;

correlating the object in the current user focal region to the user-specific information; and automatically determining the user intent to interact with the object in the current user focal region, based on the correlation.

12. The method of claim 8, wherein generating the optimized image based on the object of interest further comprises:

retrieving augmented content related to the object; and projecting the augmented content over or next to the object in the current user focal region.

13. The method of claim 8, wherein generating the optimized image based on the object of interest further comprises:

visually enhancing an appearance of the object in the current user focal region, that the user intends to interact with; and diminishing an appearance of one or more objects that are outside the current user focal region but within the current user field of view.

14. The method of claim 13, wherein visually enhancing the appearance of the object further comprises at least one of highlighting edges of the object or displaying a visual indicator in a region in which the object is located.

15. A method for enhancing a display view of an object of interest in a near-eye, mixed reality display device, the method comprising:

determining a current three dimensional (3D) user field of view of a user wearing the near-eye, mixed reality device, the current 3D user field of view including one or more real objects;

determining a gaze vector for each user eye based on an arrangement of gaze detection elements in fixed positions with respect to each other on a respective display optical system for each eye of the display device;

determining a current user focal region based on the at least one gaze vector within the current user field of view;

displaying one or more images including one or more virtual objects appearing at a respective focal region in the current 3D user field of view for a natural sight view;

identifying an object of interest to the user in the current 3D user field of view; and visually enhancing an appearance of the object of interest by adjusting a focal region of the object in the current 3D user field of view of a user wearing the near-eye, mixed reality display device, wherein adjusting the focal region includes changing the focal point and the focal region of the object of interest to a zoom focal region in response to receipt of a zoom request.

16. The method of claim 15 wherein:
the object of interest is a virtual object.

17. The method of claim 15 wherein:
the object of interest is a real object; and visually enhancing the appearance of the object of interest by adjusting the focal region of the object of interest in the current 3D user field of view of a user wearing the near-eye, mixed reality display device further comprises:

receiving a zoom request from the user;

determining a focal distance for a zoom focal region based on the zoom request and the current user focal region; and adjusting a respective variable focus lens in each respective display optical system for focusing the display device in the zoom focal region.

18. The method of claim 17 further comprising:
capturing image data of a physical environment of the user by a front facing camera on the near-eye display device at a zoom setting with a zoom lens; and tracking the zoom setting of the front facing camera to the zoom focal region.

19. The method of claim 18 further comprising:
updating the current user field of view based on the zoom focal region and image data from one or more cameras in a physical environment of a user capturing image data of a physical environment of the user including the user.

20. The system of claim 1, wherein the at least one sensor is a discrete surface position sensitive detector which is connected set of pixels have intensity values within a predetermined range and are pruned by identifying as a candidate glint each connected set of pixels which satisfy glint geometry criteria.

* * * * *